(12) United States Patent
Sorenson et al.

(10) Patent No.: US 9,980,321 B2
(45) Date of Patent: May 22, 2018

(54) WIRELESSLY OPERABLE COOKING APPLIANCE

(71) Applicant: Spectrum Brands, Inc., Middleton, WI (US)

(72) Inventors: Nicole Ann Sorenson, Verona, WI (US); Byron Seth Sawyer, Middleton, WI (US); Timothy Nott, Madison, WI (US); Dominic DiMarco, Madison, WI (US); David Everett, Verona, WI (US); Jacob Daniel Smith, Madison, WI (US); Karl W. Marschke, Madison, WI (US)

(73) Assignee: Spectrum Brands, Inc., Middleton, WI (US)

( * ) Notice: Subject to any disclaimer, the term of this patent is extended or adjusted under 35 U.S.C. 154(b) by 240 days.

(21) Appl. No.: 14/657,618

(22) Filed: Mar. 13, 2015

(65) Prior Publication Data

US 2015/0312964 A1  Oct. 29, 2015

Related U.S. Application Data

(60) Provisional application No. 62/128,921, filed on Mar. 5, 2015, provisional application No. 61/953,031, filed on Mar. 14, 2014.

(51) Int. Cl.
*H05B 3/68* (2006.01)
*H05B 1/02* (2006.01)
(Continued)

(52) U.S. Cl.
CPC ............ *H05B 1/0266* (2013.01); *A47J 36/32* (2013.01); *A47J 37/0611* (2013.01); *A47J 37/0676* (2013.01); *F24C 15/105* (2013.01)

(58) Field of Classification Search
CPC .. H05B 1/0266; H05B 1/0252; H05B 1/0258; A47J 37/0611; A47J 37/0676;
(Continued)

(56) References Cited

U.S. PATENT DOCUMENTS 5,606,905 A   3/1997  Boehm et al.
6,016,741 A * 1/2000  Tsai ..................... A47J 37/0611
                                                      99/341

(Continued)

FOREIGN PATENT DOCUMENTS

CN       104172900 A    12/2014
DE     10201108526 A1    5/2013
(Continued)

OTHER PUBLICATIONS

International Search Report and Written Opinion for Application No. PCT/US2015/020581 dated Jun. 22, 2015.
(Continued)

*Primary Examiner* — Shawntina Fuqua
(74) *Attorney, Agent, or Firm* — Merchant & Gould P.C.

(57) ABSTRACT

A wirelessly operable cooking appliance for cooking food products includes a wireless communication device. A computing device, such as a smartphone, can wirelessly communicate with the cooking appliance to control and monitor the cooking appliance.

16 Claims, 48 Drawing Sheets

(51) Int. Cl.
*A47J 37/06* (2006.01)
*F24C 15/10* (2006.01)
*A47J 36/32* (2006.01)

(58) Field of Classification Search
CPC .... A47J 37/06; A47J 37/0617; A47J 37/0629; A47J 37/0664; A47J 37/1209; A47J 37/1271; A47J 37/067; A47J 36/32; F24C 15/105; F24C 15/10; F24C 15/103; F24C 15/106; F24C 15/108
See application file for complete search history.

(56) References Cited

U.S. PATENT DOCUMENTS

| | | | |
|---|---|---|---|
| 6,568,848 B1 | 5/2003 | Chapman et al. | |
| 6,813,575 B2 | 11/2004 | Laflamme | |
| 7,703,389 B2 | 4/2010 | McLemore et al. | |
| 8,087,407 B2* | 1/2012 | Wiker | A21B 1/40 126/19 R |
| 8,931,400 B1* | 1/2015 | Allen | H04Q 9/00 340/870.09 |
| 2003/0173352 A1 | 9/2003 | Patterson | |
| 2006/0144384 A1* | 7/2006 | Santagata | A47J 27/62 126/25 A |
| 2009/0188396 A1 | 7/2009 | Hofmann et al. | |
| 2013/0206015 A1 | 8/2013 | Jacoby et al. | |
| 2013/0239817 A1 | 9/2013 | Starr et al. | |
| 2014/0208952 A1 | 7/2014 | Starr et al. | |
| 2014/0208954 A1 | 7/2014 | Starr et al. | |
| 2015/0312964 A1 | 10/2015 | Sorenson | |

FOREIGN PATENT DOCUMENTS

| | | |
|---|---|---|
| DE | 102011085523 A1 | 5/2013 |
| DE | 102011085526 A1 | 5/2013 |
| GB | 2283664 A | 5/1995 |
| GB | 2498823 B | 12/2013 |
| GB | 2508198 A | 5/2014 |
| GB | 2521335 A | 6/2015 |
| WO | 2007107888 A2 | 9/2007 |
| WO | 2012-006674 A1 | 1/2012 |
| WO | 2014006405 A1 | 1/2014 |
| WO | 2015-051446 A1 | 4/2015 |

OTHER PUBLICATIONS

Sorrel, Charlie; Tweetle: The Story of a Tweeting Kettle; www.wired.com; Apr. 5, 2010, 3 pages.
PCT International Searching Authority, International Search Report and Written Opinion for application No. PCT/US2017/040383, dated Nov. 3, 2017, 19 pages.
Ochs, Susie, Belkin Crock-Pot Smart Slow Cooker with WeMo review: Not so hot, www.techhive.com, Jul. 7, 2014, 6 pages.
European Patent Office, Supplementary Search Report for application No. 15762225.9, dated Dec. 19, 2017, 7 pages.

* cited by examiner

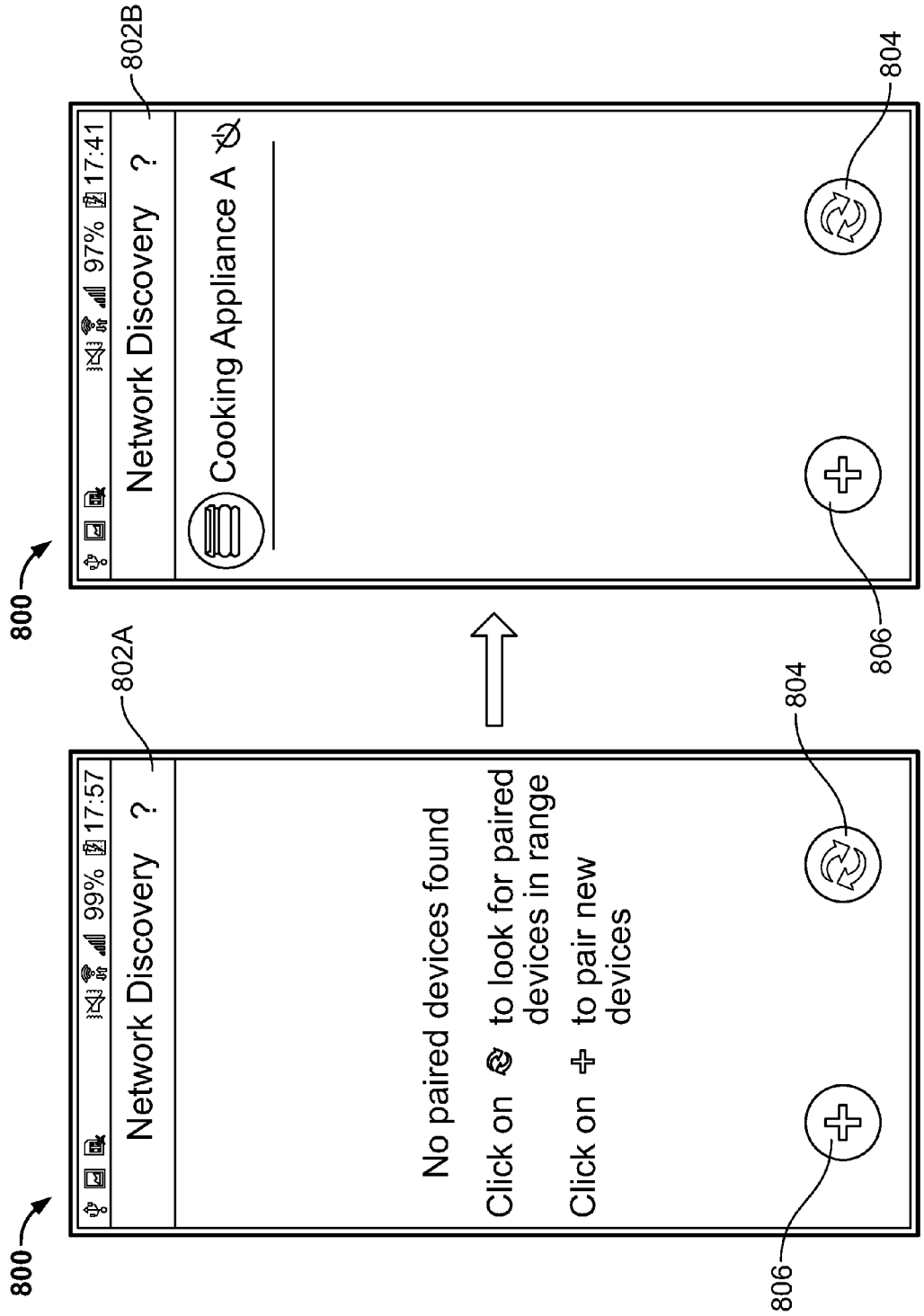

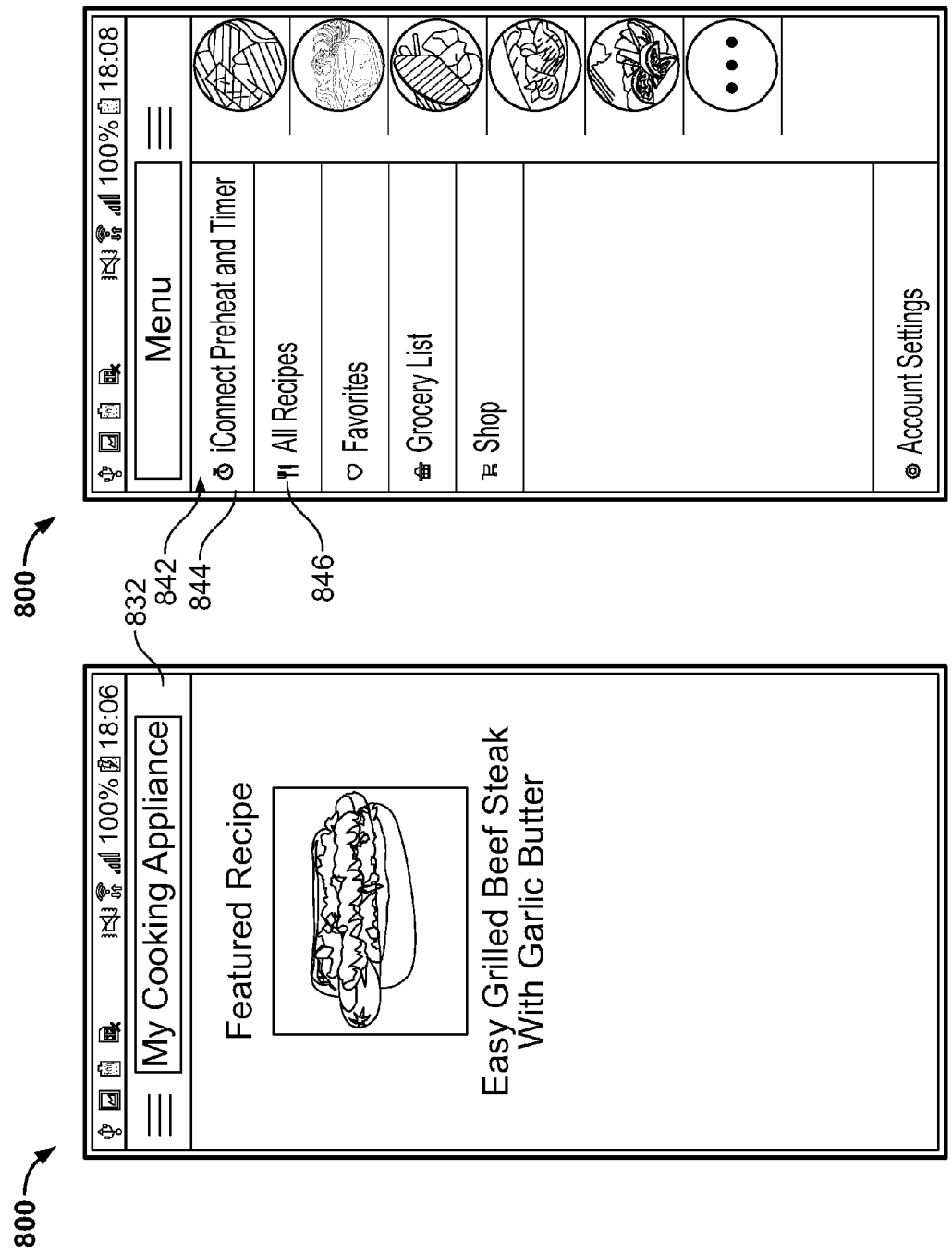

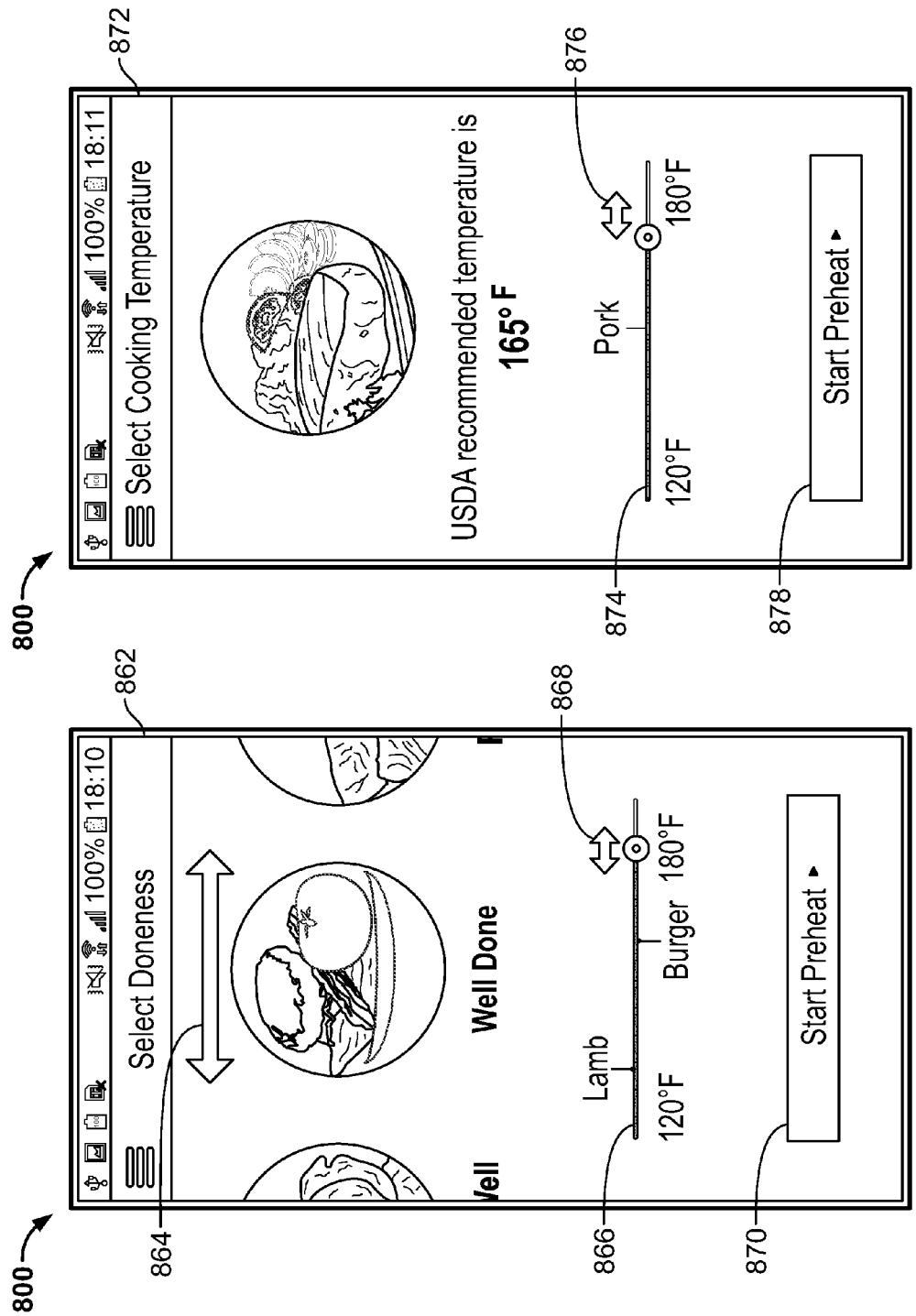

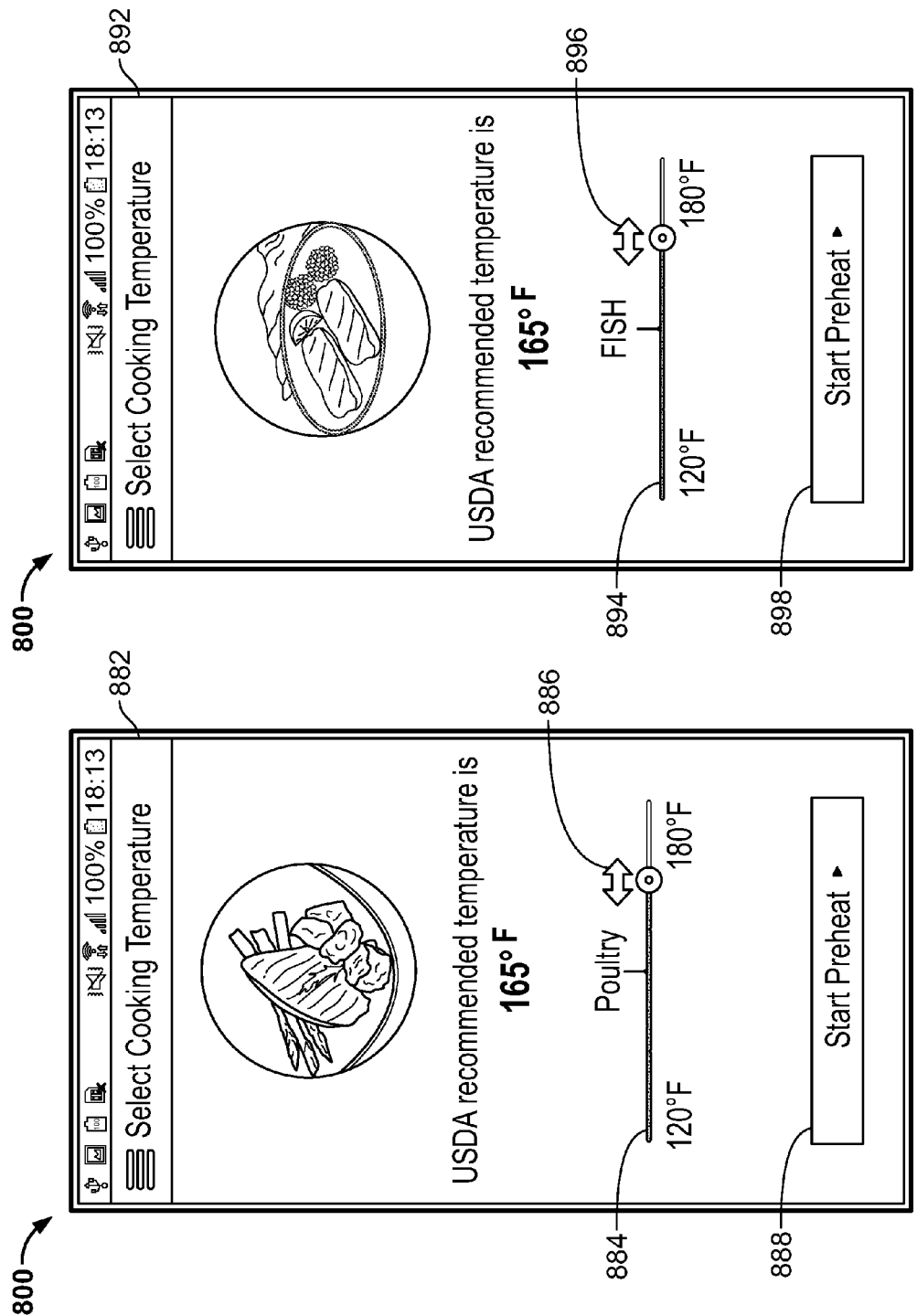

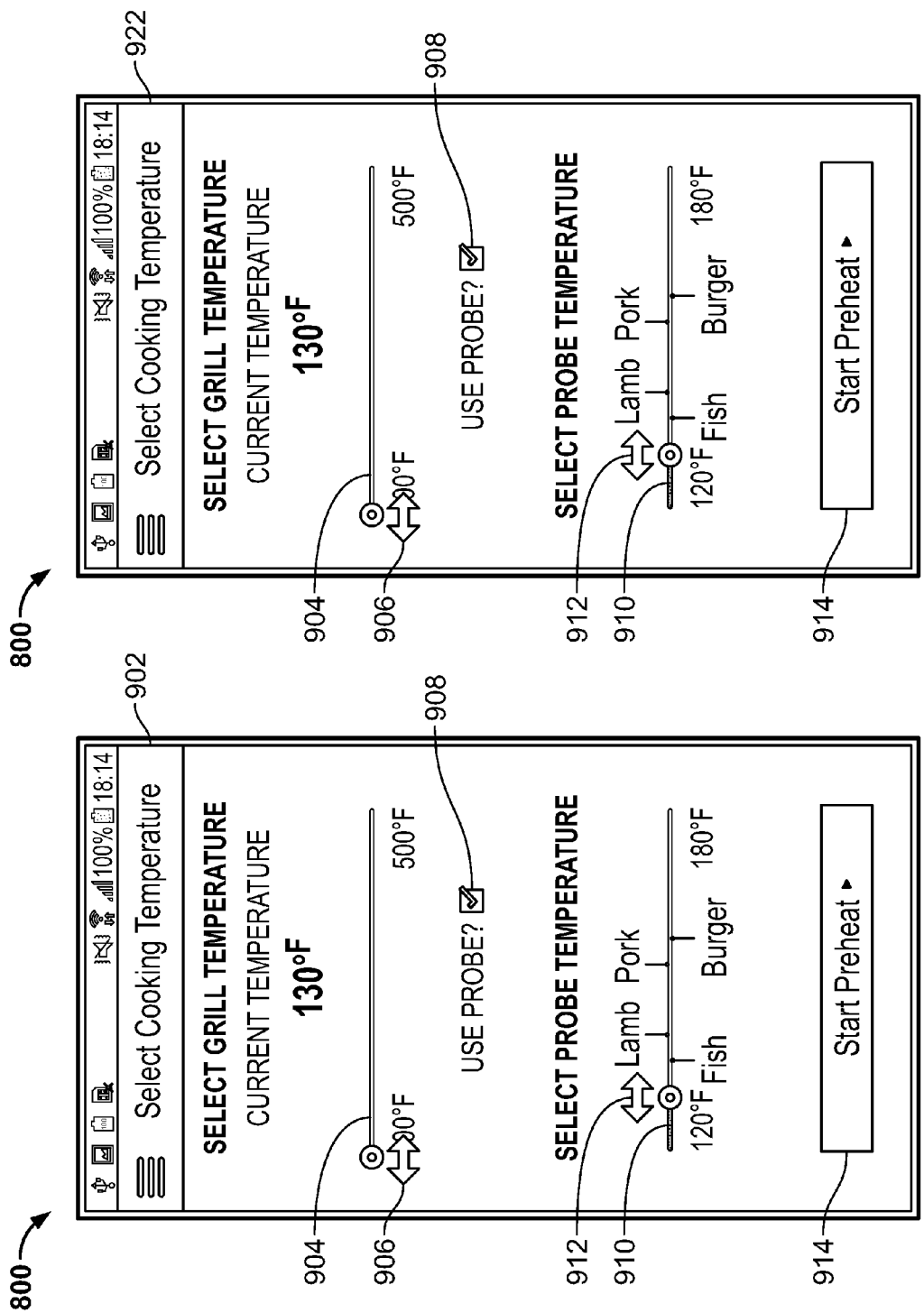

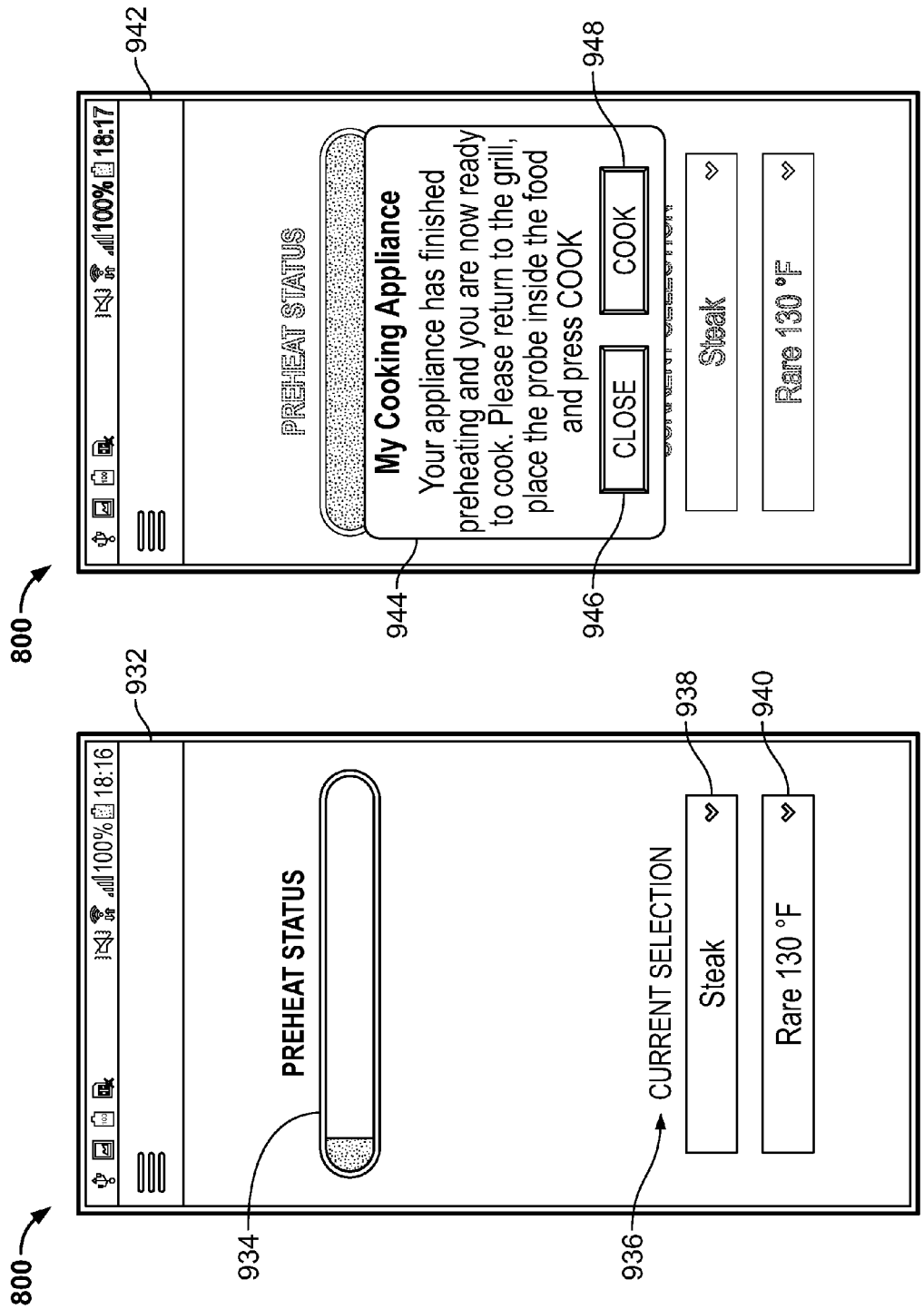

WIRELESSLY OPERABLE COOKING APPLIANCE

CROSS-REFERENCE TO RELATED APPLICATIONS

This application claims priority to U.S. Patent Application Ser. No. 61/953,031 titled Countertop Cooking Appliance For Use With A Remote Communication Device filed Mar. 14, 2014 and to U.S. Patent Application Ser. No. 62/128,921 titled WIRELESSLY OPERABLE COOKING APPLIANCE filed Mar. 5, 2015, the disclosures of which are hereby incorporated by reference in their entireties.

BACKGROUND

Cooking appliances, such as electrically-heated grills, typically require a user to remain close to the cooking appliance while cooking. A user must stay near the cooking appliance and cannot leave it for a long time because the user needs to monitor the cooking appliance and a food item placed therein. For example, a user of the cooking appliance has to frequently check the cooking appliance to determine when the cooking appliance reaches an appropriate temperature before placing a food item in the cooking appliance, and whether the food time has been appropriately heated.

SUMMARY

In general terms, this disclosure is directed to a wirelessly operable cooking appliance. In one possible configuration and by non-limiting example, the cooking appliance is controlled through a user computing device via a wireless network. Various aspects are described in this disclosure, which include, but are not limited to, the following aspects.

One aspect is a cooking appliance comprising: a housing; a heating element disposed within the housing; a cooking plate mounted on the housing; and a control device configured to communicate with a user computing device via a wireless network, receive a cooking configuration from the user computing device via the wireless network, and control the heating element to heat the cooking plate based upon the cooking configuration.

Another aspect is a method of controlling a cooking appliance, the method comprising: receiving cooking configuration data from a user computing device via a wireless network, the cooking configuration data including a target cooking temperature; and controlling a heating element to heat a cooking plate until a temperature of a food item reaches the target cooking temperature.

Yet another aspect is a cooking appliance comprising: a first assembly comprising: a first housing; a first heating element disposed with the first housing; and a first cooking plate detachably mounted on the first housing; a second assembly comprising: a second housing pivotally coupled to the first housing; and a second heating element disposed with the second housing; a control circuit configured to communicate with a user computing device via a wireless network and operable to: receive cooking configuration data from the user computing device, the cooking configuration data including a target cooking temperature; and control at least one of the first and second heating elements to heat the first cooking plate until a temperature of a food item reaches the target cooking temperature.

Further, the present disclosure generally relates to cooking appliances. More specifically, the present disclosure relates to countertop cooking appliances, such as contact grills, rice cookers, skillets, griddles, toaster ovens, waffle makers, and slow cookers, and remote communication devices, such as mobile phones, portable computers, tablet computers, personal digital assistants, etc.

In one aspect of the present disclosure, a countertop cooking appliance includes a heating element, a sensor configured to detect an operational characteristic of the countertop cooking appliance, and a controller coupled to the sensor. The controller is configured to send a signal indicative of the detected operational characteristic to a remote communication device.

Another aspect of the disclosure is a countertop cooking appliance. The countertop cooking appliance includes a heating element and a controller. The controller includes a communication interface configured to receive settings from a remote communication device. The controller is configured to control the heating element based at least in part on the settings received from the remote communication device.

In another aspect of the disclosure, a remote communication device for use with a countertop cooking appliance is provided. The remote communication device includes a display device, a processor, and a memory coupled to the processor. The memory stores instructions that, when executed by the processor, cause the processor to: receive a user's selection of at least one setting to cook a food item using the countertop cooking appliance, transmit the at least one setting to the remote communication device, receive at least one of food item data and operational data from the countertop cooking appliance, determine when cooking of the food item is complete, and display, on the display device, an alert when cooking of the food item is complete.

The features, functions, and advantages described herein may be achieved independently in various implementations described in the present disclosure or may be combined in yet other implementations, further details of which may be seen with reference to the following description and drawings.

BRIEF DESCRIPTION OF THE DRAWINGS

FIG. 34 is an example interface of the appliance control application that displays a network configuration page.

FIG. 37 is an example interface of the appliance control application that displays a recipe information page.

FIG. 38 is an example interface of the appliance control application that displays a menu page.

FIG. 39 is an example interface of the appliance control application that displays a red meat food type page with a doneness selection option.

FIG. 40 is an example interface of the appliance control application that displays a pork food type page with a cooking temperature selection option.

FIG. 41 is an example interface of the appliance control application that displays a poultry food type page with a cooking temperature selection option.

FIG. 42 is an example interface of the appliance control application that displays a fish food type page with a cooking temperature selection option.

FIG. 43 is an example interface of the appliance control application that displays a miscellaneous food type page including cooking plate temperature selection and probe temperature selection options.

FIG. 44 is an example interface of the appliance control application that displays a manual cooking mode page including cooking plate temperature selection and probe temperature selection options.

FIG. 45 is an example interface of the appliance control application that displays a preheat status page.

FIG. 46 is an example interface of the appliance control application that displays a preheat-end and ready-to cook notification page.

DETAILED DESCRIPTION

Figure 1:
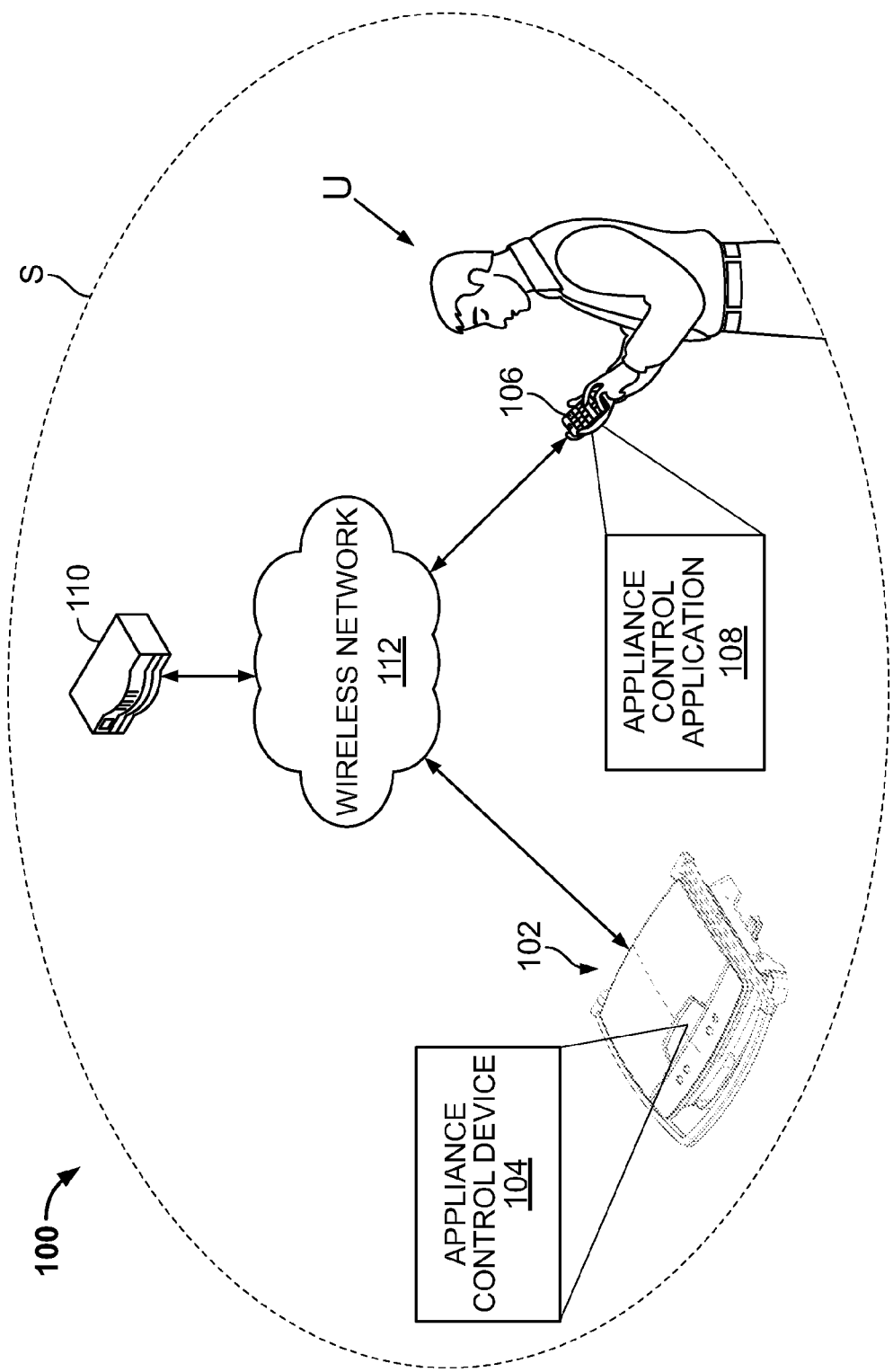
FIG. 1 is a schematic view of an example cooking appliance system.

Various embodiments will be described in detail with reference to the drawings, wherein like reference numerals represent like parts and assemblies throughout the several views.

FIG. 1 is a schematic view of an example cooking appliance system 100. In the embodiments, the cooking appliance system 100 includes a cooking appliance 102 incorporating an appliance control device 104, a user computing device 106 manipulated by a user (U) and executing an appliance control application 108, a wireless router 110, and a wireless network 112. The cooking appliance system 100 is implemented in a user site (S).

The cooking appliance 102 operates to cook a food item. The cooking appliance 102 provides a place for receiving a food item and is configured to heat the food item on or within the place at a predetermined temperature. An example cooking appliance 102 is described and illustrated in more detail with reference to FIGS. 3-27.

In this document, the cooking appliance 102 is described and illustrated primarily as a tabletop cooking appliance, such as a countertop grill, and, therefore, the cooking appliance 102 is also referred to herein as the countertop grill. In other embodiments, however, the cooking appliance 102 can be of various types, other than a tabletop grill, such as ovens, microwaves, bachelor grillers, roasters, electric cookers, toasters, sandwich toasters, and any other appliances operable according to the present disclosure.

The appliance control device 104 operates to control various parts of the cooking appliance 102. In some embodiments, the appliance control device 104 is configured to communicate with the user computing device 106 to receive a user cooking setting (e.g., a cooking configuration) via the wireless network 112, and control the cooking appliance 102 to cook a food item based upon the user cooking setting. An example control device 104 is described and illustrated in more detail with reference to FIG. 27.

The user computing device 106 is operated by the user (U) and executes the appliance control application 108 to control the cooking appliance 102 via the wireless network 112. In some embodiments, the user computing device 106 is a mobile computing device, such as smartphones, tablet computers, and other mobile devices. An example user computing device 106 is described and illustrated in more detail with reference to FIG. 28.

The appliance control application 108 runs on the user computing device 106 and provides an interface for the user (U) to control the cooking appliance 102. The user (U) can set up various cooking configurations that are sent to the appliance control device 104 via the wireless network 112, which in turn operates the cooking appliance 102 based upon the received cooking configurations. An example appliance control application 108 is described and illustrated in more detail with reference to FIG. 28.

The wireless router 110 is a networking device that provides a wireless connection between the cooking appliance 102 and the user computing device 106 and forwards data packets therebetween. In some embodiments, the wireless router 110 is configured to implement a wireless local area network (WLAN) within the user site (S). In some embodiments, however, communication can occur directly between the computing device 106 and the cooking appliance 102, and the wireless router 110 is either not included, or is integrated with one of the computing device 106 or the cooking appliance 102, for example.

The wireless network 112 communicates digital data wirelessly between one or more computing devices, such as between the cooking appliance 102 and the user computing device 106. In some embodiments, the wireless network 112 is configured as a wireless local area network (WLAN) to cover the user site (S). In other embodiments, the wireless network 112 can be any suitable type of network and/or a combination of network. Examples of the wireless network include the Internet, a wide area network (WAN), a wireless wide area network (WWAN), a mesh network, a virtual private network (VPN), a cellular network, and/or any other network that allows the cooking appliance system 100 to operate as described herein.

The user site (S) is a place at which the cooking appliance 102 is used. In some embodiments, the user site (S) is a limited area that does not require wide area networks (WANs). For example, the user site (S) can be a house, building, and other limited spaces where the user (U) is present to use the cooking appliance 102.

In some embodiments, the cooking appliance system 100 includes a server computing device arranged either within the user site (S) or remotely from the user site (S). In some embodiments, the server computing device is configured to store data that are transmitted to the user computing device 106. For example, the server computing device stores data including recipe information and transmit the data to the user computing device 106 via a network.

Figure 2:
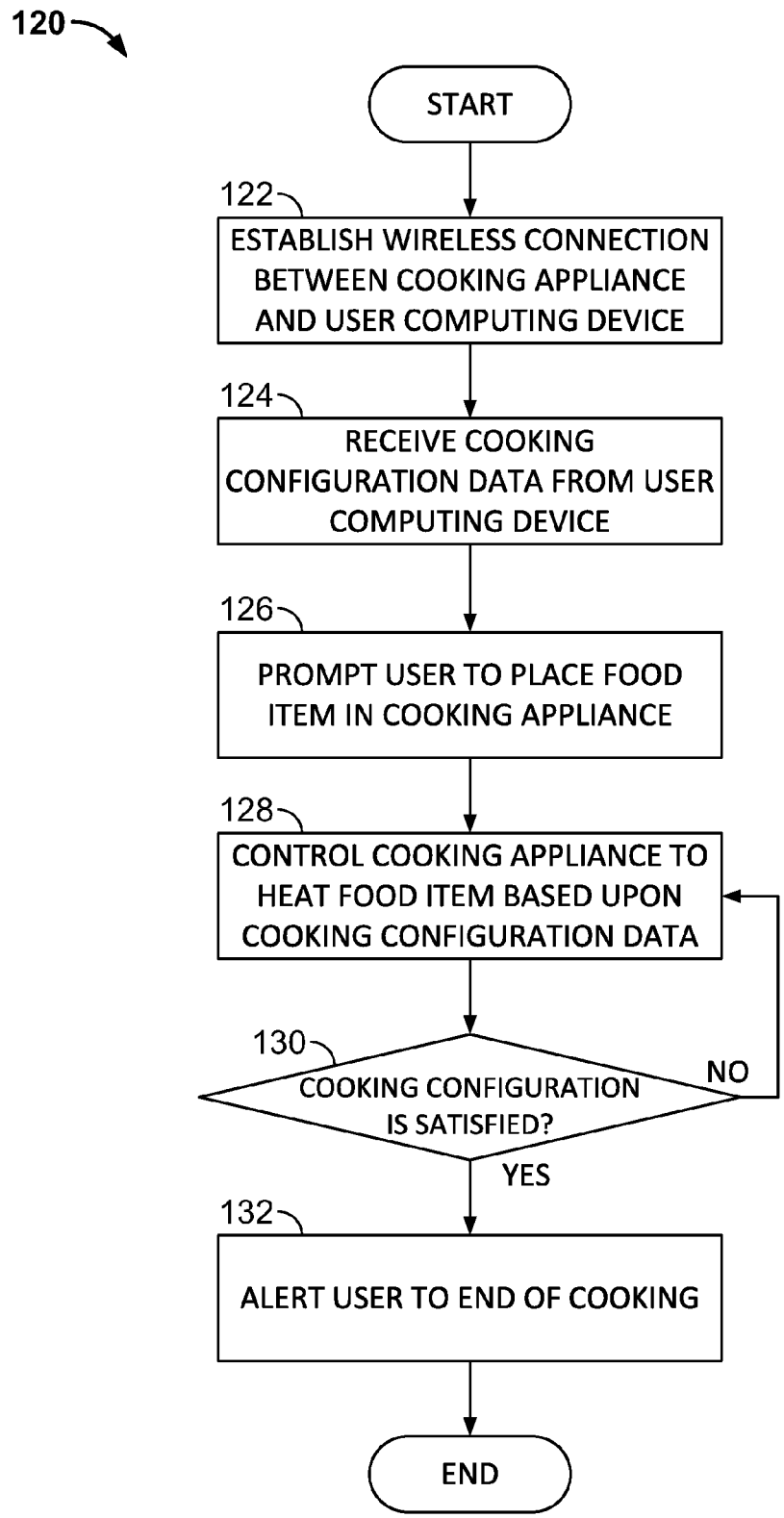
FIG. 2 is a flowchart of an example method of operating the system of FIG. 1.

FIG. 2 is a flowchart of an example method 120 of operating the system 100. In some embodiments, the method 120 includes operations 122, 124, 126, 128, 130, and 132. In other embodiments, the method 120 includes only some of the operations or one or more additional operations. The operations 122, 124, 126, 128, 130, and 132 can be performed in different orders in other embodiments.

At operation 122, a wireless connection is established between the cooking appliance 102 and the user computing device 106 via the wireless network 112. In some embodiments, when the cooking appliance 102 is turned on and the appliance control application 108 begins to run on the user computing device 106, the cooking appliance 102 and the user computing device 106 are paired up to establish a wireless connection through the wireless router 110. An example method of establishing a wireless connection is illustrated and described in more detail with reference to FIG. 30.

At operation 124, the cooking appliance 102 (e.g., the appliance control device 104) receives cooking configuration data from the user computing device 106. The cooking configuration data include various cooking characteristics for cooking a particular food item. Examples of cooking characteristics include a cooking temperature. In some embodiments, a cooking temperature indicates a temperature to which a particular food item needs to be heated to reach so that a cooking of the food item is considered to be complete. In other embodiments, a cooking temperature is defined at a temperature at which a particular food item needs to be cooked.

As described below, the cooking configuration data are entered by the user (U) through the user computing device 106 executing the appliance control application 108.

At operation 126, the system 100 prompts the user (U) to place the food item in the cooking appliance 102 for cooking. In some embodiments, the appliance control application 108 is configured to alert the user (U) when the cooking appliance 102 is ready to receive the food item for subsequent cooking operations. In other embodiments, the cooking appliance 102 is configured to directly alert the user (U) without communicating through the user computing device 106. The alert can be of various types, including visual and/or audible notifications.

At operation 128, the appliance control device 104 controls the cooking appliance 102 to heat the food item based upon the received cooking configuration data. For example, the cooking appliance 102 is operated to heat the food item until a temperature of the food time has reached the predetermined cooking temperature.

At operation 130, the system 100 verifies that the cooking configuration has been satisfied. In some embodiments, the appliance control application 108 receives information about the food item in the cooking appliance 102 and determines whether the food item has been cooked to meet the cooking configurations received from the user (U). For example, the appliance control application 108 determines whether the food item has been cooked to meet the cooking configurations (e.g., the predetermined cooking temperature) received from the user (U). In other embodiments, the appliance control device 104 performs the determination and sends a result to the user computing device 106 so that the appliance control application 108 use the result for various purposes, such as to alert the user (U) to the end of cooking, as described in operation 132.

If the cooking configuration is verified to have been met ("YES" at the operation 130), the method 120 moves on to the operation 132. Otherwise ("NO" at the operation 130), the method 120 returns to the operation 128.

At the operation 132, the system 100 is configured to alert the user (U) that the cooking of the food time has ended. In some embodiments, the appliance control application 108 is configured to provide the alert to the user (U). In other embodiments, the cooking appliance 102 is configured to directly alert the user (U) without communicating through the user computing device 106. The alert can be of various types, including visual and/or audible notifications.

Referring to FIGS. 3-27, an example cooking appliance 102 is illustrated and described in detail. In the illustrated example, the cooking appliance 102 is a tabletop grill. As described above, other embodiments of the cooking appliance 102 are also possible.

Figure 3:
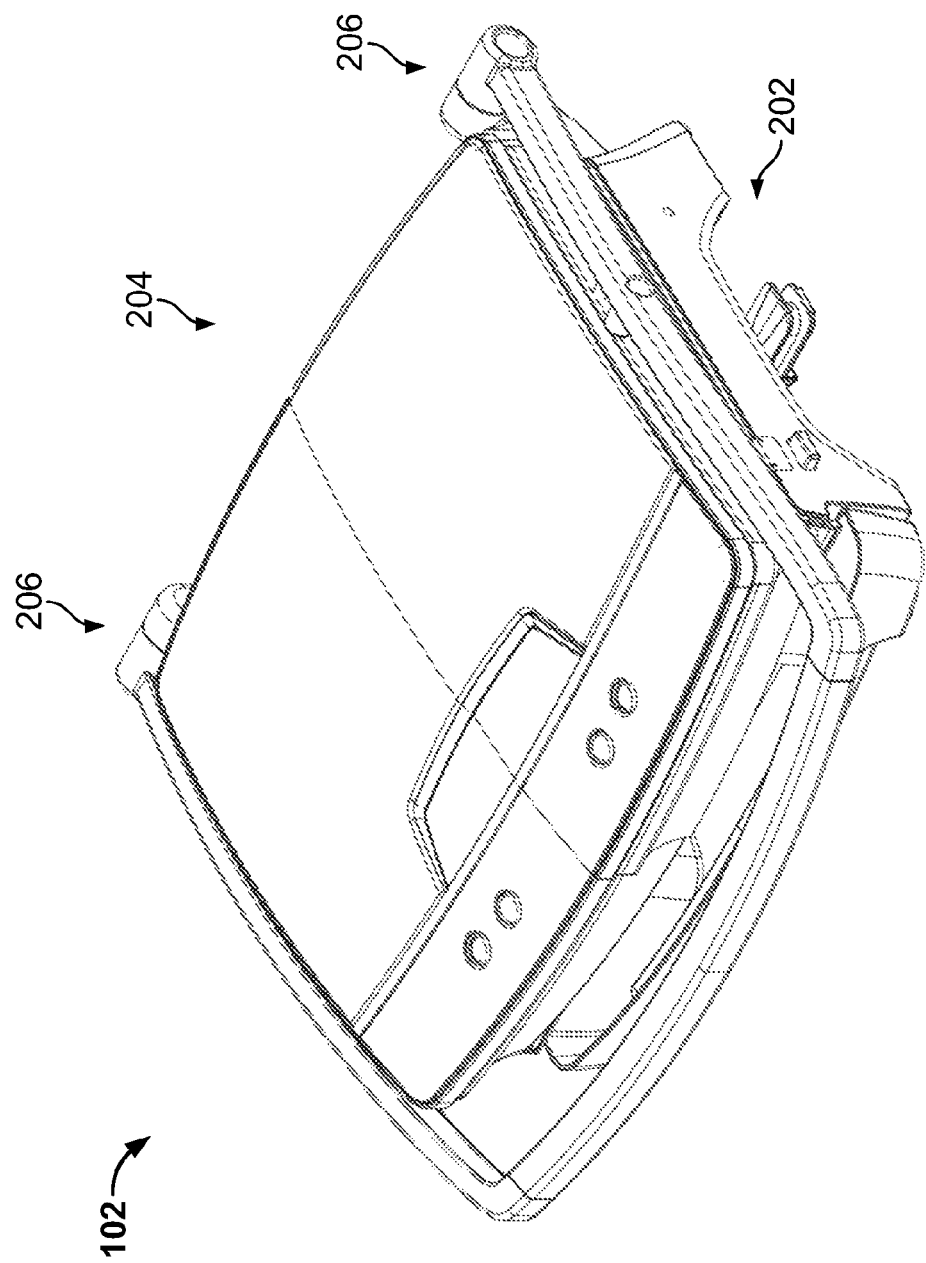
FIG. 3 is a perspective view of an example cooking appliance in a first position.

FIG. 3 is a perspective view of an example cooking appliance 102 in a first position. In some embodiments, the cooking appliance 102 includes a bottom assembly 202 and a top assembly 204. The bottom and top assemblies 202 and 204 are coupled by a hinge assembly 206.

The bottom assembly 202 is configured as a base portion of the cooking appliance 102. An example bottom assembly 202 is described and illustrated with reference to FIGS. 5-17.

The top assembly 204 is configured as a top portion of the cooking appliance 102. An example top assembly 204 is described and illustrated with reference to FIGS. 18-23.

The hinge assembly 206 is used to pivotally connect the bottom and top assemblies 202 and 204. The hinge assembly 206 is configured to enable the top assembly 204 to pivot relative to the bottom assembly 202 and selectively remain in a position that orients the top assembly 204 at various angular positions relative to the bottom assembly 202. In some embodiments, the hinge assembly 206 includes various types of locking mechanisms configured to selectively lock a position of the top assembly 204 relative to the bottom assembly 202 as desired. An example hinge assembly 206 is described and illustrated with reference to FIGS. 25-26.

As illustrated, when the cooking appliance 102 is in the first position, the top assembly 204 is closed and arranged at about zero degree relative to the bottom assembly 202.

Figure 4:
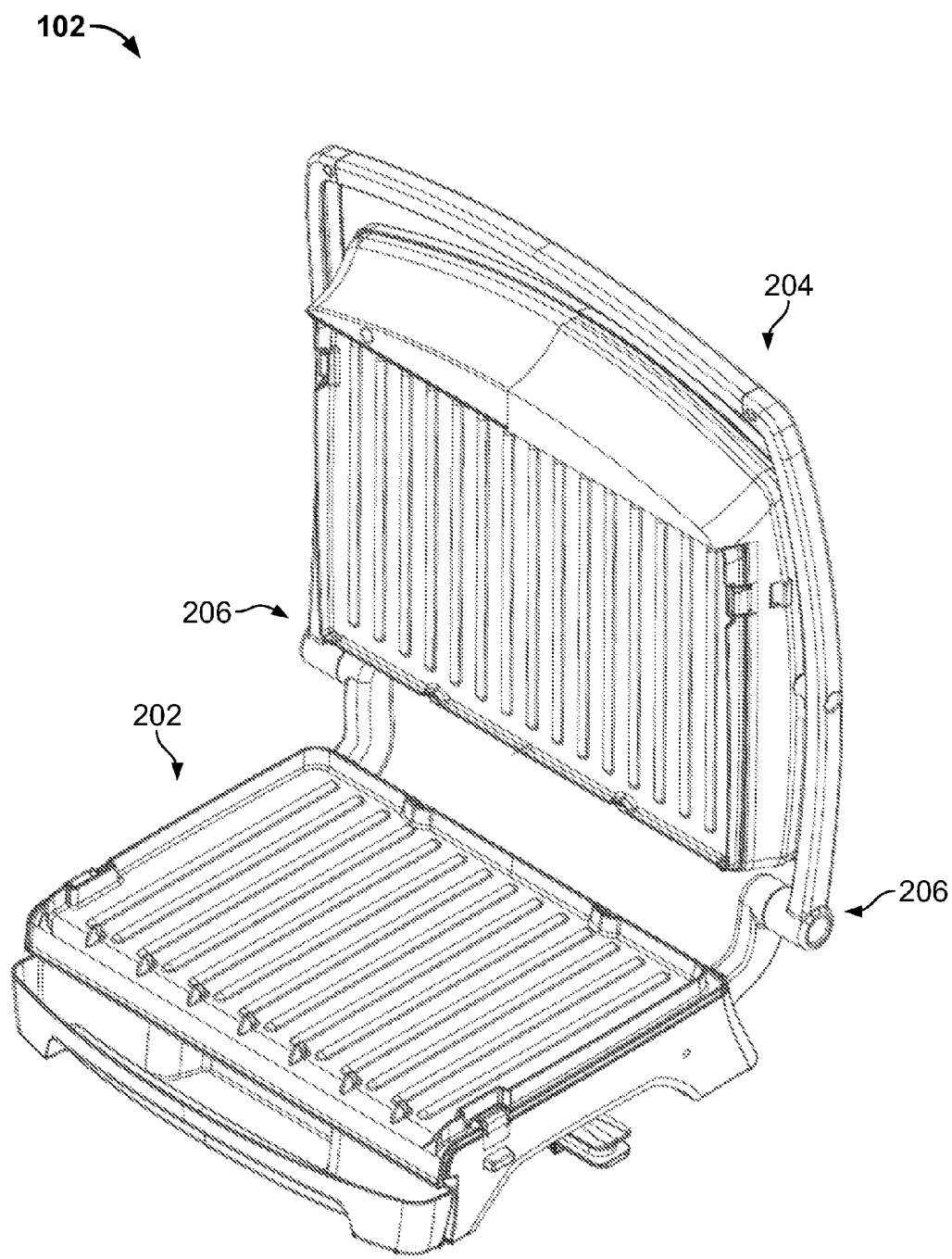
FIG. 4 is a perspective view of the cooking appliance of FIG. 3 in a second position.

FIG. 4 is a perspective view of the cooking appliance 102 of FIG. 3 in a second position. When the cooking appliance 102 is in the second position, the top assembly 204 is opened and maintained at various angles relative to the bottom assembly 202. In the illustrated example, the top assembly 204 is oriented at about 90 degree relative to the bottom assembly 202. In other embodiments, the hinge assembly 206 is configured to enable the top assembly 204 to pivot relative to the bottom assembly 202 and maintain the top assembly 204 at other desired orientations, which ranges, for example, from zero to 180 degrees, relative to the bottom assembly 202.

In other embodiments, the hinge assembly 206 is configured to enable the top assembly 204 to floatably pivot relative to the bottom assembly 202 within a predetermined distance. In this configuration, when a thicker food item is placed on the bottom assembly 202 (e.g., a bottom cooking plate 212 (FIG. 5)) and the top assembly 204 is hinged toward the bottom assembly 202 to close the cooking appliance 102, the floatable hinge assembly 206 permits the top assembly 204 to rise within the predetermined distance in order to accommodate the thinker food item between the bottom and top assembly 202 and 204. For example, the floatable hinge assembly 206 can be used for cooking a panini-type grilled sandwich. Accordingly, the cooking appliance 102 can facilitate pivoting the top assembly 204 relative to the bottom assembly 202 within a wider range of motion, as well as accommodating thicker food items (e.g., thicker cuts of meat or thicker sandwiches) between the bottom and top assemblies 202 and 204 (e.g., bottom and top cooking plates 212 and 380 (FIGS. 5 and 22)).

As set forth above, the illustrated cooking appliance 102 is configured as a horizontal grill (i.e., a device configured to heat a food item with the cooking plates oriented substantially parallel to a countertop or other suitable support surface). However, it is contemplated that the cooking appliance 102 can be a vertical grill in other embodiments (i.e., a device configured to heat a food item with the cooking plates oriented substantially perpendicular to the countertop or other suitable support surface). Alternatively, the cooking appliance 102 can have only one cooking plate (e.g., only the bottom cooking plate 212 with no top cooking plate 380), or the cooking appliance 102 can be configured to heat a food item with at least one of the cooking plates 212 and 380 oriented in any suitable manner.

Referring to FIGS. 5-17, an example bottom assembly 202 is illustrated and described in more detail.

Figure 5:
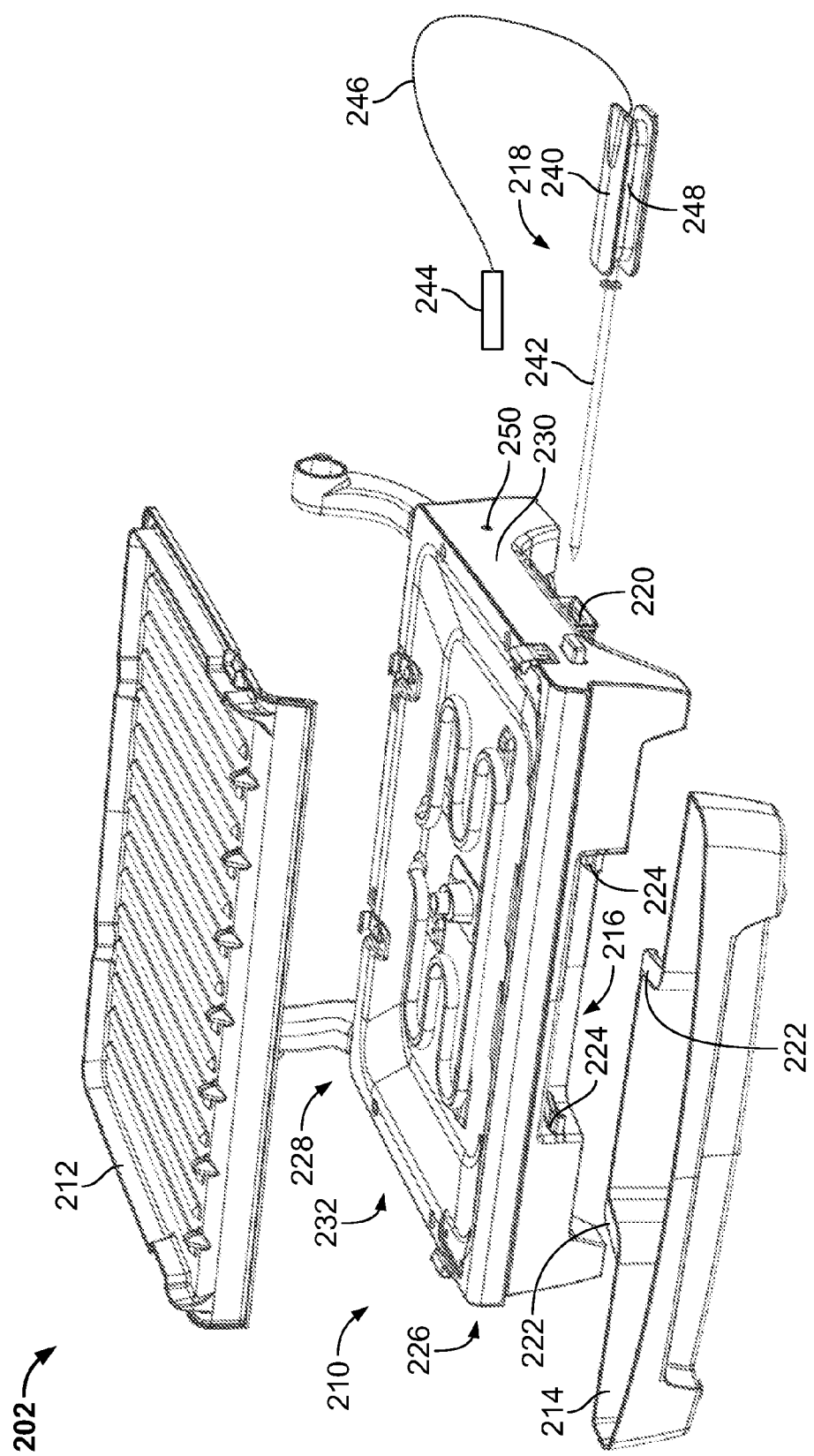
FIG. 5 is an exploded view of a bottom assembly of the cooking appliance.

FIG. 5 is an exploded view of the bottom assembly 202. In some embodiments, the bottom assembly 202 includes a bottom heating subassembly 210, a bottom cooking plate 212, a grease tray 214, and a temperature probe assembly 218. Also shown are a tray receptacle 216 and a probe storage 220 that are provided to the heating subassembly 210.

The bottom heating subassembly 210 is configured to secure the bottom cooking plate 212 thereon and operates to heat the cooking plate 212. The bottom heating subassembly 210 has a forward end 226, a rearward end 228, a right side 230, and a left side 232. An example heating subassembly 210 is illustrated and described in more detail with reference to FIGS. 6-8.

The bottom cooking plate 212 is detachably mounted to the bottom heating subassembly 210 and configured to receive food items thereon for cooking. An example bottom cooking plate 212 is illustrated and described in more detail with reference to FIGS. 9-14. Although the cooking appliance 102 is described herein to include one bottom cooking plate 212, other embodiments of the cooking appliance 102 can include a plurality of top cooking plate 212 of the same or different kinds.

The grease tray 214 is configured and arranged to collect grease dripping from the bottom cooking plate 212. In some embodiments, the grease tray 214 is removably secured to the bottom heating subassembly 210 adjacent a forward end 292 (FIG. 9) of the bottom cooking plate 212. For example, the grease tray 214 is at least partially inserted into, and secured at, the tray receptacle 216 defined at the forward end 226 of the bottom heating subassembly 210 so as to be arranged at the forward end 292 of the bottom cooking plate 212. As described below, the bottom cooking plate 212 is configured and arranged to define a slope that is lower at its forward end 292 so that any liquid substances, such as grease or water, flow toward the forward end 292 of the bottom cooking plate 212, drip from the forward end 292 of the bottom cooking plate 212, and are collected at the grease tray 214.

In some embodiments, the grease tray 214 has one or more guide tabs 222 that slide over support guides 224 formed at the tray receptacle 216.

The tray receptacle 216 is defined at the forward end 226 of the bottom heating subassembly 210 and configured to removably receive the grease tray 214 therein. In some embodiments, the tray receptacle 216 includes one or more support guides 224 configured to hold the guide tabs 222 of the grease tray 214, respectively, as the grease tray 214 is inserted into the tray receptacle 216.

The temperature probe assembly 218 is configured to measure a temperature of a food item heated by the cooking appliance 102. In some embodiments, the temperature probe assembly 218 includes a probe body 240, a temperature probe 242, a connector 244, and a cord 246.

The probe body 240 is configured to mount the temperature probe 242 and provides a handle for a user to manipulate the temperature probe assembly 218. In some embodiments, the probe body 240 includes a cord management portion 248 around which the cord 246 is at least partially wrapped. In the illustrated example, the cord management portion 248 is a channel formed around the probe body 240, and a least a portion of the cord 246 is received within the channel and wrapped around the probe body 240. The cord management portion 248 can be used in various purposes, such as to adjust a length of the cord 246 that extends from the probe body 240 and to store the cord 246 when the temperature probe assembly 218 is not in use.

The temperature probe 242 is a probe that will measure an internal temperature of a food item while cooking. In some embodiments, the temperature probe 242 is a metal probe with a sharp point which is inserted into a food item.

The connector 244 is configured to connect the temperature probe 242 to another electric device. In some embodiments, the connector 244 is configured as a phone connector (also referred to as a phone plug or phone jack) that is inserted into a socket 250 of the bottom heating subassembly 210 so that the temperature probe 242 is electrically connected to the appliance control device 104. Other configurations of the connector 244 are possible.

In other embodiments, the connector 244 is configured to be inserted into a socket of a computing device, such as a mobile computing device, to monitor a temperature of a food item through the computing device independently from the cooking appliance 102. For example, the temperature probe assembly 218 is electrically connected to the user computing device 106 by plugging the connector 244 into one of plug sockets provided in the user computing device 106, and the user (U) can monitor a temperature of a food item through the user computing device 106 (e.g., through a mobile application, such as the appliance control application 108, running on the user computing device 106).

In yet other embodiments, the temperature probe assembly 218 is configured to wirelessly operate without the cord 246. In this configuration, the temperature probe assembly 218 incorporates a wireless communication module to communicate with the cooking appliance 102 and/or the user computing device 106. In some embodiments, the temperature probe assembly 218 can be operated by a rechargeable battery included therein, and the cooking appliance 102 can include a docking station configured to receive the temperature probe assembly 218 and recharge the battery of the temperature probe assembly 218.

In yet other embodiments, the cooking appliance 102 can operate without using the temperature probe assembly 218, and employ other possible technologies to monitor a temperature of a food item.

With continued reference to FIG. 5, the bottom heating appliance 210 includes a probe storage 220 configured to receive and store the temperature probe assembly 218 when not in use. In some embodiments, the probe storage 220 provides a receptacle configured to receive the probe body 240 of the temperature probe assembly 218. In the illustrated example, the probe storage 220 is formed on the right side 230 of the bottom heating subassembly 210 (see also FIG. 16). In some embodiments, the temperature probe assembly 218 is configured to operate to sense a temperature even when it is stored in the probe storage 220.

Figure 6:
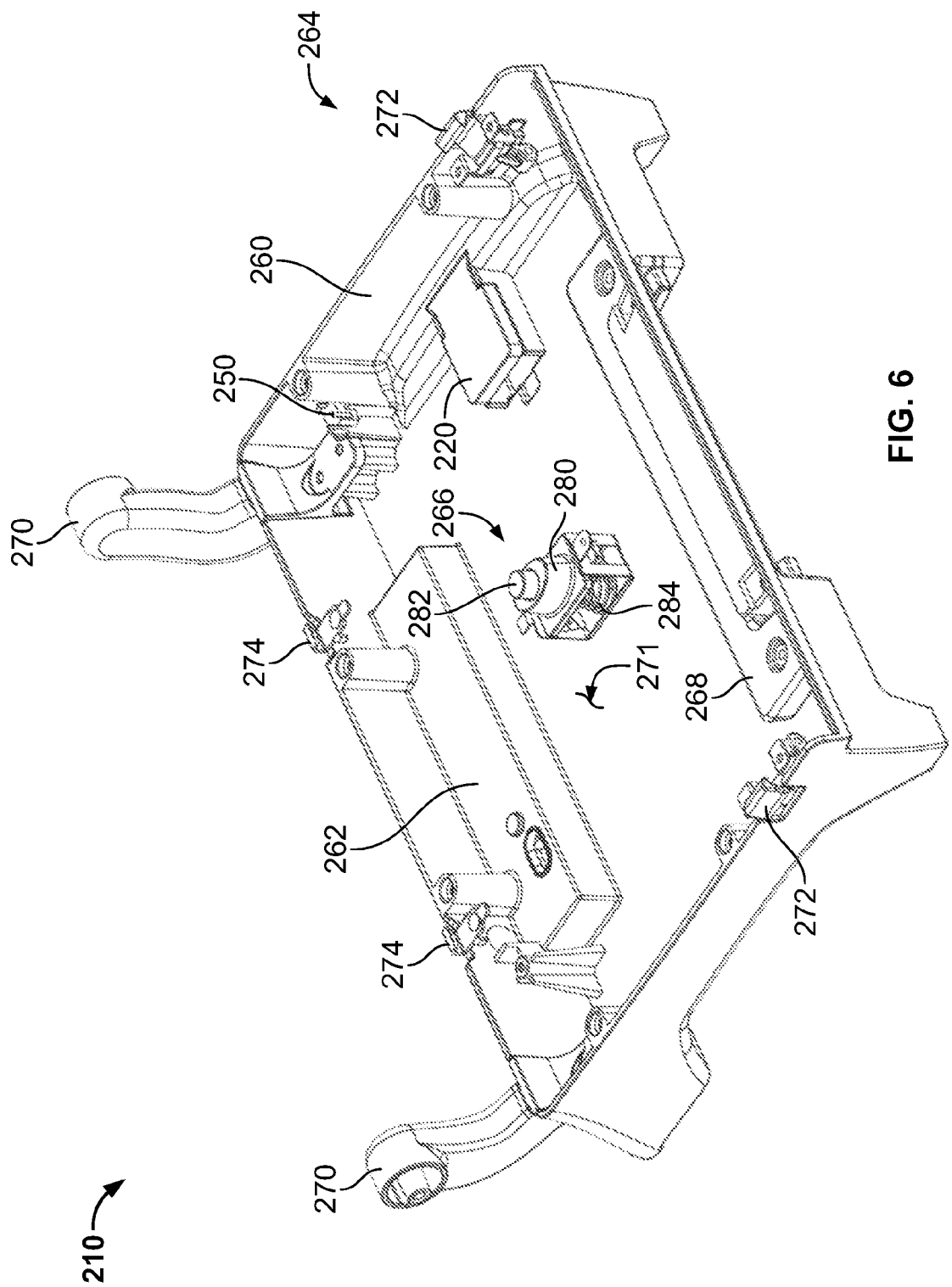
FIG. 6 is a perspective view of a bottom heating subassembly, illustrating some components of the bottom heating subassembly. I
Figure 7:
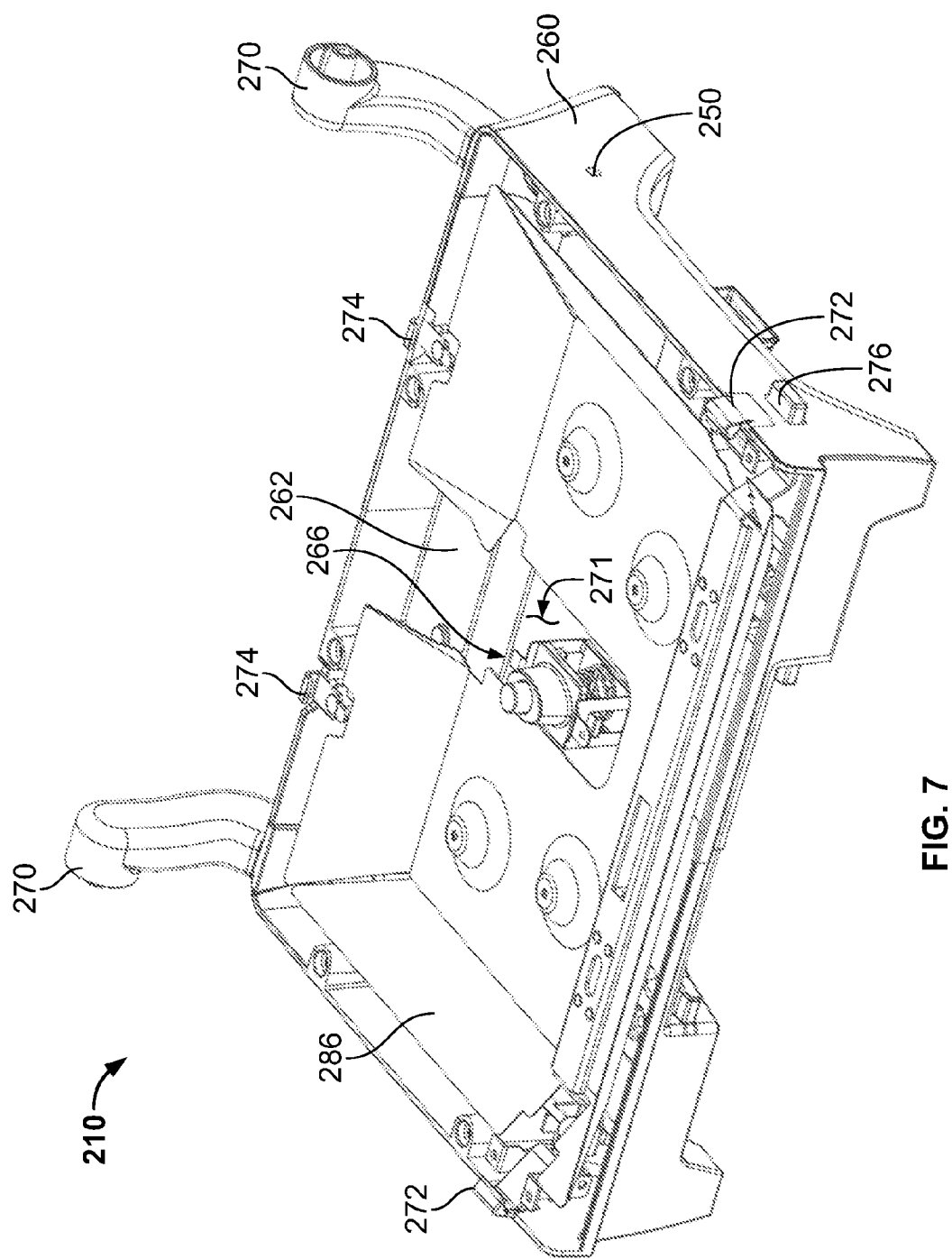
FIG. 7 is a perspective view of the bottom heating subassembly, illustrating a heat insulation panel.
Figure 8:
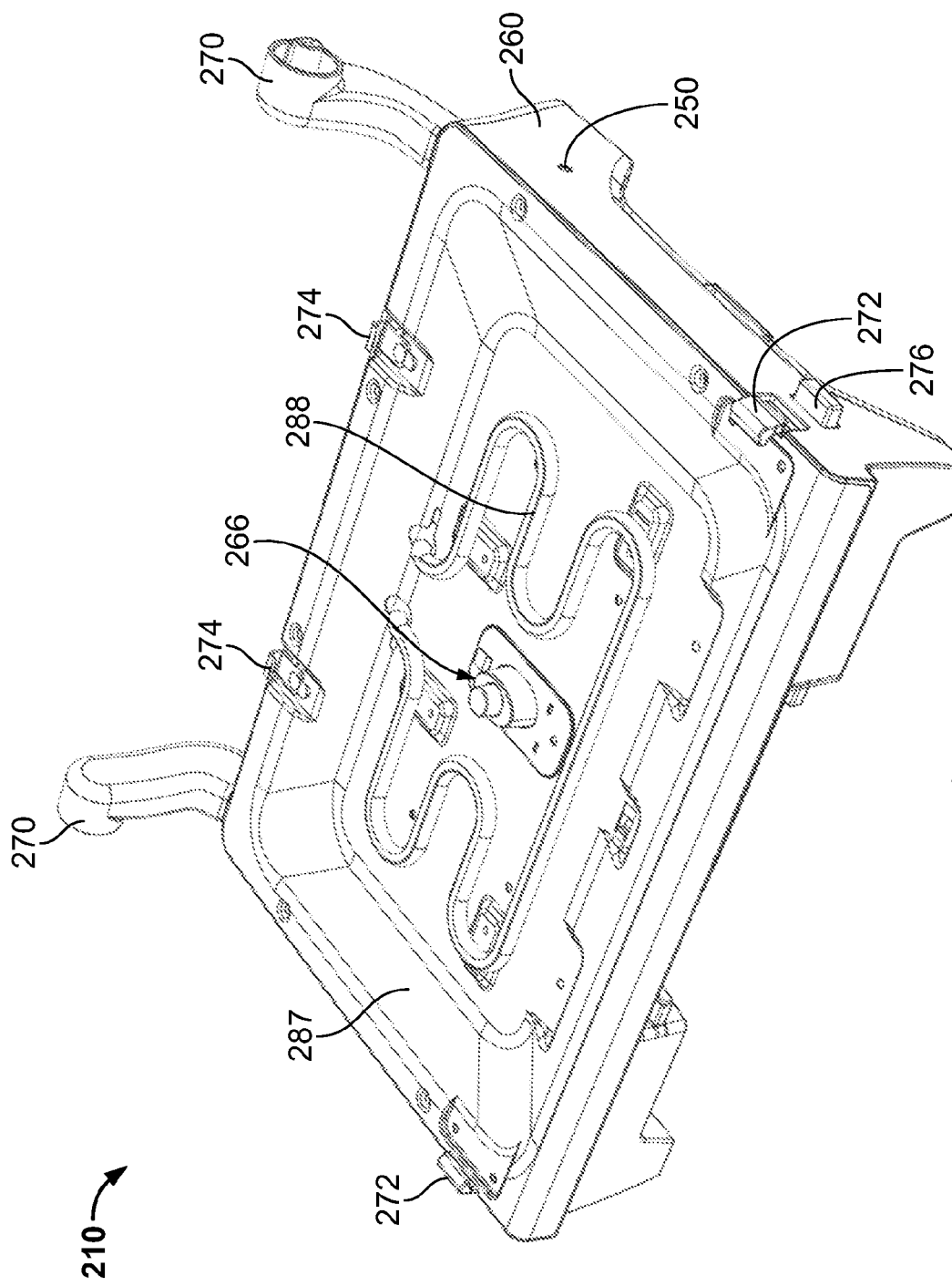
FIG. 8 is a perspective view of the bottom heating subassembly, illustrating a bottom reflecting plate and a heating element.

Referring to FIGS. 6-8, an example bottom heating subassembly 210 is illustrated and described in more detail.

FIG. 6 is a perspective view of the bottom heating subassembly 210, illustrating some components of the bottom heating subassembly 210. In some embodiments, the bottom heating subassembly 210 includes a bottom housing 260, a power supply module 262, a cooking plate holding mechanism 264, a temperature sensing device 266, a weight 268, and a bottom hinge portion 270.

The bottom housing 260 functions as a base frame for the bottom heating subassembly 210. The bottom housing 260 defines a cavity 271 for receiving components of the bottom heating subassembly 210.

The power supply module 262 operates to supply power to various components of the cooking appliance 102, such as the appliance control device 104 and a heating element 288 (FIG. 8). In some embodiments, the power supply module 262 employs a transformer and/or a rectifier to convert an input voltage (e.g., AC mains) to an output voltage (e.g., DC voltage) suitable for electric components of the cooking appliance 102.

The cooking plate holding mechanism 264 is configured to removably secure the cooking plate 212 to the bottom heating subassembly 210. In some embodiments, the cooking plate holding mechanism 264 includes one or more first hooks 272 and one or more second hooks 274. In some embodiments, the first and second hooks 272 and 274 are arranged at the peripheral edges of the bottom housing 260 and spaced apart at desired distances to hold the cooking plate 212 by snapping or clamping the edges of the cooking plate 212. The first hooks 272 can be configured to operate by spring force while the second hooks 274 can be fixed to the bottom housing 260. As shown in FIG. 7, the first hooks 272 are actuated by a push button 276 to release the cooking plate 212 from the bottom housing 260.

The temperature sensing device 266 is configured to detect a temperature of the cooking plate 212. In some embodiments, the temperature sensing device 266 is configured as a thermostat assembly. In this example, the temperature sensing device 266 is described primarily as the thermostat assembly 266. In other embodiments, however, the temperature sensing device 266 uses different sensing technologies. The thermostat assembly 266 is configured to contact a lower surface of the cooking plate 212 when the cooking plate 212 is mounted to the bottom heating subassembly 210. The thermostat assembly 266 is configured to be provided electrical power from the power supply module 262.

In some embodiments, the thermostat assembly 266 includes a thermostat housing 280, a sensing member 282, and a spring 284. The thermostat housing 280 fixed on a bottom surface of the bottom housing 260 and configured to movably support the sensing member 282. The sensing member 282 is slideably inserted into a through-hole defined in the thermostat housing 280 and supported by the spring 284 against the bottom surface of the bottom housing 260. The sensing member 282 is biased away from the bottom surface of the bottom housing 260 by the spring 284. The sensing member 282 is configured to contact the lower surface of the cooking plate 212 and depressed when the cooking plate 212 is mounted onto the bottom housing 260.

In some embodiments, the thermostat assembly 266 is configured to operate only when the cooking plate 212 is assembled to the bottom housing 260 to depress the sensing member 282. In other embodiments, the cooking appliance 102 is configured to turn on only when the cooking plate 212 is assembled to the bottom housing 260 to depress the sensing member 282.

Although the cooking appliance 102 is described herein to include one temperature sensing assembly 266, other embodiments of the cooking appliance 102 can include a plurality of temperature sensing assemblies 266 or the like.

The weight 268 is used to provide an extra weight to the bottom assembly 202 so that the cooking appliance 102 does not tip over when the top assembly 204 is open relative to the bottom assembly 202. In some embodiments, the weight 268 is arranged at or adjacent the forward end 226 of the bottom heating subassembly 210. The weight 268 can be removed as necessary.

The bottom hinge portion 270 is a lower portion of the hinge assembly 206 configured to pivotally coupled to a top hinge portion 340 (FIG. 18) of the top assembly 204.

FIG. 7 is a perspective view of the bottom heating subassembly 210, illustrating a heat insulation panel 286. The heat insulation panel 286 is used to insulate the components of the bottom heating subassembly 210 from heat generated from a heating element 288 (FIG. 8) and the cooking plate 212. In some embodiments, the heat insulation panel 286 is received in the cavity 271 of the bottom housing 260 and disposed between the bottom housing 260 and a bottom reflecting plate 287 (FIG. 8).

FIG. 8 is a perspective view of the bottom heating subassembly 210, illustrating a bottom reflecting plate 287 and a heating element 288.

The bottom reflecting plate 287 is received above the heat insulation panel 286 within the cavity 271 of the bottom housing 260. The bottom reflecting plate 287 is configured to be shallow and has a substantially flat bottom segment and oblique side segments such that heat radiated downward or sideways from the heating element 288 is reflected toward the underside of the cooking plate 212 in a more evenly distributed manner, thereby facilitating optimized heating of the cooking plate 212.

The heating element 288 is disposed above the bottom reflecting plate 287 within the cavity 271 of the bottom housing 260 and beneath the cooking plate 212 such that the heating element 288 is disposed therebetween. The heating element 288 is configured to be provided electrical power from the power supply module 262. Although the cooking appliance 102 is described herein to include one heating element 288, other embodiments of the cooking appliance 102 can include a plurality of heating elements 288 or the like.

Referring to FIGS. 9-14, various examples of the bottom cooking plate 212 are illustrated and described.

Figure 9:
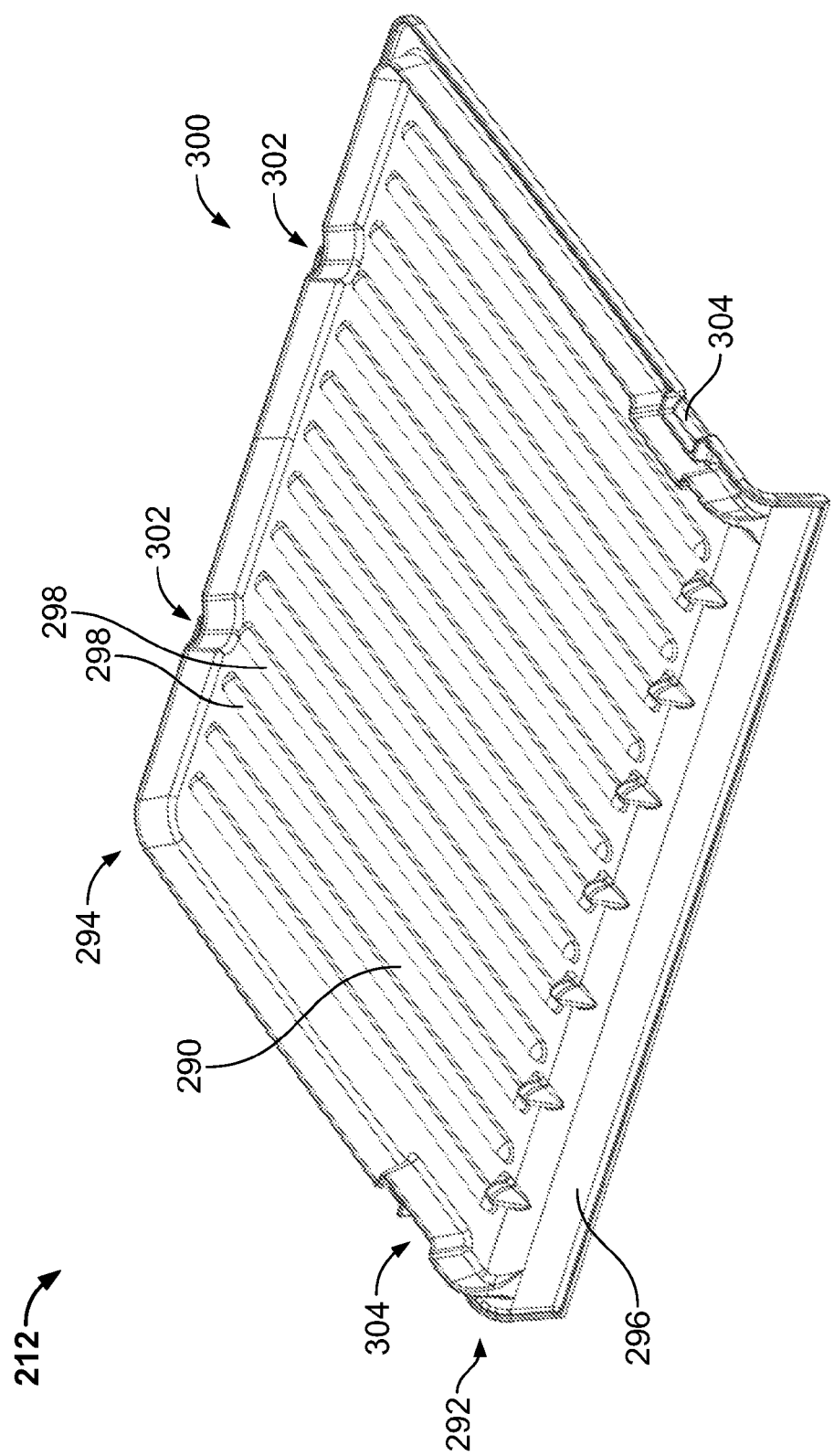
FIG. 9 is an example bottom cooking plate.

FIG. 9 is an example bottom cooking plate 212. In this example, the bottom cooking plate 212 is configured as a grill plate. In some embodiments, the bottom cooking plate 212 includes a food contact surface 290 extending between a forward end 292 and a rearward end 294, a grease dripping surface 296, a plurality of ribs 298, and a plate mounting mechanism 300.

The food contact surface 290 provides a surface on which a food item is placed for cooking. In some embodiments, the bottom cooking plate 212 is arranged and configured such that the food contact surface 290 slopes down from the rearward end 294 to the forward end 292 when the bottom cooking plate 212 is mounted on the bottom heating subassembly 210. The slope of the food contact surface 290 can be determined such that liquid substances, such as grease and water, extracted from a food item efficiently flow toward the forward end 292 of the bottom cooking plate 212, thereby dripping from the bottom cooking plate 212 into the grease tray 214. In some embodiments, the slope of the food contact surface 290 is determined such that about 42% of fat is removed from ground chuck. In other embodiments, other configurations are possible.

In some embodiments, the slope of the food contact surface 290 is formed at an angle between about 5 and 15 degrees relative to a supporting surface (e.g., a countertop or cooking surface) on which the cooking appliance lies. In other embodiments, the angle of the food contact surface 290 relative to the supporting surface is about 8 degrees.

In some embodiments, the slope of the food contact surface 290 is formed by an orientation of the bottom cooking plate 212 relative to the bottom housing 260 while the bottom housing 260 stands in parallel with the supporting surface. In other embodiments, the slope of the food contact surface 290 is formed when the bottom housing 260 is configured to lie on the supporting surface at a predetermined angle. In yet other embodiments, the bottom cooking plate 212 is made to incorporate such a slope of the food contact surface 290 when the bottom cooking plate 212 is mounted to the bottom housing 260 in parallel and the bottom housing 260 stands in parallel with the supporting surface. In yet other embodiments, the slope of the food contact surface 290 is formed by any combination of the configurations described above.

The grease dripping surface 296 is formed at the forward end 292 of the bottom cooking plate 212. The grease dripping surface 296 extends from the food contact surface 290 toward the grease tray 214, which is placed under the grease dripping surface 296 at the forward end 226 of the bottom heating subassembly 210. The grease dripping surface 296 is configured to effectively guide the liquid substances flowing from the food contact surface 290 into the grease tray 214.

The plurality of ribs 298 are provided on the food contact surface 290 to improve cooking of a food item thereon.

The plate mounting mechanism 300 operates to mount the bottom cooking plate 212 onto the bottom housing 260. The plate mounting mechanism 300 is configured to cooperate with the cooking plate holding mechanism 264 of the bottom heating subassembly 210. In some embodiments, the plate mounting mechanism 300 includes one or more first shoulders 302 and one or more second shoulders 304. The first shoulders 302 are configured to engage the first hooks 272 of the cooking plate holding mechanism 264, and the second shoulders 304 are configured to engage the second hooks 274 of the cooking plate holding mechanism 262.

As described above, the cooking plate 212 is detachable from the bottom heating subassembly 210 for various purposes, such as cleaning. In some embodiments, the cooking plate 212 can have various configurations on the food contact surface 290 for different types of cooking. Various types of cooking plate 212 are interchangeably mounted on the bottom heating subassembly 210 for different types of cooking. Some examples of other embodiments of the cooking plate 212 are illustrated in FIGS. 10-14.

Figure 10:
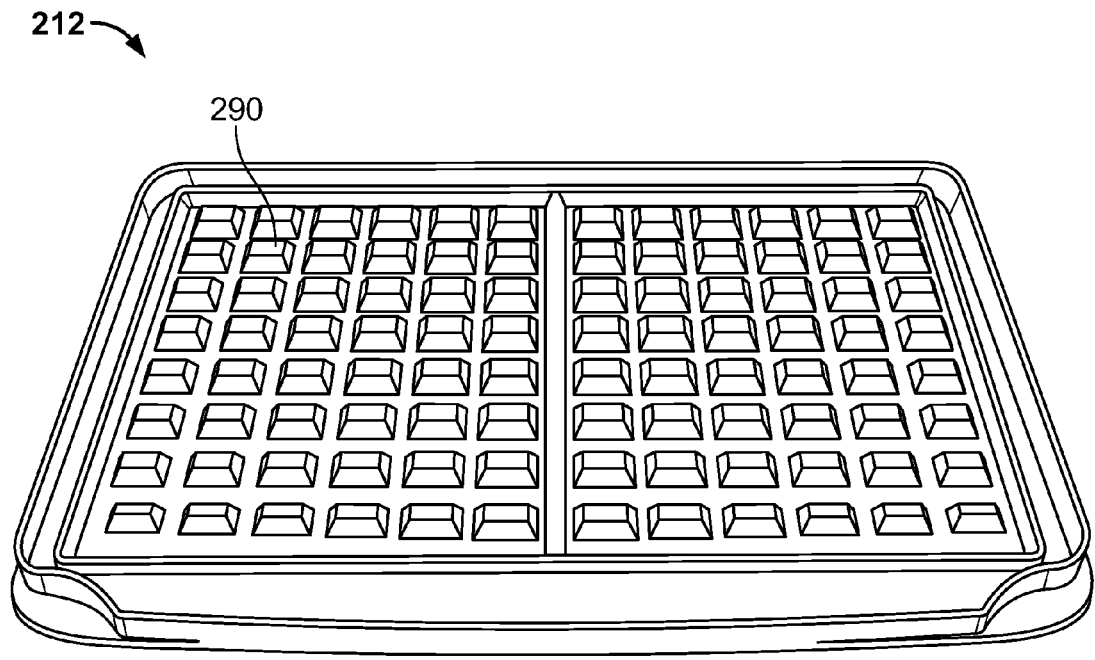
FIG. 10 illustrates the cooking plate configured as a waffle plate

FIG. 10 illustrates that the cooking plate 212 is configured as a waffle plate. In this example, the food contact surface 290 is configured to shape a waffle.

Figure 11:
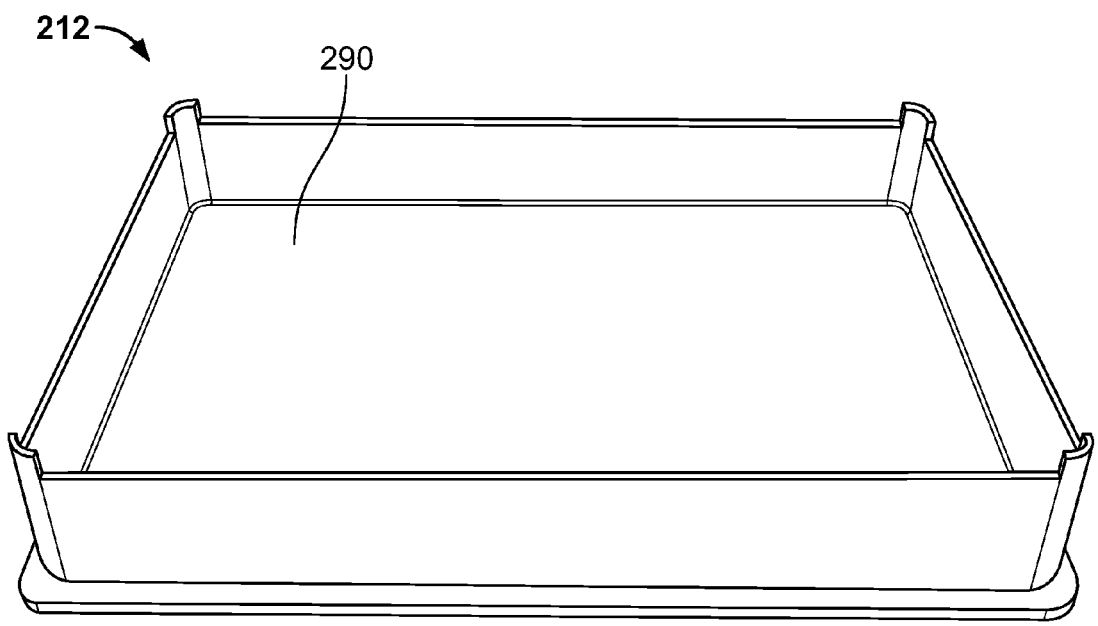
FIG. 11 illustrates the cooking plate configured as a bake plate.

FIG. 11 illustrates that the cooking plate 212 is configured as a bake plate. In this example, the food contact surface 290 provides a bake dish.

Figure 12:
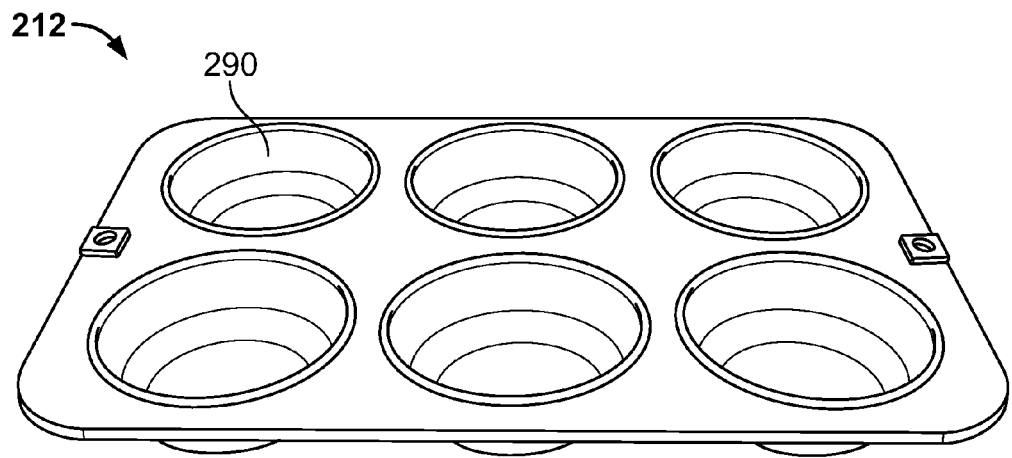
FIG. 12 illustrates the cooking plate configured as a muffin pan.

FIG. 12 illustrates that the cooking plate 212 is configured as a muffin pan. In this example, the food contact surface 290 provides a plurality of bowl-type spaces to bake muffins.

Figure 13:
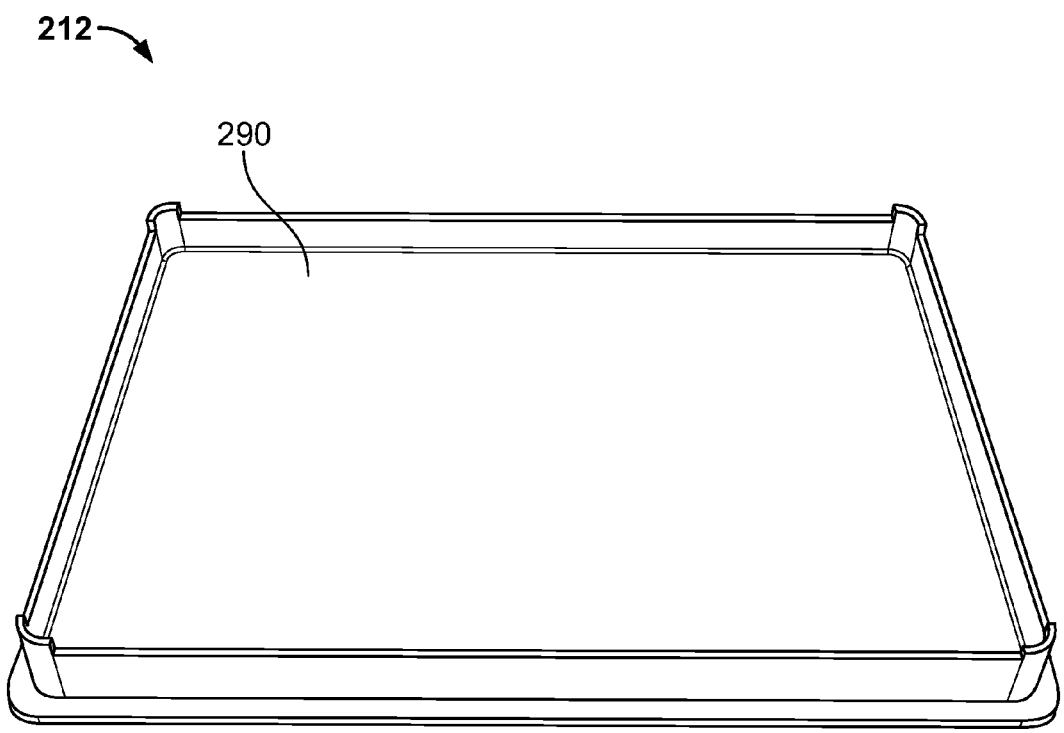
FIG. 13 illustrates the cooking plate configured as a griddle plate.

FIG. 13 illustrates that the cooking plate 212 is configured as a griddle plate. In this example, the food contact surface 290 provides a flat surface for cooking various food items.

Figure 14:
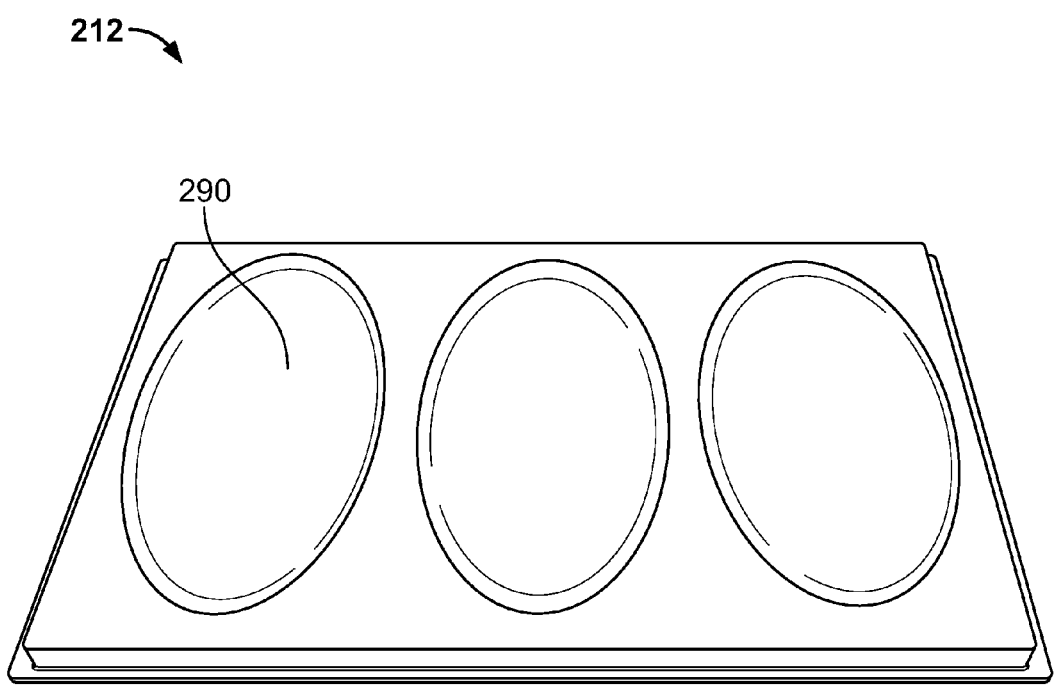
FIG. 14 illustrates the cooking plate configured as an omelet plate.

FIG. 14 illustrates that the cooking plate 212 is configured as an omelet plate. In this example, the food contact surface 290 provides a plurality of dish-type spaces for cooking omelets.

Although not specifically illustrated in FIGS. 10-14, the components as described in FIG. 9 are applicable to the cooking plate 212 in FIGS. 10-14. In addition to the configurations as illustrated in FIGS. 9-14, the cooking plate 212 can have other configurations for different types of cooking, such as a meatball plate, a steam plate, a wok plate, and a multi-cooker plate.

The cooking plate 212 can be made of various materials. Examples of such materials include aluminum, cast iron, stainless steel, and any other materials suitable for providing cooking surfaces.

Figure 15:
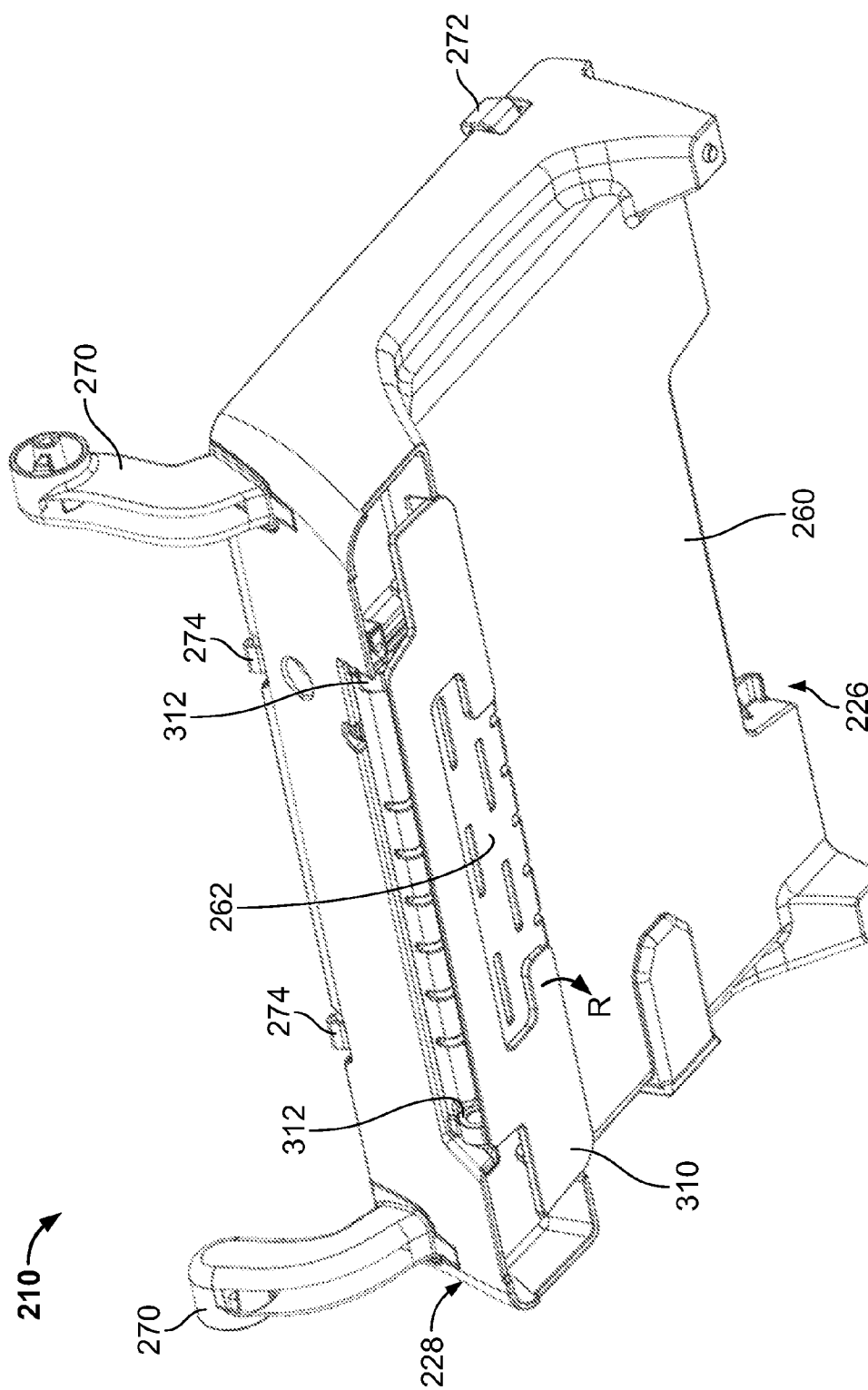
FIG. 15 is a bottom perspective view of the bottom heating subassembly.

FIG. 15 is a bottom perspective view of the bottom heating subassembly 210. In some embodiments, the bottom heating subassembly 210 includes a pivotable stand 310. The pivotable stand 310 is pivotably connected at pivot points 312 adjacent the rearward end 228 of the bottom heating subassembly 210. The pivotable stand 310 is configured for selectively elevating the back of the bottom assembly 202 to increase the angle of the bottom cooking plate 212 relative to the a supporting surface (e.g., a cooking table). By elevating the back of the bottom assembly 202, liquid substances (e.g., grease) can be more effectively drained from the bottom cooking plate 212 into the grease tray 214 while heating a food item.

Figure 16:
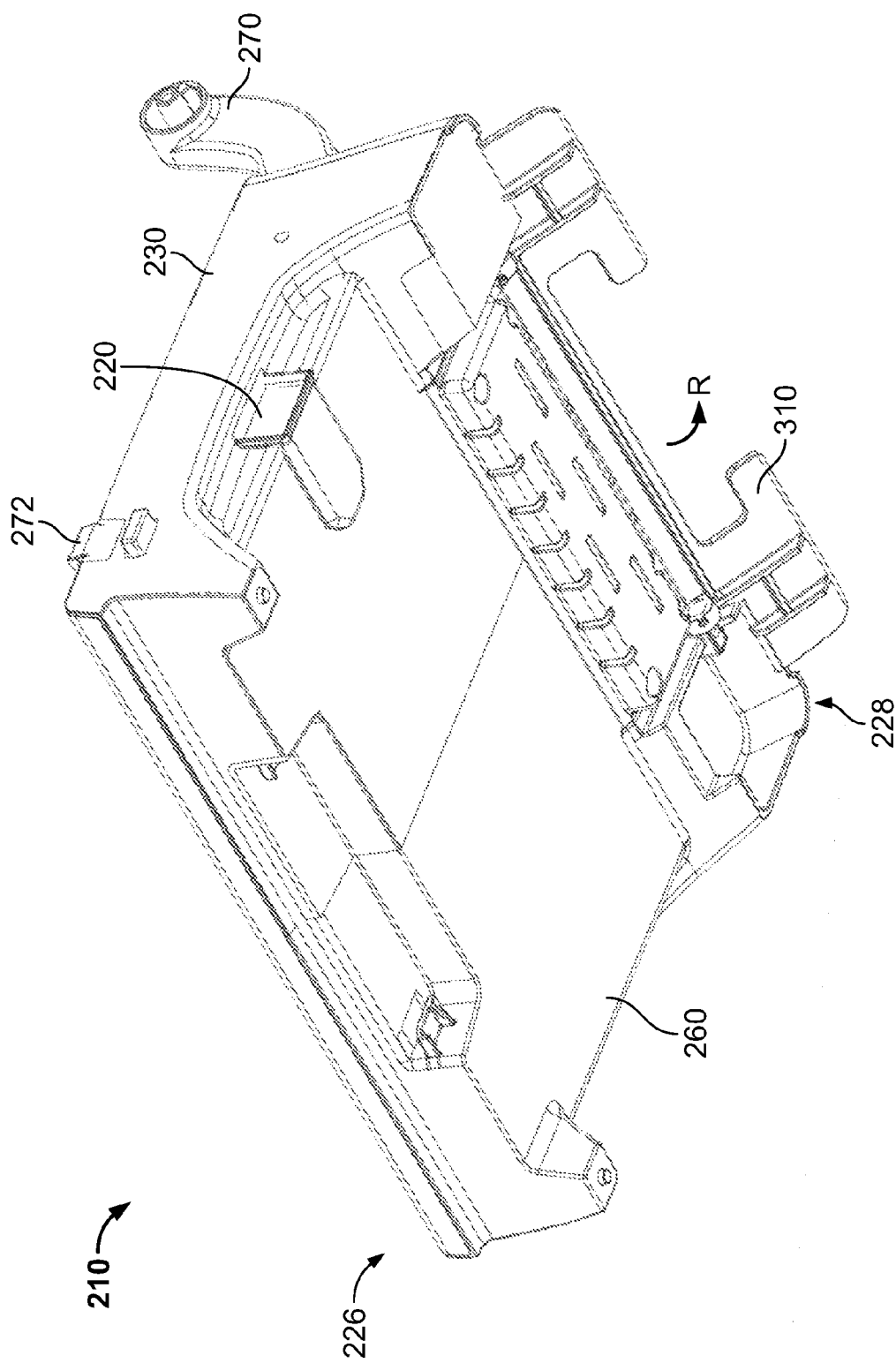
FIG. 16 illustrates that a pivotable stand is flipped over.

FIG. 16 illustrates that the pivotable stand 310 is flipped over in a pivoting direction (R) to elevate the back of the bottom heating subassembly 210.

In some embodiments, the slope of the food contact surface 290, as described with reference to FIG. 9, ranges between about 5 and 15 degrees relative to the supporting surface (e.g., a countertop or cooking surface) when the bottom assembly 202 is elevated at the back by the pivotable stand 310. In other embodiments, the slope of the food contact surface 290 is formed at about 8 degrees relative to the supporting surface when the bottom assembly 202 lies on the supporting surface with the pivotable stand 310 flipped out.

Figure 17:
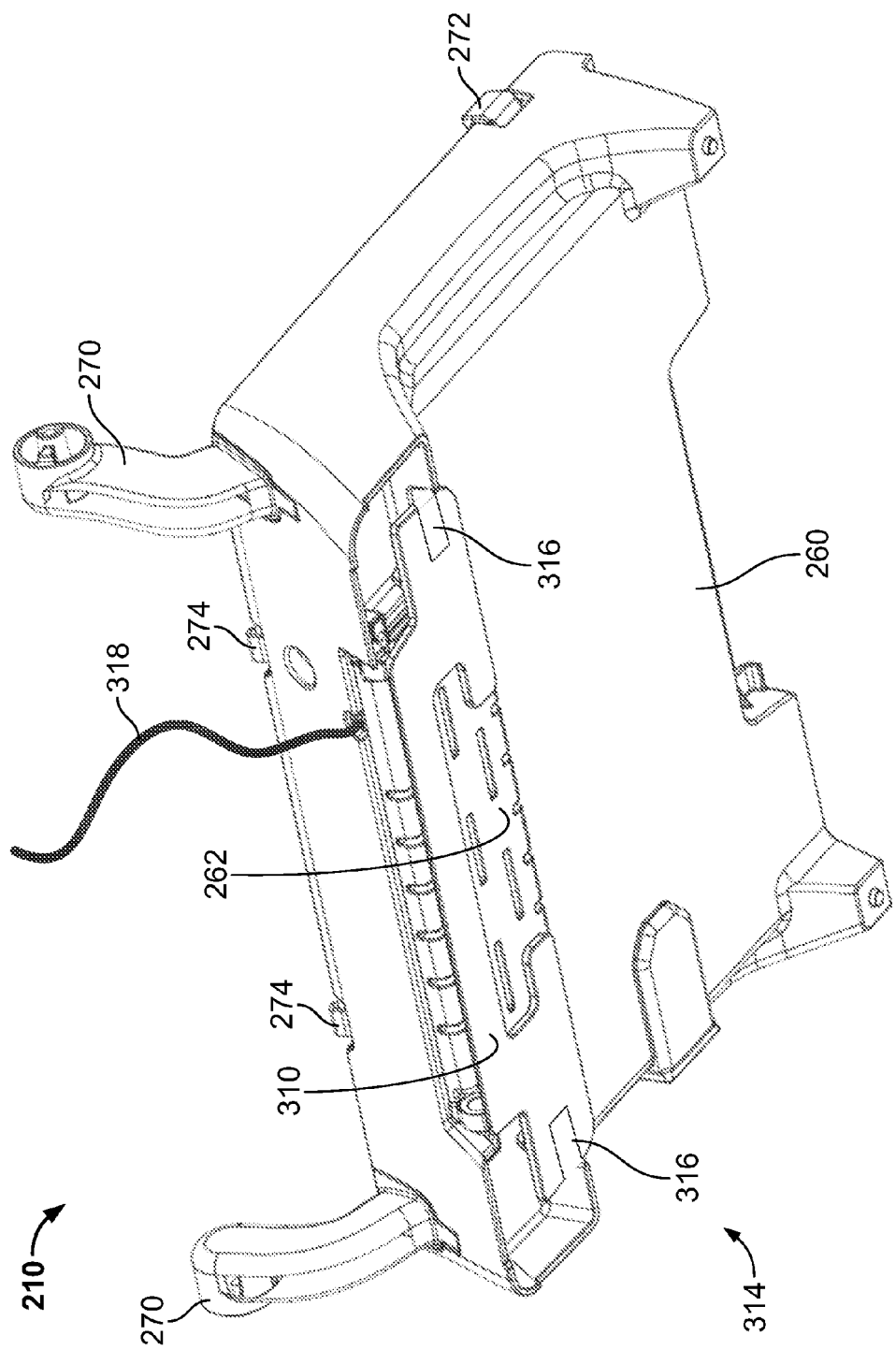
FIG. 17 illustrates another example of the pivotable stand.

FIG. 17 illustrates another example of the pivotable stand 310. In this example, the pivotable stand 310 includes a cord management portion 314. The cord management portion 314 is used to manage at least a portion of a cord, such as a power cord 318 extending out from the power supply module 262. In some embodiments, the cord management portion 314 includes one or more notches 316 defined by the pivotable stand 310. At least a portion of a cord (e.g., the power cord 318) can be contained within the notches 316 and wrapped around the pivotable stand 310.

Referring to FIGS. 18-23, an example top assembly 204 is illustrated and described in more detail.

Figure 18:
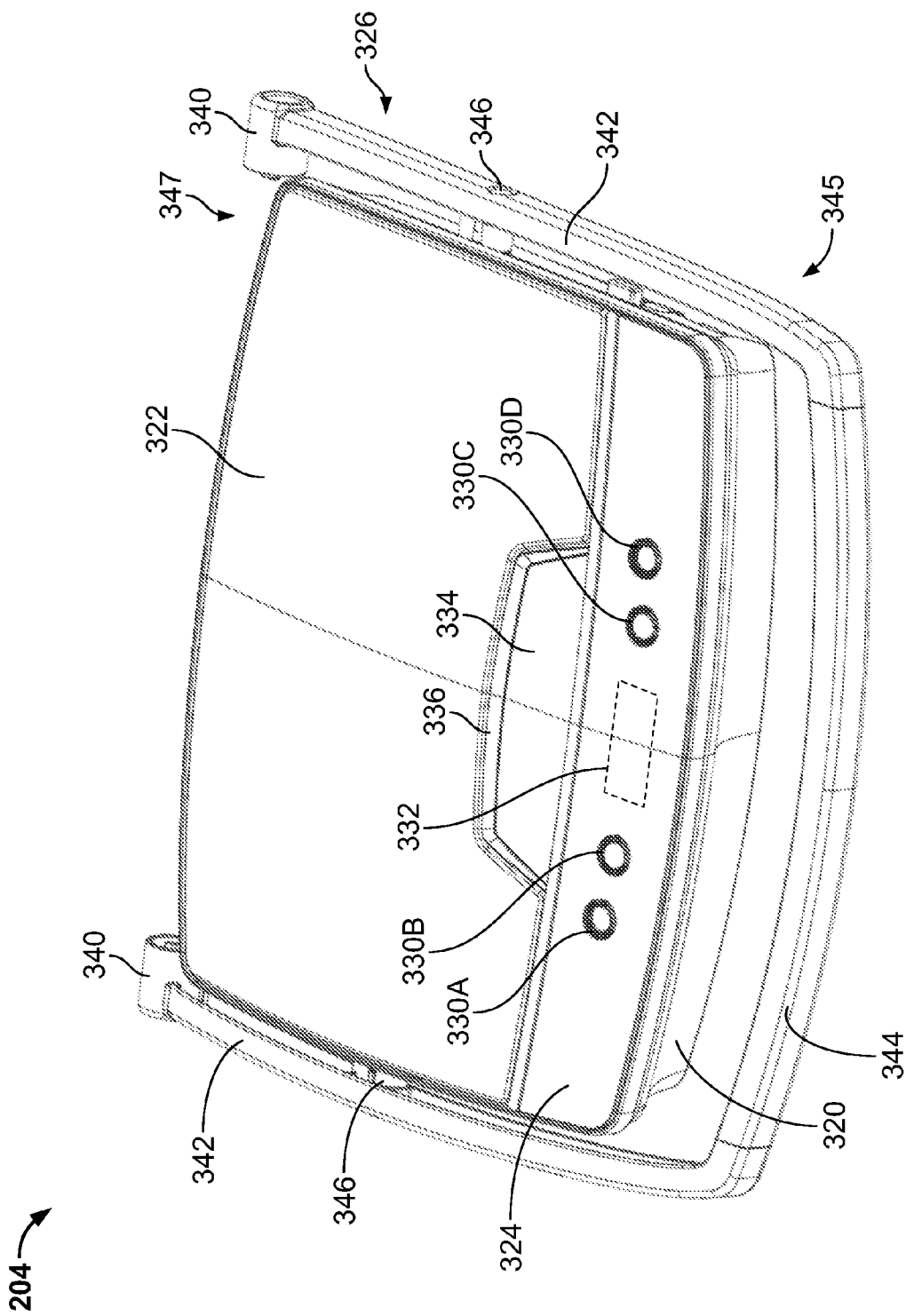
FIG. 18 is a top perspective view of a top assembly of the cooking appliance, illustrating an upper portion of the top assembly.

FIG. 18 is a top perspective view of the top assembly 204, illustrating an upper portion of the top assembly 204. In some embodiments, the top assembly 204 includes a top housing 320, a housing cover 322, a control panel 324, and a handle 326.

The top housing 320 functions as a frame for the top assembly 204. The top housing 320 defines a cavity 364 (FIG. 20) for receiving components of the top assembly 204.

The housing cover 322 is configured to cover the top housing 320 to protect the components received within the top assembly 204 and provide aesthetic appearance. In some embodiments, the housing cover 322 functions as replaceable skins. For example, the housing cover 322 is removably attached to the top housing 320 and replaceable by other housing covers 322 with different designs.

The control panel 324 is configured to receive a user input for operating the cooking appliance 102. In some embodiments, the control panel 324 is also configured to display various pieces of information. The control panel 324 is electrically connected to the appliance control device 104.

In some embodiments, the control panel 324 includes one or more input buttons 330 for receive user inputs, a display screen 332 for displaying information, and a wireless communication panel 334.

In the illustrated example, the control panel 324 provides four input buttons including first, second, third, and fourth button 330A-330D. For example, the first button 330A is configured to manually turn on and off the cooking appliance 102. The second button 330B is configured to manually increase a temperature of the cooking plate 212. The third button 330C is configured to manually decrease a temperature of the cooking plate 212. The fourth button 330D is configured to manually select a monitoring mode. For example, the fourth button 330D can enable a user to choose either a temperature of the cooking plate 212 or a temperature of the temperature probe assembly 218 to be shown on the display screen 332. In other embodiments, the control panel 324 can include more or less than four input buttons 330. Other embodiments of the input buttons 330 are configured to receive different user inputs than illustrated herein.

The display screen 332 is configured to show various pieces of information, such as user inputs entered through the input buttons 330 and data associated with the cooking appliance 102. For example, the display screen 332 is configured to display a temperature of either the cooking plate 212 (and/or the cooking plate 380) or the temperature probe assembly 218, and an operating status of the cooking appliance 102 (e.g., power on/off). The display screen 332 can be configured to digitally display such information thereon.

As described herein, the control panel 324 can be configured to receive only a few inputs directly from a user and display only fundamental information (e.g., a temperature) because the user computing device 106 is primarily used to control the cooking appliance 102. As a result, the control panel 324 can provide a simple design and manual user manipulation.

In some embodiments, the control panel 324 is configured as a touch sensitive screen. The control panel 324 can include an insulative panel coated with a transparent conductor. As the human body is an electrical conductor, touching the surface of the control panel 324 results in a distortion of the electrostatic field of the control panel 324, which is measurable as a change in capacitance. In some embodiments, the insulative panel is made of flat glass. In other embodiments, the insulative panel is made of thermoplastic polymers, such as polycarbonate. As thermoplastic polymers (e.g., polycarbonate) are flexible, the control panel 324 can be configured to provide a curved surface.

Figure 19:
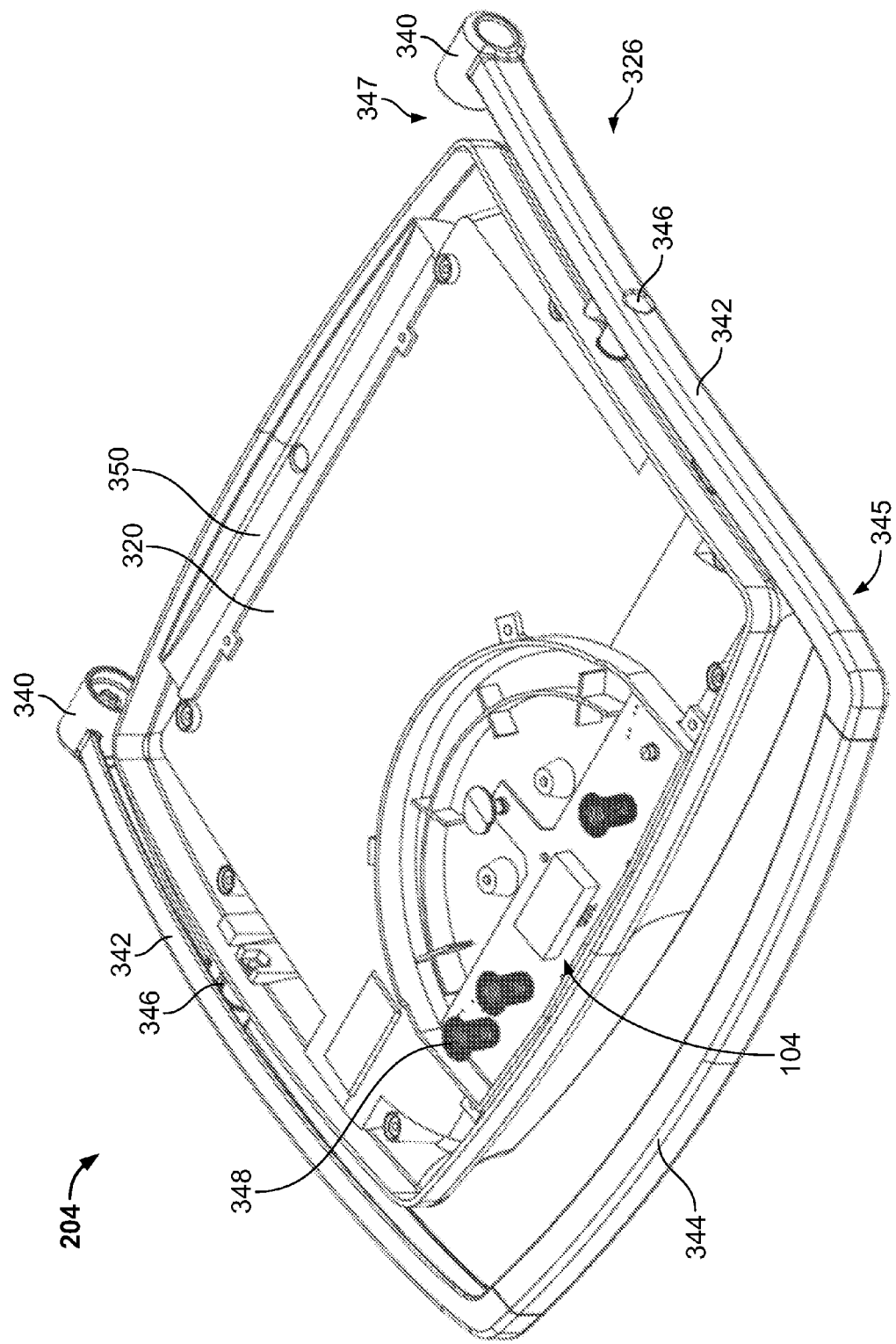
FIG. 19 is a top perspective view of the top assembly with a housing cover and a control panel removed.

In some embodiments, the input buttons 330 (such as 330A-330D) can be configured as touch sensitive buttons (e.g., tactile buttons) incorporated in the touch sensitive control panel 324. In other embodiments, spring elements 348 (FIG. 19) can be placed under the input buttons 330 on the control panel 324 to provide a physical feedback to a user when the input buttons 330 are depressed. The spring elements 348 provide spring force acting against a user's force depressing the buttons 330 on the control panel 324. An example of the spring elements 348 is illustrated in FIG. 19.

The wireless communication panel 334 is configured to provide information about a statue of a wireless communication between the cooking appliance 102 and the user computing device 106. The wireless communication panel 334 provides the status information in various manners. In some embodiments, the wireless communication panel 334 includes one or more status indicators, such as icons or symbols (e.g., a dot with curved lines radiating from the dot), to indicate status of wireless connection. In other embodiments, different color schemes and/or different operation thereof can be used to indicate different status of wireless connection. For example, a predetermined icon displayed on the wireless communication panel 334 can change its color for different status (e.g., green for stable connection and orange for unstable connection). Further, such an icon displayed on the wireless communication panel 334 can either flash or remain sold depending on a connection status.

In some embodiments, the wireless communication panel 334 includes an indication belt 336 around the wireless communication panel 334 to inform a status of wireless connection. The indicating belt 336 can include one or more lighting elements that selectively turn on to indicate that a wireless connection has been established. In other embodiments, the indication belt 336 can be used in other situations. For example, the indication belt 336 can be configured to turn on when the cooking appliance 102 turns on.

With continued reference to FIG. 18, the handle 326 is configured to enable a user to open and close the top assembly 204 relative to the bottom assembly 202. In some embodiments, the handle 326 includes a top hinge portion 340, opposing side handle portions 342, a forward handle portion 344, and a cover hinge assembly 346.

The top hinge portion 340 is an upper portion of the hinge assembly 206. The top hinge portion 340 is pivotally coupled with the bottom hinge portion 270. In some embodiments, the top hinge portion 340 and the bottom hinge portion 270 are coupled together with fasteners, such as screws.

The side handle portions 342 extends between the top hinge portion 340 and the forward handle portion 344 along the sides of the top housing 320. The side handle portions 342 are pivotally connected to the top housing 320 at the cover hinge assembly 346 such that the top housing 320 are at least partially rotatable relative to the handle 326.

The forward handle portion 344 extends between the opposing side handle portions 342 and transverses a forward end 345 of the top housing 320. The forward handle portion 344 provides a grip for a user so that the user opens or closes the top assembly 204 relative to the bottom assembly 202.

The cover hinge assembly 346 pivotally couples the side handle portions 342 to the top housing 320 so that the top assembly 204 pivots relative to the handle 326. As described above, the top hinge portion 340 of the handle 326 is pivotally coupled to the bottom hinge portion 270 of the hinge assembly 206. As such, the cover hinge assembly 346 and/or the hinge assembly 206 enable the top assembly 204 to floatingly pivot relative to the bottom assembly 202 within a predetermined distance, so that, when a thicker food item is placed on the bottom assembly 202, the cover hinge assembly 346 and/or the hinge assembly 206 permit the top assembly 204 to rise within the predetermined distance in order to accommodate the thinker food item between the bottom and top assembly 202 and 204.

FIG. 19 is a top perspective view of the top assembly 204 with the housing cover 322 and the control panel 324 removed. In some embodiments, the appliance control device 104 (including a wireless communication device as described in FIG. 27) is disposed under the control panel 324 within the top housing 320. The control device 104 can effectively avoid heat generated at the bottom assembly 202 by arranging the control device 104 in the top assembly 204. In other embodiments, the control device 104 can be disposed in the bottom assembly 202. An example of the control device 104 is illustrated and described in more detail with reference to FIG. 27.

In some embodiments, the top assembly 204 includes spring elements 348 that are placed under the input buttons 330 on the control panel 324 to provide a physical feedback to a user when the input buttons 330 are depressed. The spring elements 348 provide spring force acting against a user's force depressing the buttons 330 on the control panel 324.

In some embodiments, the top assembly 204 includes a heat insulation structure 350 arranged within the top housing 320 at a rearward end 347 of the top assembly 204. The heat insulation structure 350 is used to reduce heat transfer from a top heating element 376 (FIG. 21) and a top cooking plate 380 (FIG. 22) and protect components of the top assembly 204 (including the appliance control device 104) from the heat.

Figure 20:
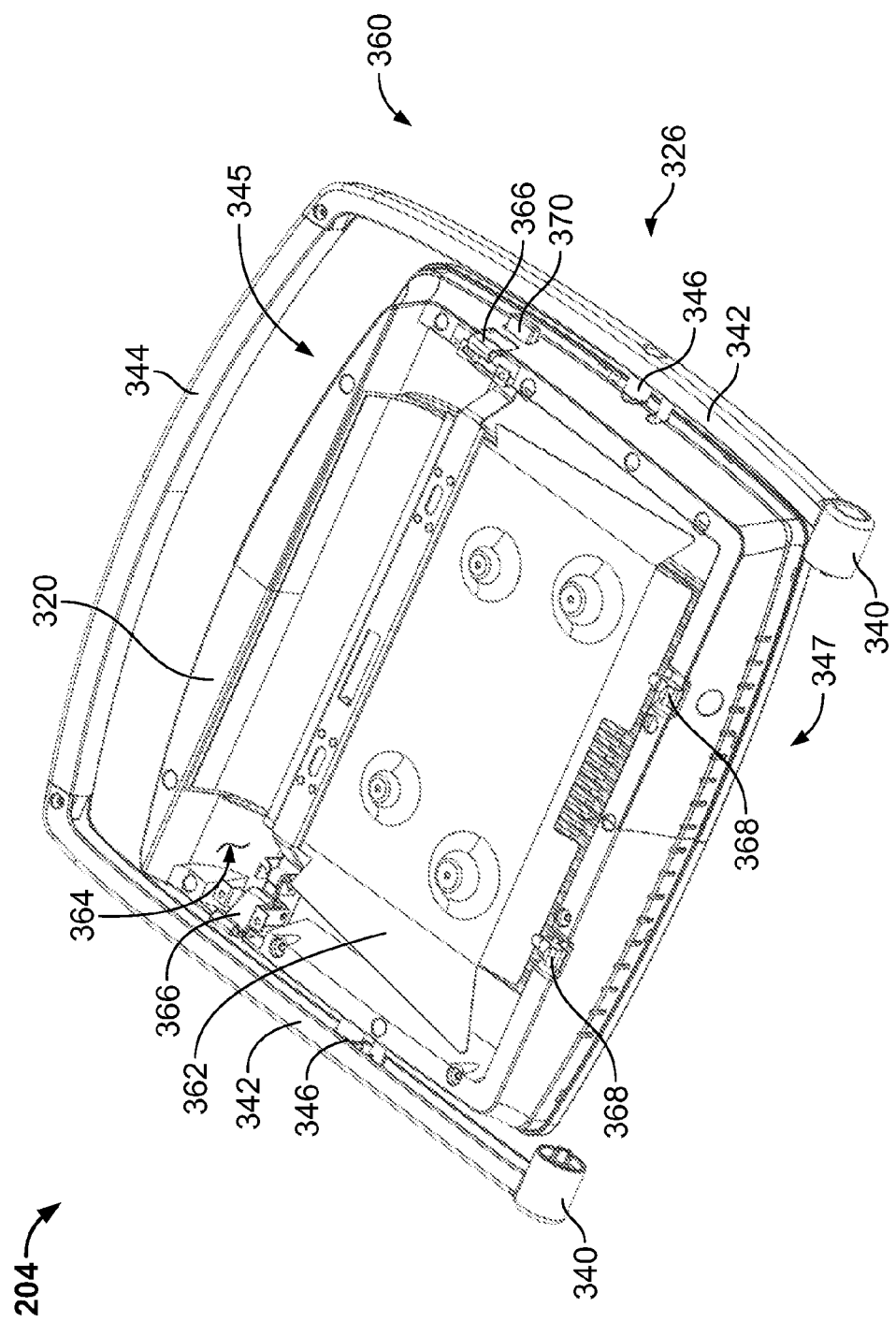
FIG. 20 is a perspective view of the top assembly, illustrating some components thereof.
Figure 21:
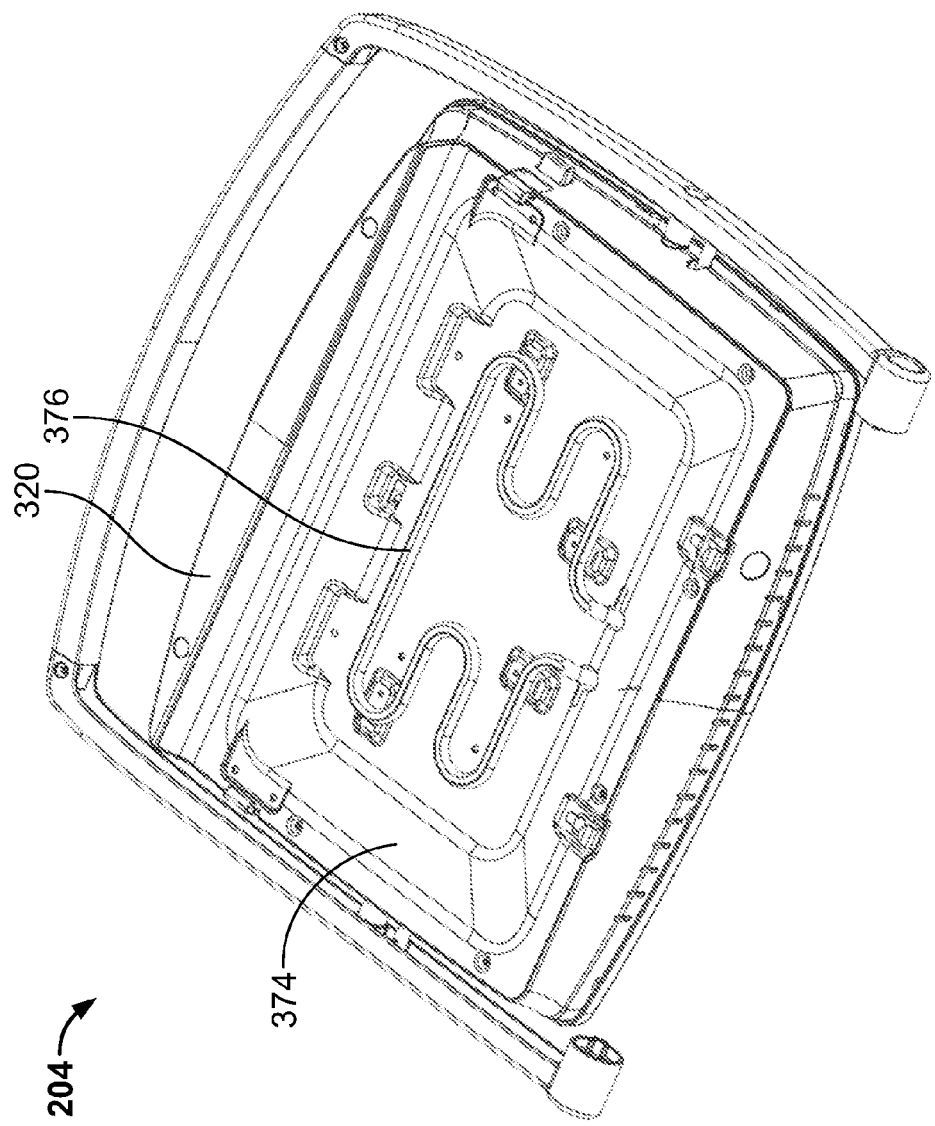
FIG. 21 is a perspective view of the top assembly, illustrating a top reflecting plate and a heating element.
Figure 22:
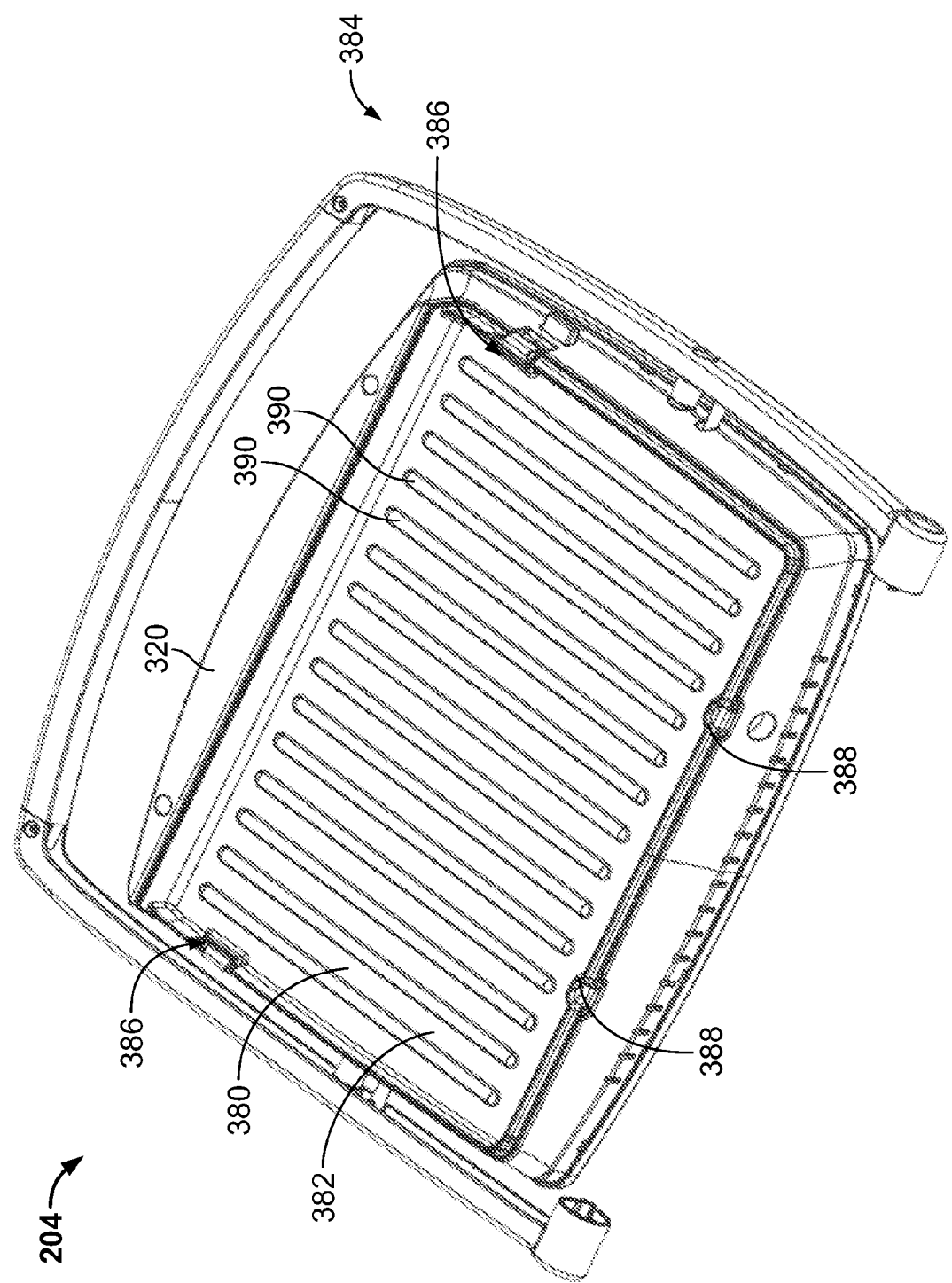
FIG. 22 is a perspective view of the top assembly, illustrating an example top cooking plate.

Referring to FIGS. 20-22, an example top assembly 204 is illustrated and described in more detail.

FIG. 20 is a perspective view of the top assembly 204, illustrating some components thereof. In some embodiments, the top assembly 204 includes a top cooking plate holding mechanism 360 and a top heat insulation panel 362 within a cavity 364 defined by the top housing 320.

The top cooking plate holding mechanism 360 is configured to removably secure a top cooking plate 380 (FIG. 22) to the top housing 320. In some embodiments, the top cooking plate holding mechanism 360 includes one or more first hooks 366 and one or more second hooks 368. In some embodiments, the first and second hooks 366 and 368 are arranged at the peripheral edges of the top housing 320 and spaced apart at desired distances to hold a top cooking plate 380 by snapping or clamping the edges of the top cooking plate 380. The first hooks 366 can be configured to operate by spring force while the second hooks 368 can be fixed to the top housing 320. In some embodiments, the first hooks 366 are actuated by a push button 370 to release the top cooking plate 380 from the top housing 320.

The top heat insulation panel 362 is used to insulate the components of the top assembly 204 from heat generated from a heating element 376 (FIG. 21) and a top cooking plate 380 (FIG. 22). In some embodiments, the top heating insulation panel 362 is received in the cavity 364 of the top housing 320 and disposed between the top housing 320 and a top reflecting plate 374 (FIG. 21). In particular, the top heating insulation panel 362 is disposed between the top heating element 376 and the control panel 324 to protect the control panel 324 and the control device 104 therein from heat.

FIG. 21 is a perspective view of the top assembly 204, illustrating a top reflecting plate 374 and a heating element 376.

The top reflecting plate 374 is received above the top heat insulation panel 362 within the cavity 364 of the top housing 320. The top reflecting plate 374 is configured to be shallow and has a substantially flat bottom segment and oblique side segments such that heat radiated downward or sideways from the heating element 376 is reflected toward the underside of a top cooking plate 380 (FIG. 22) in a more evenly distributed manner, thereby facilitating optimized heating of the top cooking plate 380.

The heating element 376 is disposed above the top reflecting plate 374 within the cavity 364 of the top housing 320 and beneath the top cooking plate 380 such that the heating element 376 is disposed therebetween. The heating element 376 is configured to be provided electrical power from the power supply module 262. Although the cooking appliance 102 is described herein to include one heating element 376, other embodiments of the cooking appliance 102 can include a plurality of heating elements 376 or the like.

FIG. 22 is a perspective view of the top assembly 204, illustrating an example top cooking plate 380.

The top cooking plate 380 is detachably mounted to the top housing 320 and configured to heat food items placed on the bottom cooking plate 212. The top cooking plate 380 can be configured similarly to the bottom cooking plate 212. In some embodiments, the top cooking plate 380 includes a heating surface 382 and a plate mounting mechanism 384.

The heating surface 382 provides a surface heated by the top heating element 376. In some embodiments, a food item placed on the bottom cooking plate 212 can contact the heating surface 382 as well as the food contact surface 290 of the bottom cooking plate 212. In other embodiments, the heating surface 382 of the top cooking plate 380 is arranged apart from the food item during cooking.

The plate mounting mechanism 384 operates to mount the top cooking plate 380 onto the top housing 320. The plate mounting mechanism 384 is configured to cooperate with the top cooking plate holding mechanism 360 of the top housing 320. In some embodiments, the plate mounting mechanism 384 includes one or more first shoulders 386 and one or more second shoulders 388. The first shoulders 386 are configured to engage the first hooks 366 of the top cooking plate holding mechanism 360, and the second shoulders 388 are configured to engage the second hooks 368 of the top cooking plate holding mechanism 360.

As such, the top cooking plate 380 is detachable from the top housing 320 for various purposes, such as cleaning. In some embodiments, the top cooking plate 380 can have various configurations on the heating surface 382 for different types of cooking. Various types of cooking plate 380 are interchangeably mounted on the top housing 320 for different types of cooking. For example, the top cooking plate 380 can be configured similarly to those as illustrated in FIGS. 10-14.

In some embodiments, the top cooking plate 380 is configured similarly to the bottom cooking plate 212. For example, when the bottom cooking plate 212 includes the plurality of ribs 298, the heating surface 382 of the top cooking plate 380 can include a plurality of ribs 390 corresponding to the ribs 298. In other embodiments, the top cooking plate 380 and the bottom cooking plate 212 are configured differently.

In some embodiments, the top assembly 204 is used without the top cooking plate 380 while the bottom assembly 202 is used with the bottom cooking plate 212. For example, it can be desirable to remove the top cooking plate 380 from the top housing 320 to perform a broiling function using the cooking appliance 102.

Although the cooking appliance 102 is described herein to include one top cooking plate 380, other embodiments of the cooking appliance 102 can include a plurality of top cooking plate 380 of the same or different kinds.

Figure 23:
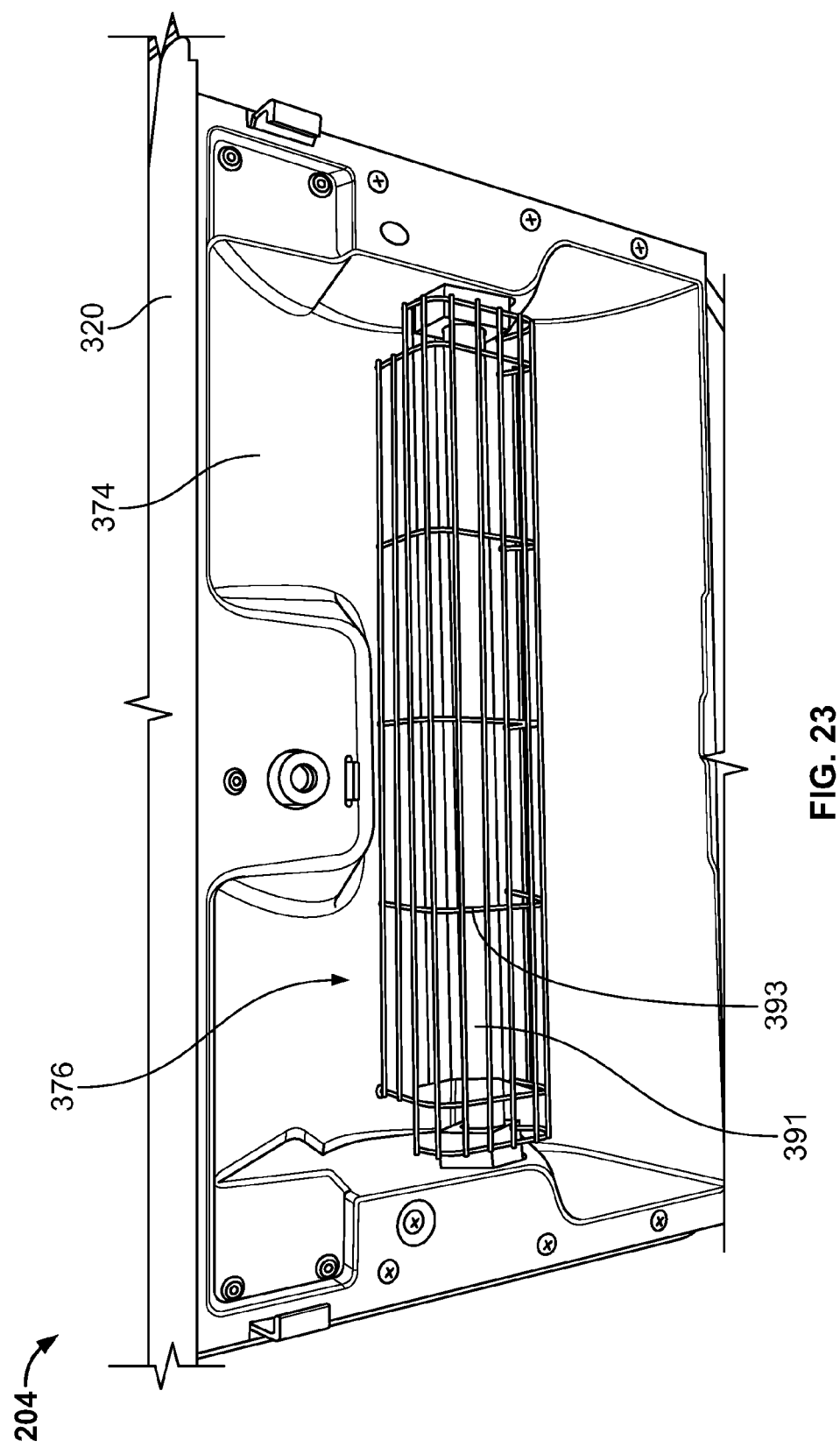
FIG. 23 illustrates another example of the top heating element of the top assembly.

FIG. 23 illustrates another example of the top heating element 376 of the top assembly 204. In this example, the top heating element 376 is configured as a quartz-type heating element including a quartz-type heating tube 391 and a guard 393 surrounding the heating tube 391. The heating tube 391 includes a filament extending therethrough and connected to electrical leads at both ends. As the filament is energized by passing current therethrough via the electrical leads, infrared energy is emitted from the filament toward a food item placed on the bottom cooking plate 212 of the bottom assembly 202.

The quartz-type heating element 376 of this example can be used either with or without the top cooking plate 380 attached to the top assembly 204. In some embodiments, the top assembly 204 uses the quartz-type heating element 376 without the top cooking plate 380 for broiling. In some embodiments, the appliance control device 104 can adjust a level of operating the heating element 376 depending on different cooking (e.g., broiling) options. For example, the heating element 376 can be selectively operated to be turned off, half-heated, or fully-heated. Such different operations of the heating element 376 can be selected by a user through the appliance control application 108 running on the user computing device 106, as illustrated below.

In other embodiments, the heating element 376 can be of any suitable type, such as a halogen-type heating element.

Figure 24:
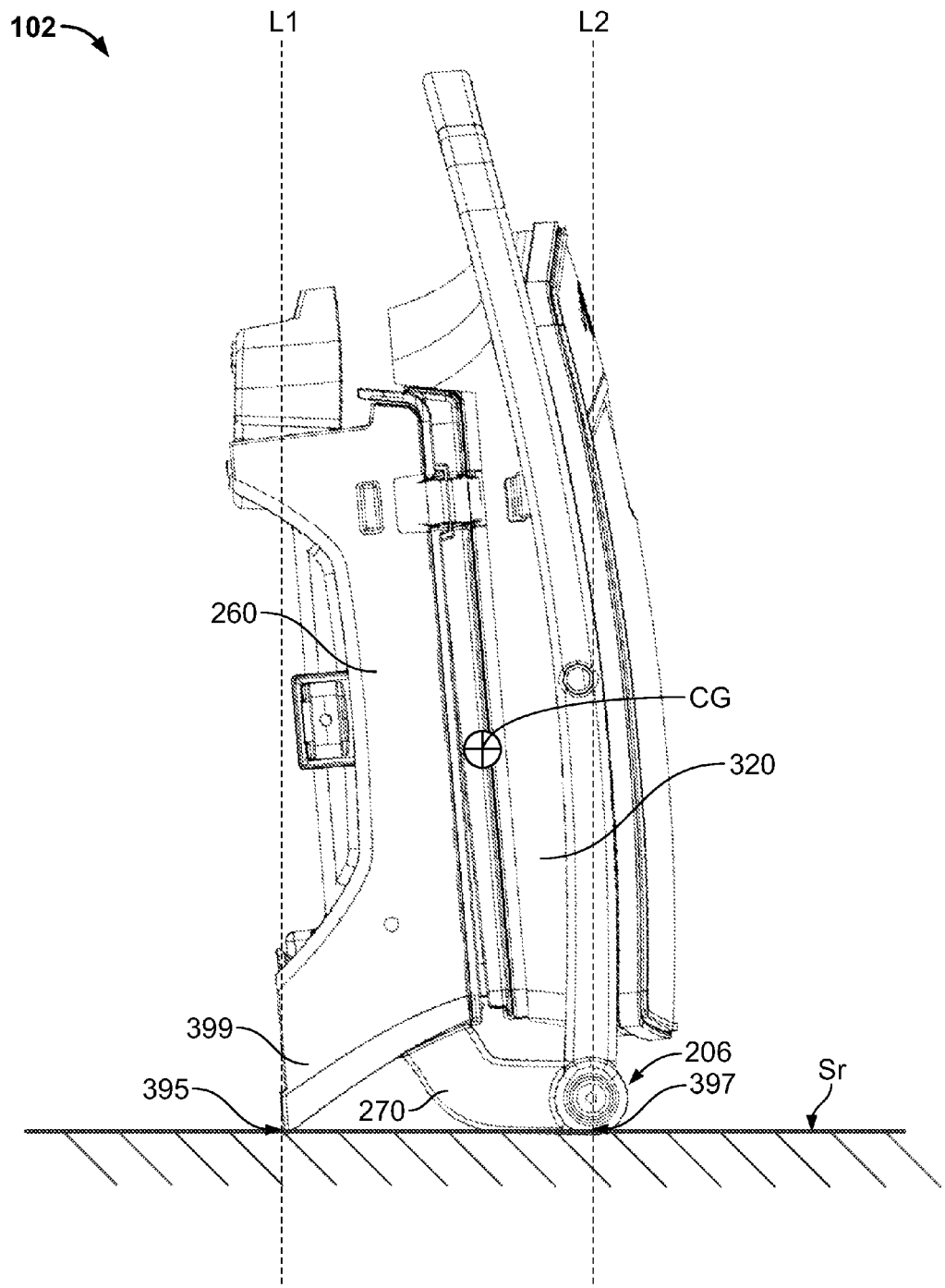
FIG. 24 illustrates the cooking appliance in a vertical position.

FIG. 24 illustrates the cooking appliance 102 in a vertical position. The cooking appliance 102 is configured to stand vertically alone when the cooking appliance 102 is in the closed position.

As illustrated, the cooking appliance 102 has two points 395 and 397 that contact a reference surface Sr when the cooking appliance 102 stands vertically against the reference surface Sr. In some embodiments, a first contact point 395 can be defined by a rearward foot 399 of the bottom housing 260 as the rearward foot 399 of the bottom housing 260 lies on the reference surface Sr. A second contact point 397 can be defined by the hinge assembly 206 and/or the bottom hinge portion 270 (e.g., a leg portion thereof) of the bottom housing 260 as the bottom housing 260 lies on the reference surface Sr. The cooking appliance 102 is configured such that a center of gravity CG of the cooking appliance is positioned between a first line L1 and a second line L2. The first line L1 is a line extending vertically to the reference surface Sr and passing the first contact point 395, and the first line L2 is a line extending vertically to the reference surface Sr and passing the second contact point 397.

Figure 25:
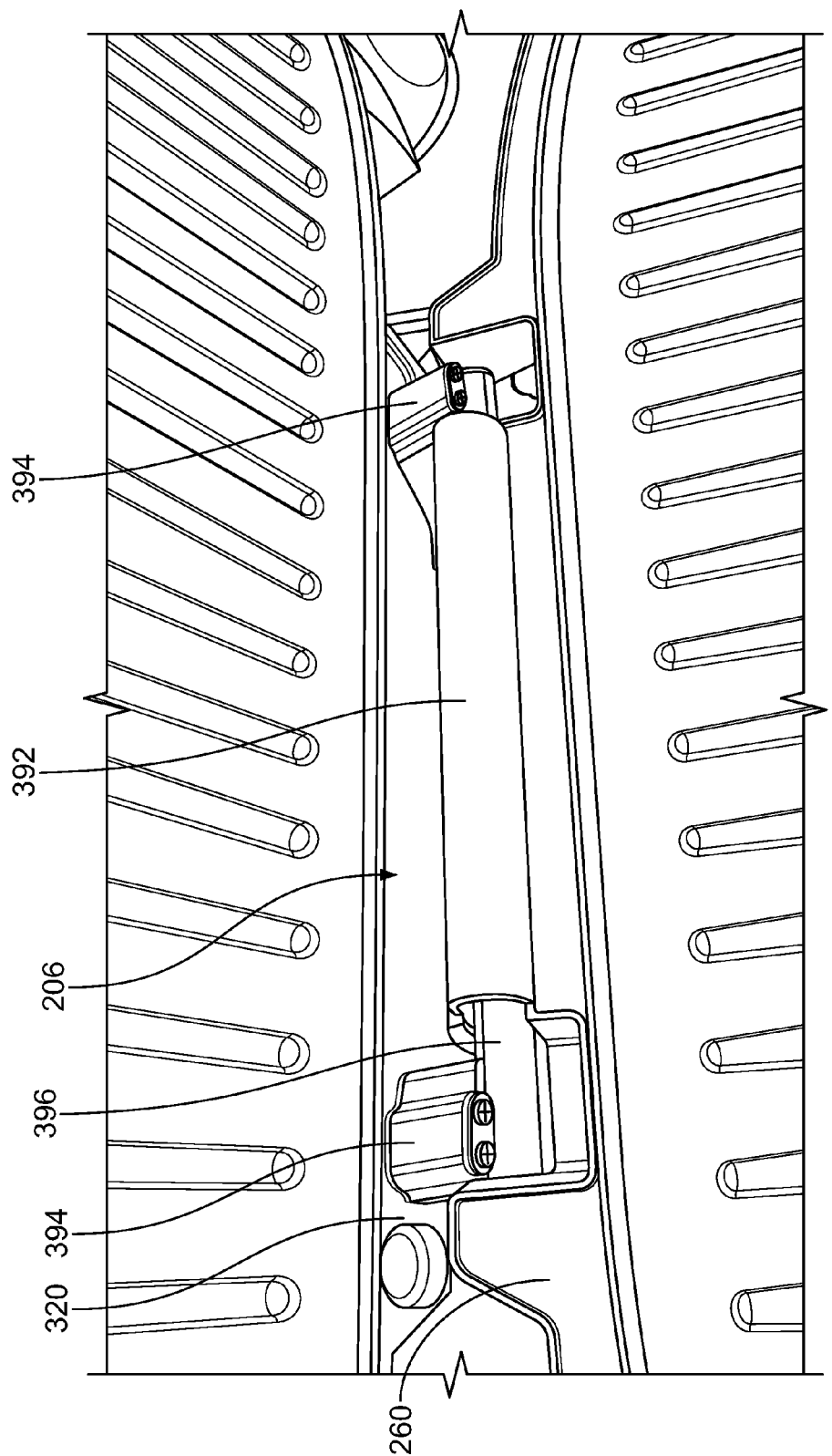
FIG. 25 is a top view of another example hinge assembly.
Figure 26:
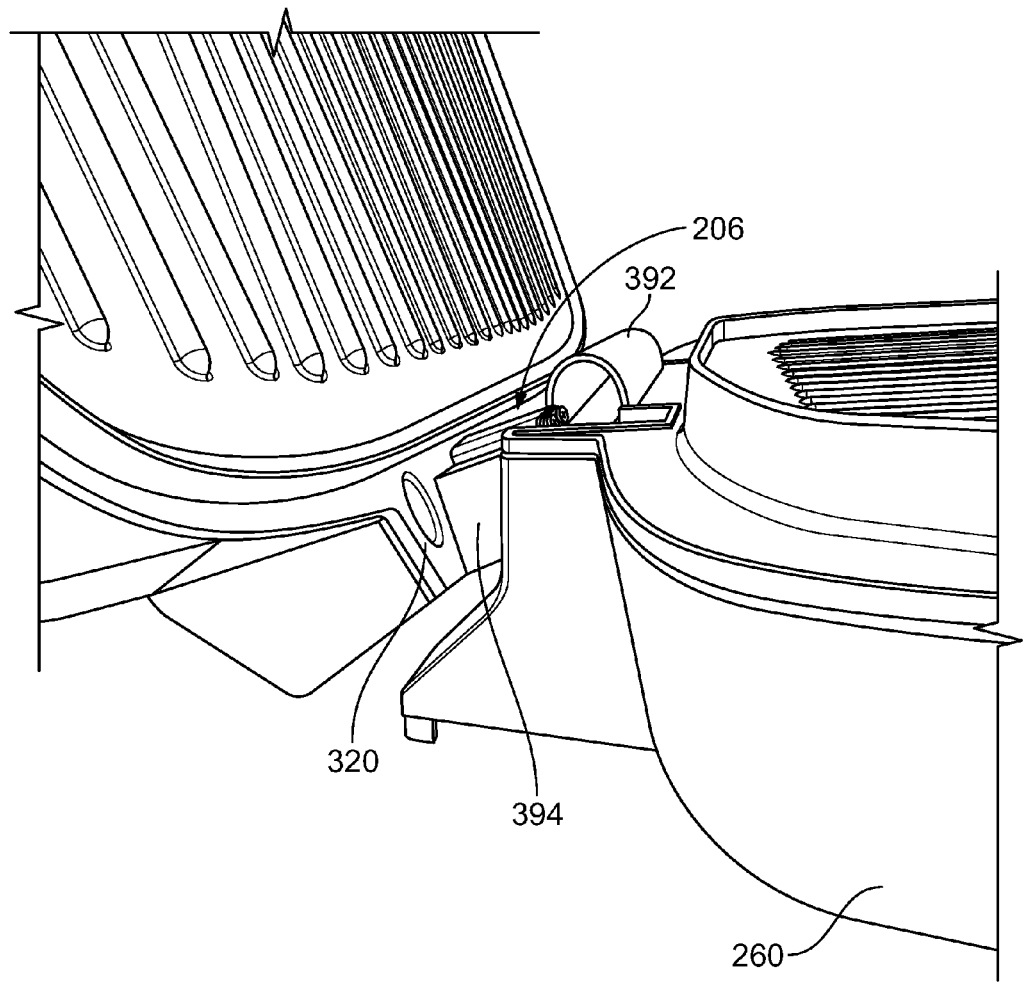
FIG. 26 is a side view of the hinge assembly of FIG. 25.

Referring to FIGS. 25 and 26, another example of the hinge assembly 206 is illustrated and described. In particular, FIG. 25 is a top view of another example hinge assembly 206, and FIG. 26 is a side view of the hinge assembly 206 of FIG. 25.

In this example, the hinge assembly 206 is configured to contain electrical cords wired between the top and bottom assemblies 202 and 204. For example, electrical cords connected between the power supply module 262 and the top heating element 376 and/or the control device 104 can be placed within the hinge assembly 206 and thus invisible from the outside of the cooking appliance 102.

In some embodiments, the hinge assembly 206 includes a bottom-side hinge channel 392, a pair of top-side hinge legs 394, and a top-side hinge bar 396.

The bottom-side hinge channel 392 is formed in the bottom housing 260 and configured to receive the top-side hinge bar 396. The bottom-side hinge channel 392 can also receive a slack of electrical cords extending from the power supply module 262.

The pair of top-side hinge legs 394 extends from the top housing 320 and defines a through-hole therein for receiving one or more electrical cords wired from the power supply module 262.

The top-side hinge bar 396 transversely extends between the pair of top-side hinge legs 394 and can be at least partially received within the bottom-side hinge channel 392. The top-side hinge bar 396 can pivot within the bottom-side hinge channel 392 as the top assembly 204 moves relative to the bottom assembly 202 between the closed and open positions. The top-side hinge bar 396 defines an elongate hole therewithin and in communication with the through-holes of the top-side hinge legs 394 for receiving the electrical cords. Further, the top-side hinge bar 396 can include an opening in communication with the elongate hole therein and the bottom-side hinge channel 392. Electrical cords extending from the power supply module 262 can enter elongate hole of the top-side hinge bar 396 through the opening thereof.

In the illustrated example of FIGS. 25 and 26, the hinge assembly 206 is configured for contact grill types. In other embodiments, the configurations of this example can apply to different types of hinge assemblies.

Figure 27:
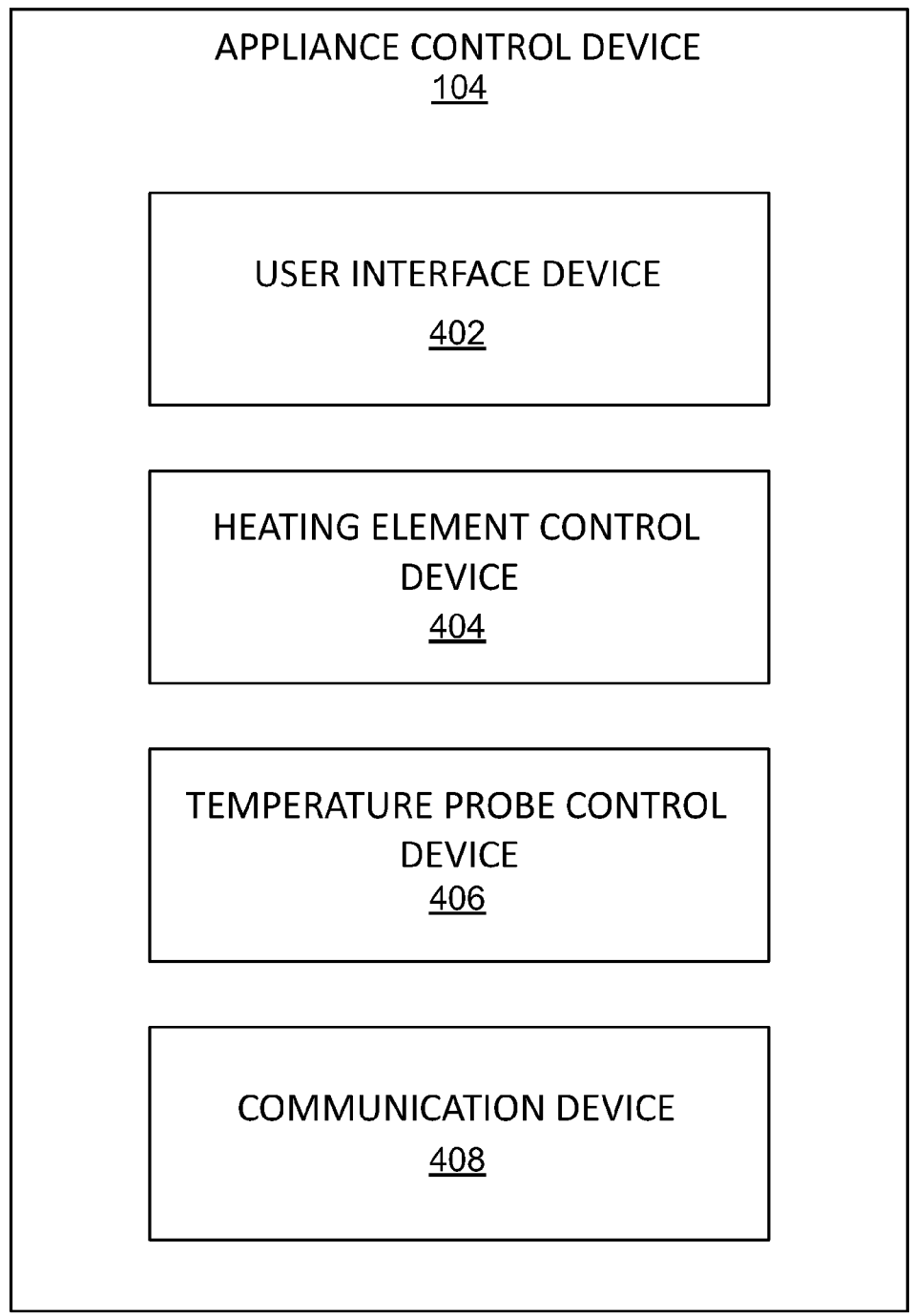
FIG. 27 illustrates example functional operations of an appliance control device.

FIG. 27 illustrates example functional operations of the appliance control device 104. In some embodiments, the appliance control device 104 includes a user interface device 402, a heating element control device 404, a temperature probe control device 406, and a communication device 408.

The user interface device 402 operates to control the control panel 324. In some embodiments, the user interface device 402 receives user inputs through the control panel 324 and displays various pieces of information (e.g., a temperature of the heating elements 288 and 376 and/or a temperature of the temperature probe assembly 218) on the control panel 324.

The heating element control device 404 operates to manage and control at least one of the heating elements 288 and 376. In some embodiments, the heating element control device 404 receives a temperature signal indicative of a temperature detected from the thermostat assembly 266 and determines a temperature of at least one of the heating elements 288 and 376 based upon the temperature signal. The heating element control device 404 can also receive user settings (e.g., cooking configuration data) input from the control panel 324 of the cooking appliance 102 and/or the user computing device 106. The heating element control device 404 can use the temperature signal and/or the user settings for controlling the cooking appliance 102 (e.g., the heating elements 288 and 376).

The temperature probe control device 406 operates to manage and control the temperature probe assembly 218. In some embodiments, the temperature probe control device 406 receives a temperature signal indicative of a temperature detected from the temperature probe assembly 218 and determines a temperature of the temperature probe assembly 218 based upon the temperature signal. The temperature probe control device 406 can use the temperature signal for controlling the cooking appliance (e.g., the heating elements 288 and 376).

The communication device 408 operates to communicate with the user computing device 106. In some embodiments, the communication device 408 receives various data (e.g., cooking configuration data including target cooking temperatures) from the user computing device 106, and transmits various pieces of information about the cooking appliance 102 (e.g., a current temperature determined based upon the temperature signals from the temperature probe assembly 218 and/or the thermostat assembly 266) to the user computing device 106, which can then process the information and display it to the user (U). One example of the communication device 408 employs a Wi-Fi network module, such as GS2100M module available from Gainspan Corporation (San Jose, Calif.). Other examples of the communication device 408 can use any other Wi-Fi modules or a group of electrical components that are designed to create a working certified or uncertified Wi-Fi module.

An example appliance control application 108 running on the user computing device 106 is illustrated and described more detail with reference to FIGS. 28-34.

Figure 28:
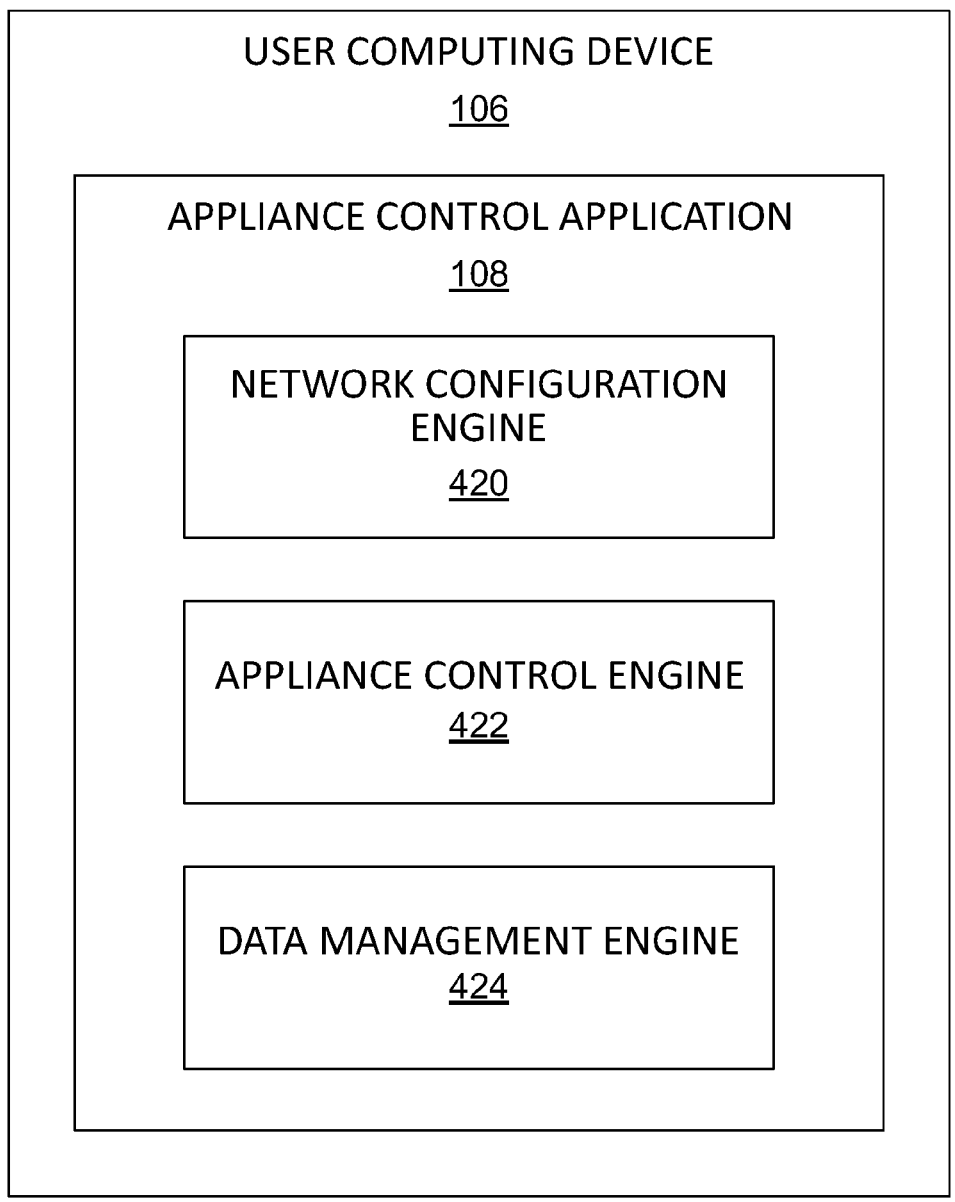
FIG. 28 illustrates an example functional operation of a user computing device executing an appliance control application.

FIG. 28 illustrates an example functional operation of the user computing device 106 executing the appliance control application 108. In some embodiments, the appliance control application 108 is configured to perform a network configuration engine 420, an appliance control engine 422, and a data management engine 424.

The network configuration engine 420 operates to establish a wireless connection between the cooking appliance 102 and the user computing device 106. An example operation of the network configuration engine 420 is illustrated and described with reference to FIG. 30.

The appliance control engine 422 operates to receive data (e.g., cooking configuration data including target cooking temperatures) from a user (U) through the user computing device 106, and control the cooking appliance 102 based upon the received data. The appliance control engine 422 also operates to receive data (e.g., a current temperature determined based upon the temperature signals from the temperature probe assembly 218 and/or the thermostat assembly 266) from the appliance control device 104 of the cooking appliance 102, and display the received data on the user computing device 106. An example operation of the appliance control engine 422 is illustrated and described with reference to FIGS. 31 and 32.

The data management engine 424 operates to manage data stored in the user computing device 106. In some embodiments, the data management engine 424 is configured to communicate a remote server computing device via a communications network to manage and update the data stored in the user computing device 106. For example, such data managed by the data management engine 424 include recipe information. The data management engine 424 can retrieve recipe data from the remote server computing device and transmit them to the user computing device 106. The data management engine 424 can also send data (e.g., customized recipe data) to the server computing device for storage or other types of management.

Figure 29:
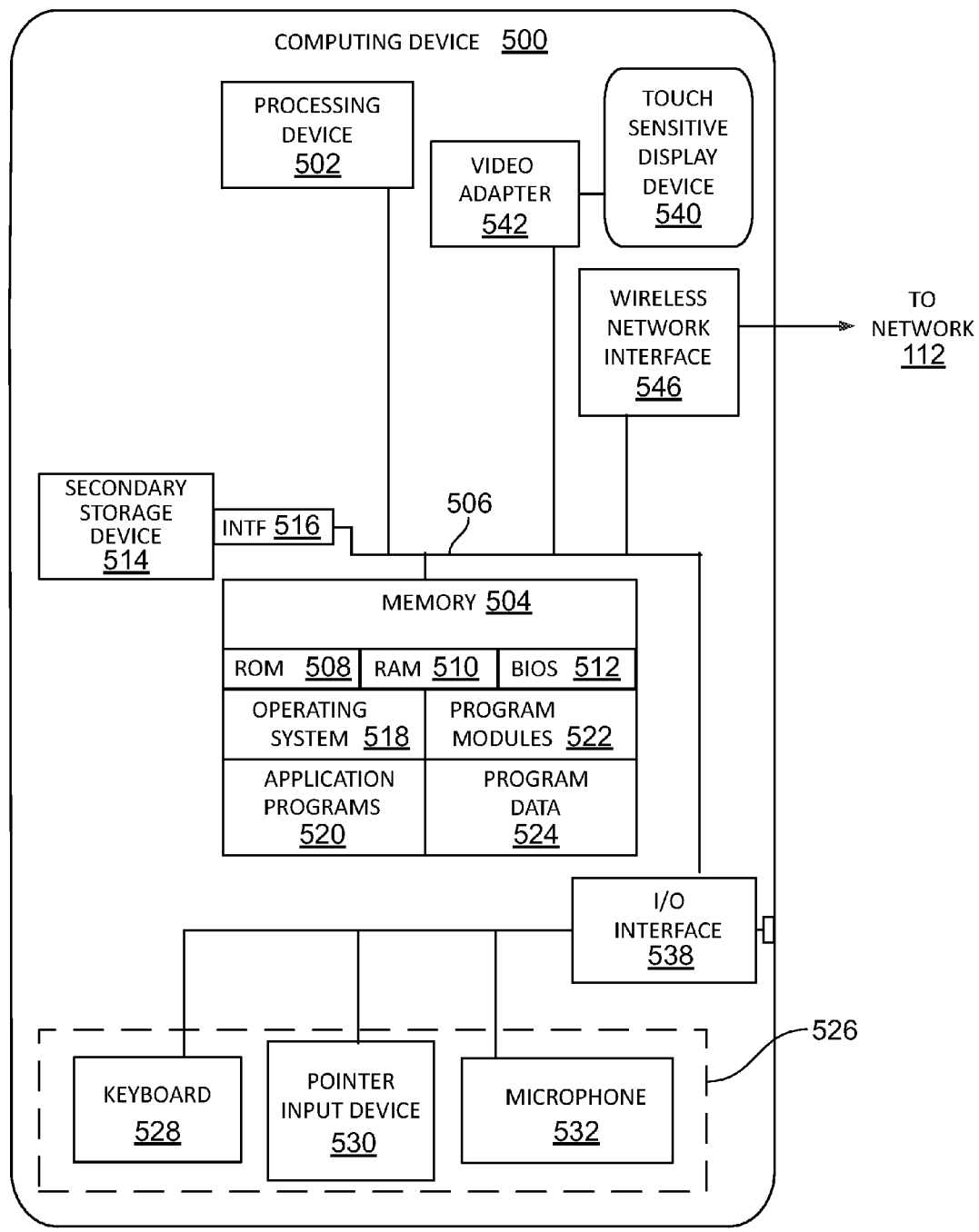
FIG. 29 illustrates an exemplary architecture of a computing device that can be used to implement aspects of the present disclosure.

FIG. 29 illustrates an exemplary architecture of a computing device that can be used to implement aspects of the present disclosure, including the user computing device 106, and will be referred to herein as the computing device 500. The computing device 500 illustrated in FIG. 29 is used to execute the operating system, application programs, and software modules (including the software engines) described herein.

The computing device 500 is a computing device of various types. In some embodiments, the computing device 500 is a mobile computing device. Examples of the computing device 500 as a mobile computing device include a mobile device (e.g., a smart phone and a tablet computer), a wearable computer (e.g., a smartwatch and a head-mounted display), a personal digital assistant (PDA), a handheld game console, a portable media player, a ultra-mobile PC, a digital still camera, a digital video camera, and other mobile devices. In other embodiments, the computing device 500 is other computing devices, such as a desktop computer, a laptop computer, or other devices configured to process digital instructions.

It is recognized that the architecture illustrated in FIG. 29 can also be implemented in other computing devices used to achieve aspects of the present disclosure. For example, the appliance control device 104 can be configured to employ at least part of the architecture of FIG. 29. To avoid undue repetition, this description of the computing device 500 will not be separately repeated herein for each of the other computing devices.

The computing device 500 includes, in some embodiments, at least one processing device 502, such as a central processing unit (CPU). A variety of processing devices are available from a variety of manufacturers, for example, Intel or Advanced Micro Devices. In this example, the computing device 500 also includes a system memory 504, and a system bus 506 that couples various system components including the system memory 504 to the processing device 502. The system bus 506 is one of any number of types of bus structures including a memory bus, or memory controller; a peripheral bus; and a local bus using any of a variety of bus architectures.

The system memory 504 includes read only memory 508 and random access memory 510. A basic input/output system 512 containing the basic routines that act to transfer information within the computing device 500, such as during start up, is typically stored in the read only memory 508.

The computing device 500 also includes a secondary storage device 514 in some embodiments, such as a hard disk drive, for storing digital data. The secondary storage device 514 is connected to the system bus 506 by a secondary storage interface 516. The secondary storage devices and their associated computer readable media provide nonvolatile storage of computer readable instructions (including application programs and program modules), data structures, and other data for the computing device 500.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media.

A number of program modules can be stored in secondary storage device 514 or memory 504, including an operating system 518, one or more application programs 520, other program modules 522, and program data 524.

In some embodiments, the computing device 500 includes input devices to enable a user to provide inputs to the computing device 500. Examples of input devices 526 include a keyboard 528, a pointer input device 530, a microphone 532, and a touch sensitive display 540. Other embodiments include other input devices. The input devices are often connected to the processing device 502 through an input/output interface 538 that is coupled to the system bus 506. These input devices 526 can be connected by any number of input/output interfaces, such as a parallel port, serial port, game port, or a universal serial bus. Wireless communication between input devices and interface 538 is possible as well, and includes infrared, BLUETOOTH® wireless technology, 802.11a/b/g/n, cellular, or other radio frequency communication systems in some possible embodiments.

In this example embodiment, a touch sensitive display device 540 is also connected to the system bus 506 via an interface, such as a video adapter 542. The touch sensitive display device 540 includes touch sensors for receiving input from a user when the user touches the display. Such sensors can be capacitive sensors, pressure sensors, or other touch sensors. The sensors not only detect contact with the display, but also the location of the contact and movement of the contact over time. For example, a user can move a finger or stylus across the screen to provide written inputs. The written inputs are evaluated and, in some embodiments, converted into text inputs.

In addition to the display device 540, the computing device 500 can include various other peripheral devices (not shown), such as speakers or a printer.

When used in a local area networking environment or a wide area networking environment (such as the Internet), the computing device 500 is typically connected to the network through a network interface, such as a wireless network interface 546. An example of a wireless network interface 546 is a Wi-Fi communication device (such as configured to communicate according to one of the IEEE 802.11 family of communication protocols) or a BLUETOOTH® communication device. Other possible embodiments use other communication devices. For example, some embodiments of the computing device 500 include an Ethernet network interface, or a modem for communicating across the network.

The computing device 500 typically includes at least some form of computer-readable media. Computer readable media includes any available media that can be accessed by the computing device 500. By way of example, computer-readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 500. Computer readable storage media does not include computer readable communication media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 29 is also an example of programmable electronics, which may include one or more such computing devices, and when multiple computing devices are included, such computing devices can be coupled together with a suitable data communication network so as to collectively perform the various functions, methods, or operations disclosed herein.

Figure 30:
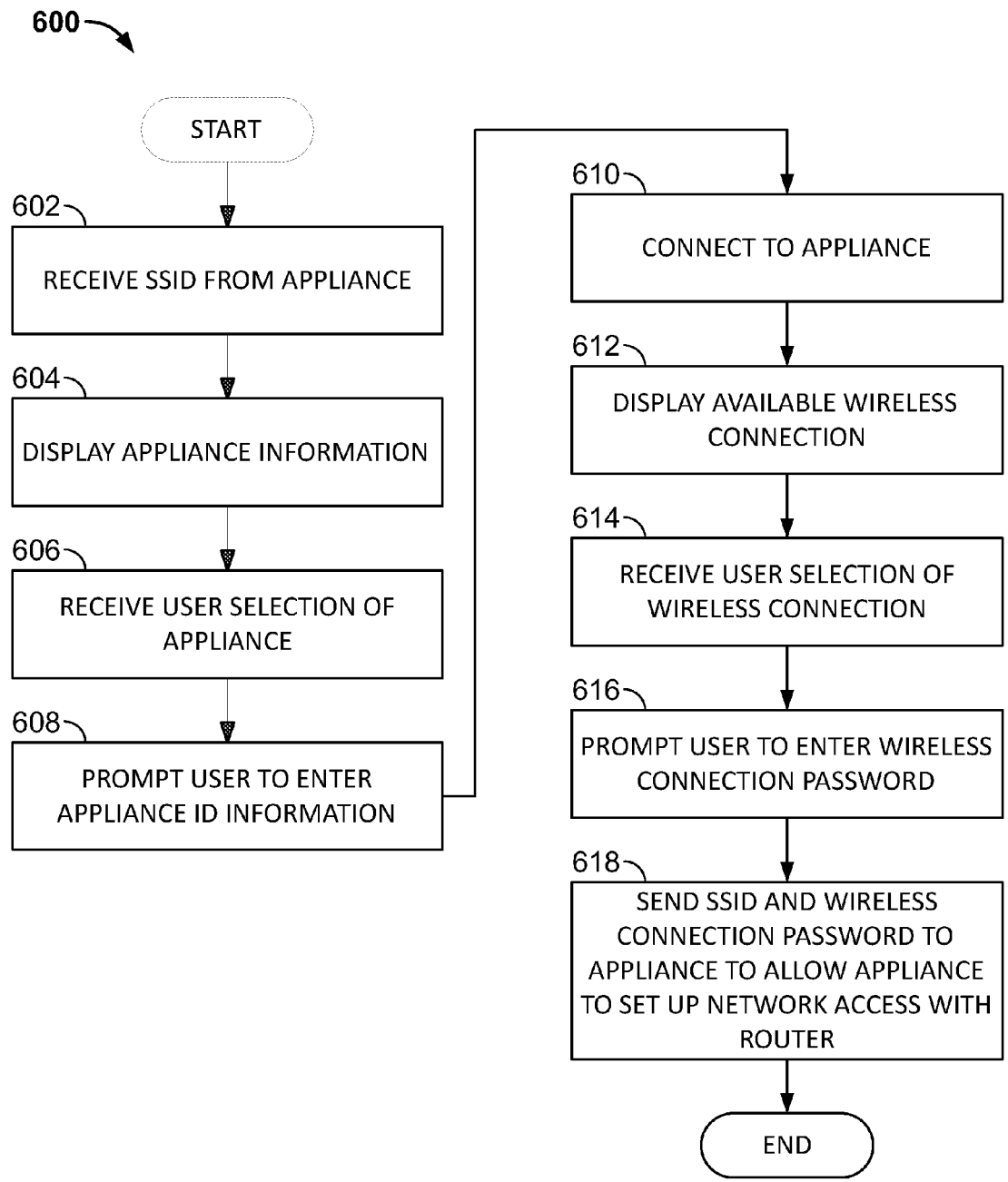
FIG. 30 is a flowchart illustrating an example method of operating a network configuration engine of the appliance control application.

FIG. 30 is a flowchart illustrating an example method 600 of operating the network configuration engine 420. In some embodiments, the method 600 includes operations 602, 604, 606, 608, 610, 612, 614, 616, and 618. The method 600 includes operations that are performed by one or more processors, such as the processing device 502 as illustrated in FIG. 29. In other embodiments, the method 600 includes only some of the operations or one or more additional operations. The operations can be performed in different orders in other embodiments.

In some embodiments, the method 600 is performed when a wireless connection is initially set up between the cooking appliance 102 and the user computing device 106 via the wireless network 112. Once a wireless connection has been initially established via the router 110, the user computing device 106 can be connected to the cooking appliance 102 via the router 110 without performing the method 600.

At the operation 602, the network configuration engine 420 receives a service set identifier (SSID) from the cooking appliance 102. The SSID may be entered by a user of the user computing device 106. Alternatively, the SSID may be broadcast or otherwise transmitted to the user computing device 106 by the cooking appliance 102. Although the method 600 is described in terms of establishing a connection between the cooking appliance 102 and the user computing device 106 using an SSID (e.g., for wireless communication using WiFi protocols), other embodiments use other or additional communication protocols such as BlueTooth® or ZigBee®. In those embodiments, an appropriate identifier for the communication protocol of the cooking appliance 102 is received by the user computing device 106.

At the operation 604, the network configuration engine 420 displays information about the cooking appliance 102 on the user computing device 106. The information about the cooking appliance 102 is determined based upon the SSID received from the cooking appliance 102.

At the operation 606, the network configuration engine 420 receives a user selection of the cooking appliance 102. Where there are multiple cooking appliances 102 detected by the user computing device 106, a list of available cooking appliances 102 is displayed on the user computing device 106 at the operation 604. A user (U) can select one of the displayed cooking appliances 102 through the user computing device 106.

At the operation 608, the network configuration engine 420 prompts the user to enter identification information about the selected cooking appliance 102. In some embodiments, the network configuration engine 420 displays a page asking for specific information identifying the selected cooking appliance 102. For example, the user can type in relevant identification information through the user computing device 106 as required. The identification information is information unique to the selected cooking appliance 102, such as a serial number. In some embodiments, the identification information is provided with the cooking appliance 102, and the user can find the information and enter the information through the user computing device 106. The operation 608 can ensure a secured connection between the cooking appliance 102 and the user computing device 106.

At the operation 610, the network configuration engine 420 operates to wirelessly connect to the cooking appliance 102 based upon the SSID received at the operation 602 and the identification information received at the operation 608.

At the operation 612, the network configuration engine 420 displays a list of wireless connections available between the cooking appliance 102 and the user computing device 106.

At the operation 614, the network configuration engine 420 receives a user selection of one of the available wireless connections. For example, the user can select the network 112 using the router 110 in the illustrated example of FIG. 1.

At the operation 616, the network configuration engine 420 prompts the user to enter a wireless connection password that has been set up in the network 112 via the router 110.

At the operation 618, the network configuration engine 420 sends a SSID of the user computing device 106 and the wireless connection password to the cooking appliance 102 to allow the cooking appliance 102 to set up a network access with the router 110. Once the network access has been set up with the router 110, the cooking appliance 102 and the user computing device 106 can communicate via the network 112 using the router 110.

In some embodiments, the cooking appliance 102 is configured to remain on even if the cooking appliance 102 and the user computing device 106 lose its connectivity. In other embodiments, the cooking appliance 102 is configured to be automatically turned off when a network connection is lost between the cooking appliance 102 and the user computing device 106.

Figure 31:
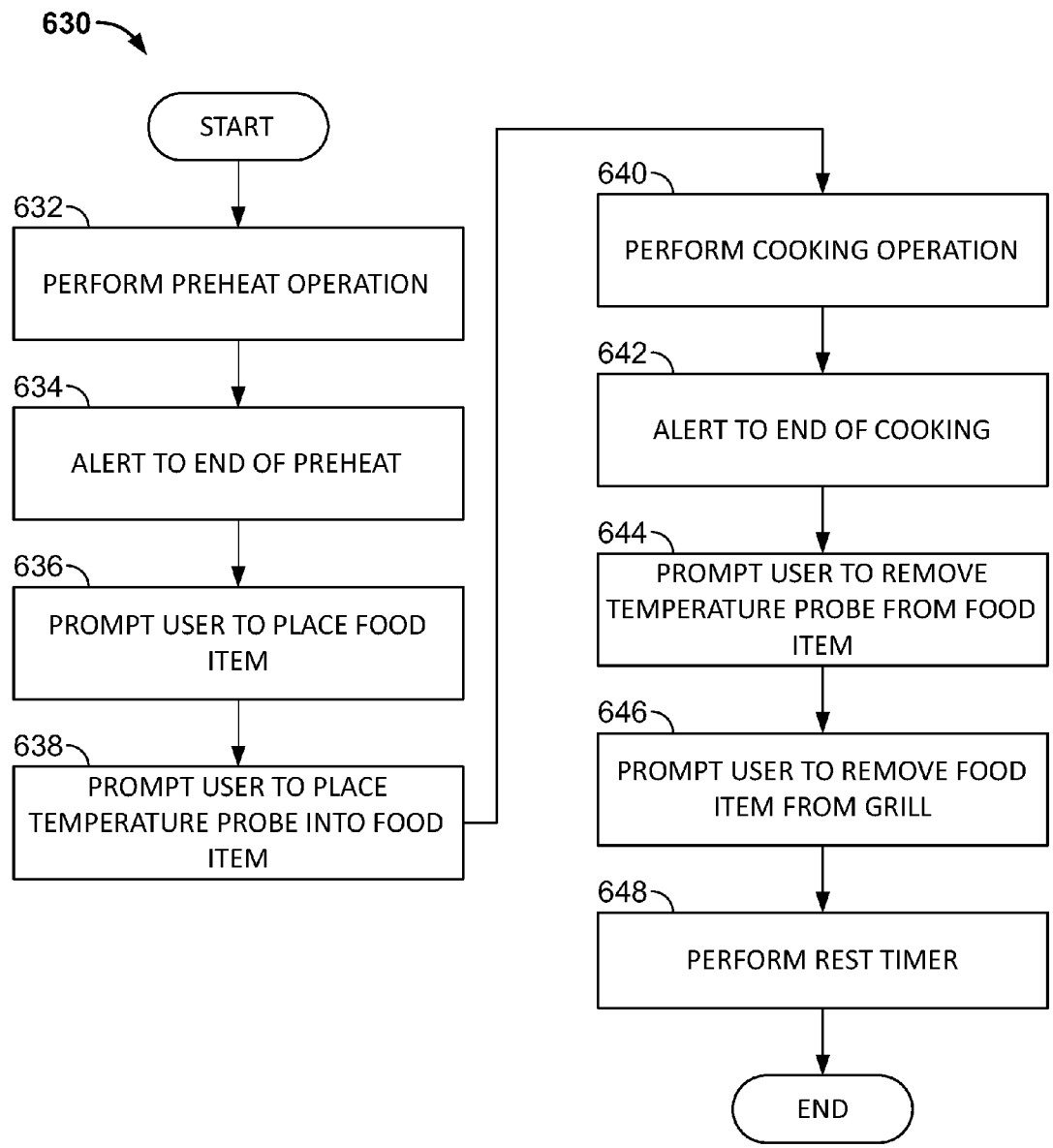
FIG. 31 is a flowchart illustrating an example method of operating an appliance control engine of the appliance control application.

FIG. 31 is a flowchart illustrating an example method 630 of operating the appliance control engine 422. In some embodiments, the method 630 includes operations 632, 634, 636, 638, 640, 642, 644, 646, and 648. The method 630 includes operations that are performed by one or more processors, such as the processing device 502 as illustrated in FIG. 29. In other embodiments, the method 630 includes only some of the operations or one or more additional operations. The operations can be performed in different orders in other embodiments.

At the operation 632, the appliance control engine 422 performs a preheat operation. For example, the appliance control engine 422 operates the cooking appliance 102 to heat the bottom cooking plate 212 and/or the top cooking plate 380 to a predetermined temperature before putting a food item to be cooked in the cooking appliance 102. An example preheat operation is illustrated and described in more detail with reference to FIG. 32.

At the operation 634, when the preheat operation ends, the appliance control engine 422 alerts a user that the preheat operation has completed. The alert can be of various types, including visual and/or audible notifications on the user computing device 106.

At the operation 636, the appliance control engine 422 prompts the user to place a food item in the cooking appliance 102. In some embodiments, the appliance control engine 422 displays a notice that asks the user to place a food item in the cooking appliance 102 and then provide a user selection of a cooking operation through the user computing device 106, as illustrated in FIG. 46.

At the operation 638, the appliance control engine 422 prompts the user to place the temperature probe assembly 218 into the food item as necessary.

At the operation 640, the appliance control engine 422 performs a cooking operation. In some embodiments, the appliance control engine 422 heats the food item until a temperature of the food item reaches a target cooking temperature automatically set for a particular type of food time or manually selected by the user.

At the operation 642, the appliance control engine 422 alerts a user that the cooking operation has completed. The alert can be of various types, including visual and/or audible notifications on the user computing device 106.

At the operation 644, the appliance control engine 422 prompts the user to remove the temperature probe assembly 218 from the food item. In some embodiments, the appliance control engine 422 displays a notice that asks the user to remove the temperature probe assembly 218 from the food item and then provide a user input through the user computing device 106 to verify that the temperature probe assembly 218 has been removed.

At the operation 646, the appliance control engine 422 prompts the user to remove the food item from the cooking appliance 102. In some embodiments, the appliance control engine 422 displays a notice that asks the user to remove the food item from the cooking appliance 102 and then provide a user input through the user computing device 106 to verify that the food item has been removed.

At the operation 648, the appliance control engine 422 performs a rest timer operation. The rest timer operation can be used to provide optimal food conditions for serving. In the rest timer operation, the appliance control engine 422 can provide a timer for measuring a preset time. The preset time is determined based upon types of food items. In some embodiments, the appliance control engine 422 displays a notice that asks the user to remove the food time from the cooking appliance 102 and rest the food time for a preset time before serving. The appliance control engine 422 measures the preset time (e.g., countdown the preset time) and alerts the user when the preset time passes.

Figure 32:
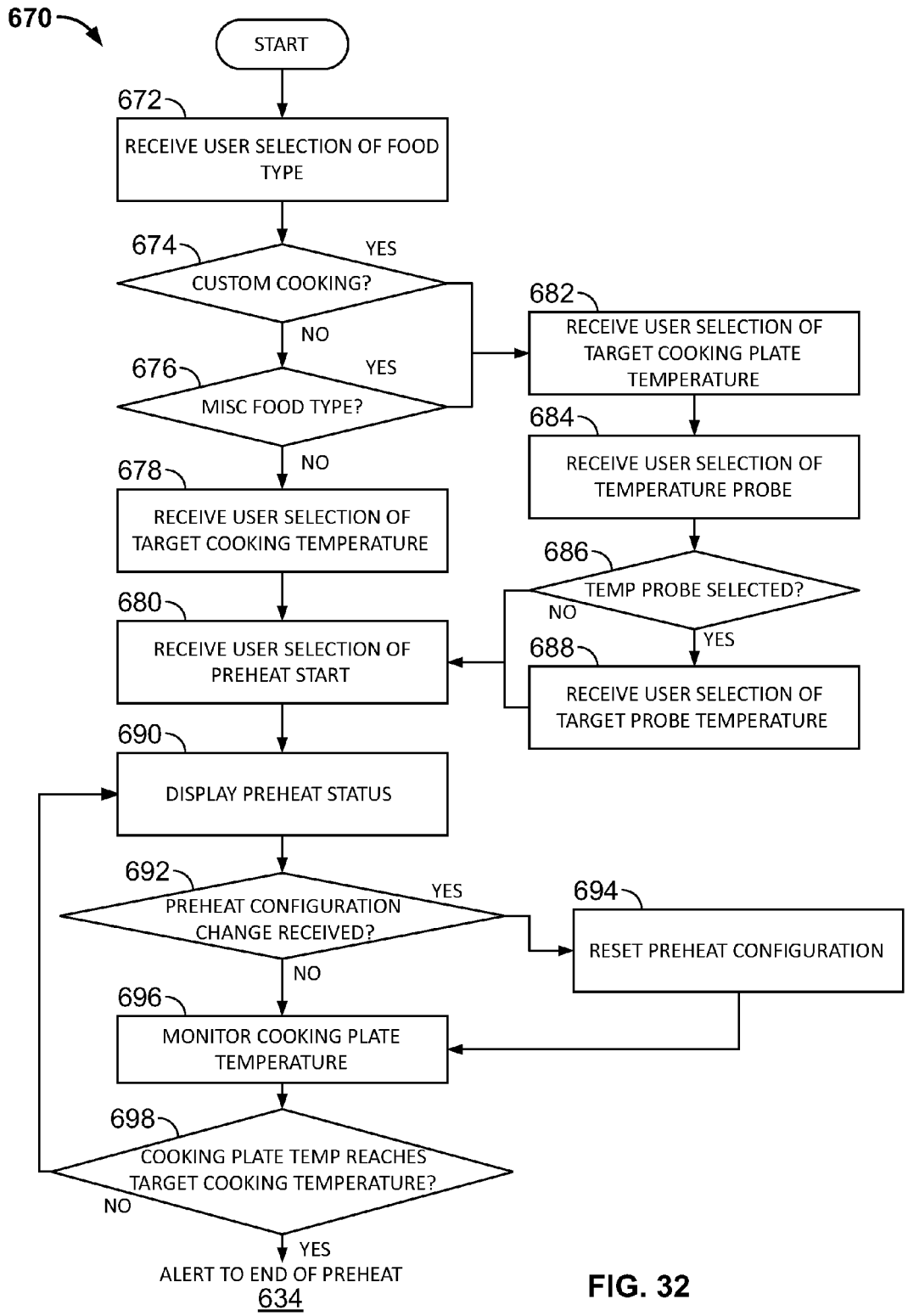
FIG. 32 is a flowchart illustrating an example method of performing a preheat operation with the user computing device.

FIG. 32 is a flowchart illustrating an example method 670 of performing the preheat operation with the user computing device 106 executing the appliance control application 108. In some embodiments, the method 670 includes operations 672, 674, 676, 678, 680, 682, 684, 686, 688, 690, 692, 694, 696, and 698. The method 670 includes operations that are performed by one or more processors, such as the processing device 502 as illustrated in FIG. 29. In other embodiments, the method 670 includes only some of the operations or one or more additional operations. The operations can be performed in different orders in other embodiments.

At the operation 672, the user computing device 106 (e.g., the appliance control engine 422 of the appliance control application 108 running on the user computing device 106) receives a user selection of a type of food item that the user wants to cook in the cooking appliance 102. At this operation, the user computing device 106 provides various cooking options. In some embodiments, the user computing device 106 is configured to perform either an automatic cooking mode or a manual cooking mode (also referred to herein as a custom cooking mode). In the automatic cooking mode, the user computing device 106 can display a list of preset food types and prompts the user to select one of them. In the manual cooking mode, the user can adjust cooking characteristics, such as a target cooking temperature, a target cooking plate temperature, and a target probe temperature.

In some embodiments, a target cooking temperature is defined as a temperature to which the user wants a cooking item to reach. A target cooking plate temperature can be defined as a temperature at which the user wants to heat and maintain the cooking plates while cooking. A target probe temperature can be defined as a temperature to which the user wants a temperature of the food item to reach. The temperature of the food item is monitored from the temperature probe assembly 218.

At the operation 674, the user computing device 106 determines whether a custom cooking mode is selected. If the custom cooking mode is selected ("YES" at the operation 674), the method 670 moves on to the operation ***. Otherwise ("NO" at the operation 674), the method 670 continues at the operation 676.

At the operation 676, the user computing device 106 determines whether a miscellaneous food type is selected. If a miscellaneous food type is selected ("YES" at the operation 674), the method 670 moves on to the operation 682. Otherwise ("NO" at the operation 674), the method 670 continues at the operation 678.

In some embodiments, a miscellaneous food type is designed to be used when a food item is difficult to be categorized in particular food types. For example, the miscellaneous food type can be used for a vegetarian food type, such as vegetables and vegetarian meals. In other embodiments, the miscellaneous food type can be used for food items that are too thin to insert the temperature probe assembly 218, such as sliced potatoes and onions.

At the operation 678, the user computing device 106 receives a user selection of a target cooking temperature. In some embodiments, the user computing device 106 displays various options that enable the user to enter a target cooking temperature. For example, the user can simply accept a preset cooking temperature associated with the type of food item selected at the operation 672. Alternatively, the user can adjust a degree of doneness for the selected type of food item, as illustrated in FIG. 39. The user computing device 106 can also provide an interface that enables the user to adjust a target cooking temperature as the user desires. Example displays of the user computing device 106 at the operation 678 are illustrated in FIGS. 39-44.

At the operation 680, the user computing device 106 receives a user selection of a preheat operation start. In some embodiments, the user computing device 106 displays a user-selectable button thereon that the user can select when the user wants to begin heating the cooking plates 212 and/or 380. An example of such a button is illustrated in FIGS. 39-44. When the user tabs the button on the user computing device 106, the user computing device 106 sends a command signal to the appliance control device 104 of the cooking appliance 102 so that at least one of the cooking plates 212 and 380 is heated based on the selected preheat configuration. For example, at least one of the cooking plates 212 and 380 is heated to the selected cooking temperature (e.g., the target cooking temperature or the target cooking plate temperature).

The operation 682 is performed from either the operation 674 or the operation 676. At the operation 682, the user computing device 106 receives a user selection of a target cooking plate temperature. In some embodiments, the user computing device 106 displays various user-selectable buttons thereon, such as those illustrated in FIGS. 43 and 44, so that the user selects or adjusts a target cooking plate temperature as desired.

At the operation 684, the user computing device 106 receives a user selection of using the temperature probe assembly 218. In some embodiments, the user computing device 106 displays a user-selectable button thereon, such as those illustrated in FIGS. 43 and 44, so that, by selecting the button, the user chooses to use the temperature probe assembly 218 to monitor a temperature of the food item while cooking.

At the operation 686, the user computing device 106 determines whether the temperature probe option is selected at the operation 684. If the temperature probe assembly 218 is selected to be used ("YES" at the operation 686), the method 670 moves on to the operation 688. Otherwise ("NO" at the operation 686), the method 670 returns to the operation 680.

At the operation 688, the user computing device 106 receives a user selection of a target probe temperature. In some embodiments, the user computing device 106 displays a user-selectable button thereon, such as those illustrated in FIGS. 43 and 44, so that the user selects or adjusts a target probe temperature as desired. As described above, a target probe temperature can be defined as a temperature to which the user wants a temperature of a food item to reach. As the temperature of the food item is monitored from the temperature probe assembly 218, the monitored temperature indicates a temperature inside the food item to which the temperature probe assembly 218 is inserted.

At the operation 690, the user computing device 106 displays a status of preheat operation. In some embodiments, the user computing device 106 shows a progress bar, as illustrated in FIG. 45, to visualize the progression of the preheat operation. The user computing device 106 can further display the currently-selected preheat configuration, such as the type of food item and the target cooking temperature selected as above. In other embodiments, the status of preheat operation can be represented in different manners.

At the operation 692, the user computing device 106 determines whether a user selection of changing the preheat configuration is received. In some embodiments, the user computing device 106 shows one or more user-selectable buttons that enable the user to change the currently-set preheat configuration. For example, the user can change the type of food item and/or the target temperature (e.g., the target cooking temperature, the target cooking plate temperature, and/or the target probe temperature). If the change is received ("YES" at the operation 692), the method 670 moves to the operation 694. Otherwise ("NO" at the operation 692), the method 670 continues on at the operation 696.

At the operation 694, the user computing device 106 operates to reset the preheat configuration based upon the user change received at the operation 692. For example, the target temperature and/or the type of food item are modified to accord with the change made at the operation 692. In some embodiments, the user computing device 106 sends a signal to the appliance control device 104 of the cooking appliance 102 so that at least one of the cooking plates 212 and 380 is heated based on the changed preheat configuration.

At the operation 696, the user computing device 106 monitors a temperature of at least one of the cooking plates 212 and 380. In some embodiments, the thermostat assembly 266 is used to monitor a temperature of the bottom cooking plate 212. The appliance control device 104 can receive a signal indicative of the cooking plate temperature and send it to the user computing device 106. In some embodiments, the user computing device 106 can then process and display the temperature information thereon.

At the operation 698, the user computing device 106 determines whether the cooking plate temperature has reached the target temperature. If the cooking plate temperature is determined to have reached the target temperature ("YES" at the operation 698), the method 670 continues on at the operation 634 and subsequent operations as illustrated in FIG. 31. Otherwise ("NO" at the operation 698), the method 670 returns to the operation 690 to continue the preheat operation.

Figure 33:
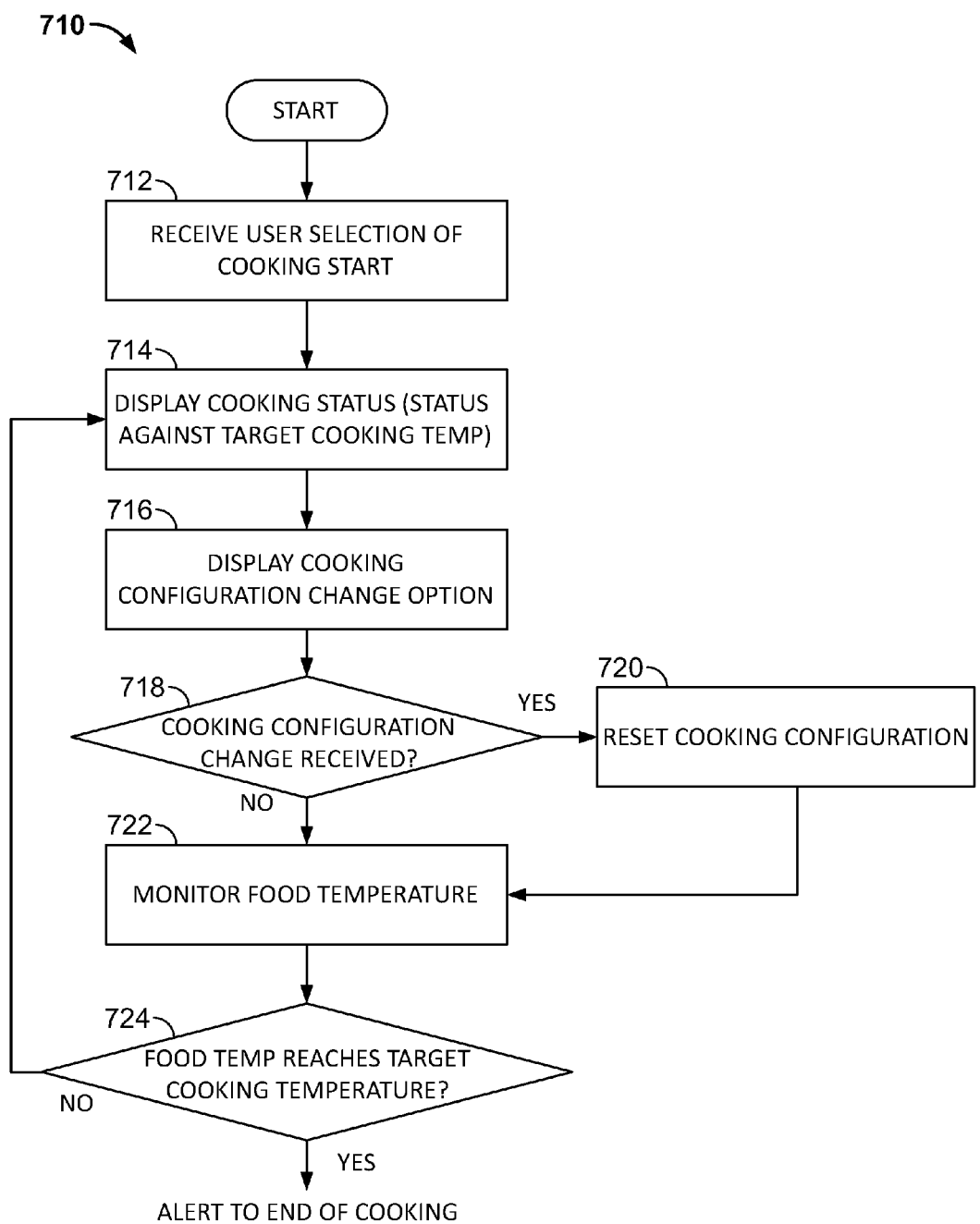
FIG. 33 is a flowchart illustrating an example method of performing a cooking operation with the user computing device.

FIG. 33 is a flowchart illustrating an example method 710 of performing the cooking operation with the user computing device 106 executing the appliance control application 108. In some embodiments, the method 710 includes operations 712, 714, 716, 718, 720, 722, and 724. The method 710 includes operations that are performed by one or more processors, such as the processing device 502 as illustrated in FIG. 29. In other embodiments, the method 710 includes only some of the operations or one or more additional operations. The operations can be performed in different orders in other embodiments.

At the operation 712, the user computing device 106 receives a user selection of a cooking operation start. In some embodiments, the user computing device 106 displays a user-selectable button thereon that the user can select when the user wants to begin cooking after placing a food item in the cooking appliance 102. An example of such a button is illustrated in FIG. 46. When the user tabs the button on the user computing device 106, the user computing device 106 sends a command signal to the appliance control device 104 of the cooking appliance 102 to maintain the temperature of at least one of the cooking plates 212 and 380 to heat the food item.

Figures 47, 48:
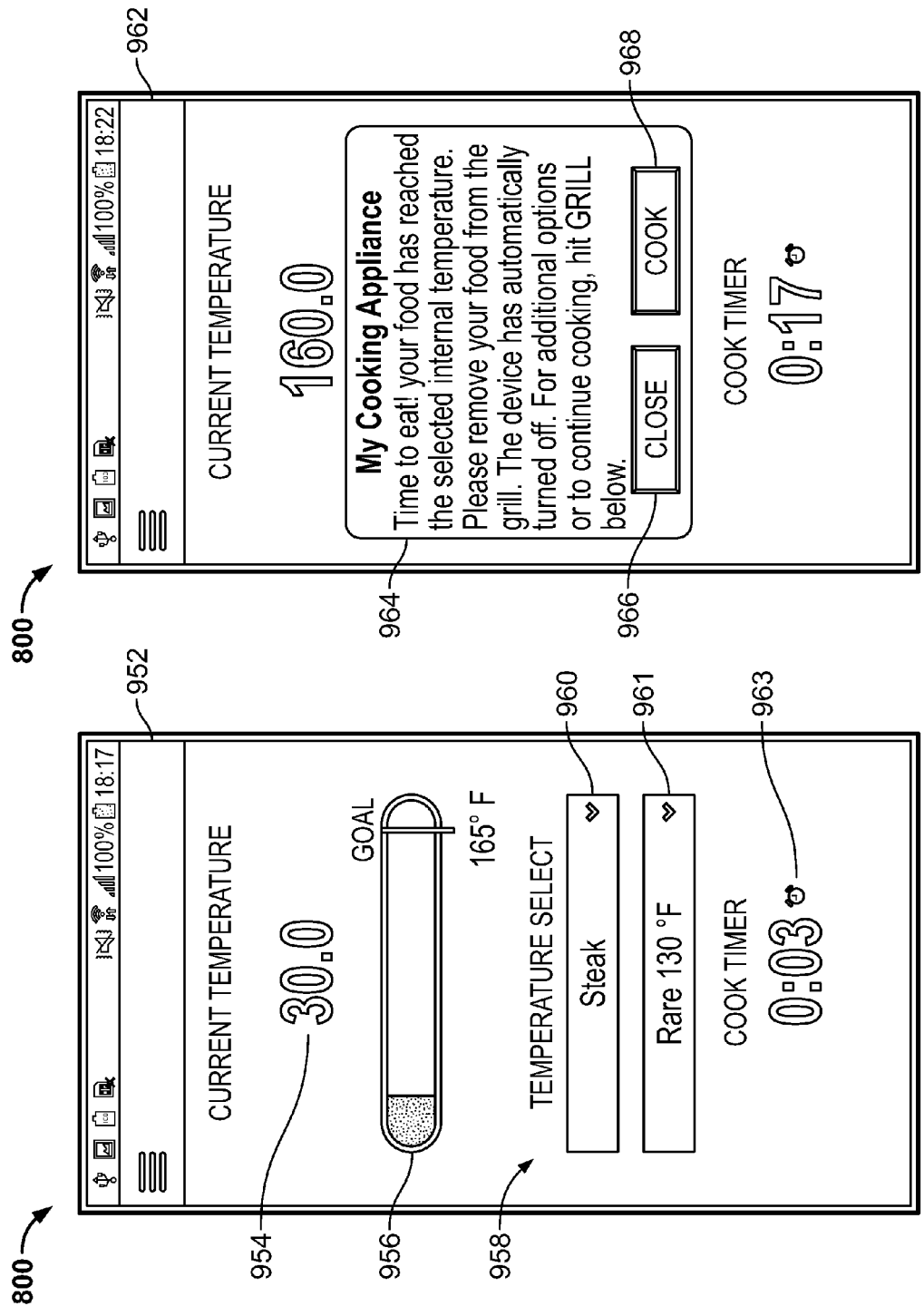
FIG. 47 is an example interface of the appliance control application that displays a cooking status page including a temperature selection snapshot.
FIG. 48 is an example interface of the appliance control application that displays a cooking end notification page including a continued cooking selection option.

At the operation 714, the user computing device 106 displays a status of cooking operation. In some embodiments, the user computing device 106 shows a progress bar, as illustrated in FIG. 47, to visualize the progression of the cooking operation. The user computing device 106 can further display the currently-selected cooking configuration, such as the current temperature (e.g., the current cooking plate temperature and/or the current probe temperature), the type of food item, and the target cooking temperature selected as above. In other embodiments, the status of preheat operation can be represented in different manners.

At the operation 716, the user computing device 106 displays one or more cooking configuration change options. In some embodiments, the user computing device 106 shows one or more user-selectable buttons that enable the user to change the currently-set cooking configuration. For example, the user can change the type of food item and/or the target temperature (e.g., the target cooking temperature, the target cooking plate temperature, and/or the target probe temperature).

At the operation 718, the user computing device 106 determines whether a user selection of changing the cooking configuration is received. If the change is received ("YES" at the operation 718), the method 710 moves to the operation 720. Otherwise ("NO" at the operation 718), the method 710 continues on at the operation 722.

At the operation 720, the user computing device 106 operates to reset the cooking configuration based upon the user change received at the operation 718. For example, the target temperature and/or the type of food item are modified to accord with the change made at the operation 718. In some embodiments, the user computing device 106 sends a signal to the appliance control device 104 of the cooking appliance 102 so that at least one of the cooking plates 212 and 380 is heated based on the changed cooking configuration.

At the operation 722, the user computing device 106 monitors a temperature of the food item. In some embodiments, the food temperature is monitored by the temperature probe assembly 218 inserted into the food item. In other embodiments, the food temperature is detected by the thermostat assembly 266 that is used to monitor a temperature of the bottom cooking plate 212. A predetermined algorithm can be used to calculate the food temperature based upon the temperature of the bottom cooking plate 212. Alternatively, the cooking plate temperature can be used as the food temperature in some embodiments, such as where a food item is small or thin enough to have a uniform temperature throughout the food item. In yet other embodiments, the food temperature can be monitored in various manners.

In this operation, the appliance control device 104 can receive a signal indicative of the food temperature and send it to the user computing device 106. In some embodiments, the user computing device 106 can then process and display the temperature information thereon.

At the operation 724, the user computing device 106 determines whether the food temperature has reached the target cooking temperature. If the food temperature is determined to have reached the target cooking temperature ("YES" at the operation 724), the method 710 continues on at the operation 642 and subsequent operations as illustrated in FIG. 31. Otherwise ("NO" at the operation 724), the method 710 returns to the operation 714 to continue the cooking operation.

In some embodiments, when the food temperature reaches the target cooking temperature, the cooking appliance 102 is configured to be automatically turned off.

Referring to FIGS. 34-49, an example interface 800 of the appliance control application 108 running on the user computing device 106.

FIG. 34 is an example interface 800 of the appliance control application 108 that displays a network configuration page 802 (including 802A and 802B). In some embodiments, the network configuration page 802 is operated by the network configuration engine 420. The network configuration page 802 is configured to enable a user to set up a communications network between the cooking appliance 102 and the user computing device 106. In some embodiment, the network configuration page 802 includes a first button 804 for looking up available cooking appliances 102 and a second button 806 for selecting one of the available cooking appliances 102. A first network configuration page 802A shows no cooking appliance 102 is found to be available or added by a user. A second network configuration page 802B shows a list of available cooking appliances 102 ("Cooking Appliance A" in the illustrated example) when such cooking appliances 102 are detected. The user can select the available cooking appliance 102 to establish a network connection as illustrated in FIG. 30.

Figures 35, 36:
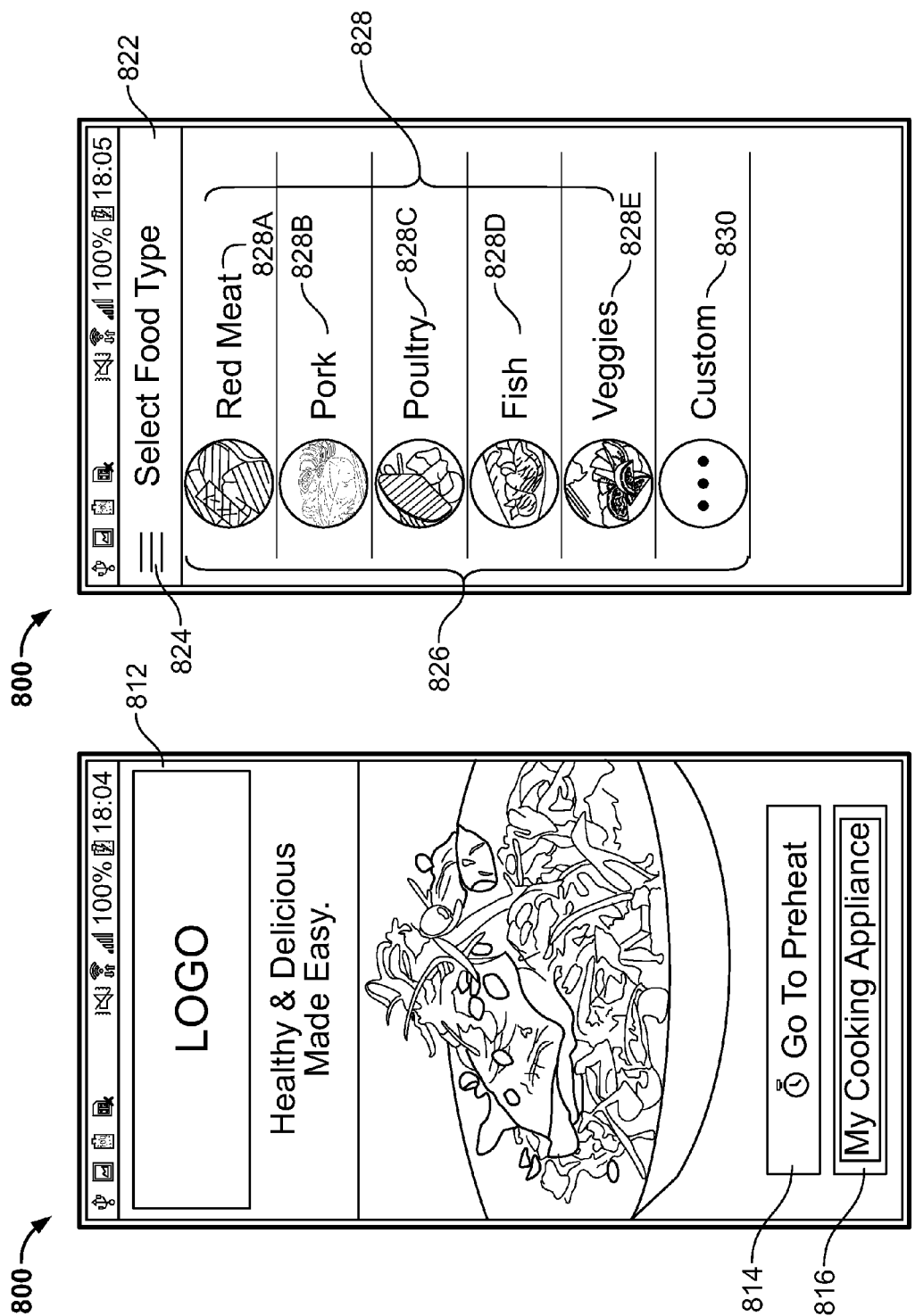
FIG. 35 is an example interface of the appliance control application that displays a home screen page.
FIG. 36 is an example interface of the appliance control application that displays a preheat operation page.

FIG. 35 is an example interface 800 of the appliance control application 108 that displays a home screen page 812. In some embodiments, the home screen page 812 includes a preheat operation button 814 and a button 816 for other functions.

The preheat operation button 814, when selected, causes the appliance control application 108 to display a preheat operation page 822 as illustrated in FIG. 45.

The button 816 for other functions, when selected, causes the appliance control application 108 to display various pieces of information thereon, as illustrated in FIG. 37.

FIG. 36 is an example interface 800 of the appliance control application 108 that displays a preheat operation page 822. The preheat operation page 822 can display various food selection options prior to a preheat configuration page (e.g., pages 862, 872, 882, 892, 902, and 922) and a preheat operation status page (e.g., page 932). In some embodiments, the preheat operation page 822 includes a menu option button 824 and a list of cooking modes 826.

The menu option button 824, when selected, causes the appliance control application 108 to display a list of different menu items that a user can select as necessary. An example of the menu items is illustrated in FIG. 38.

The list of cooking modes 826 provides different cooking modes available for the cooking appliance 102. A user can select one of the cooking modes as desired. In some embodiments, the cooking modes are preset and stored in the user computing device 106. In other embodiments, various cooking modes can be downloaded from a remote server computing device when the user computing device 106 is available for data communications with the server computing device. In yet other embodiments, various cooking modes are created or modified from existing cooking modes by a user through the user computing device 106.

In some embodiments, the list of cooking modes 826 includes an automatic cooking mode and a manual cooking mode. In the automatic cooking mode, the appliance control application 108 prompts a user to select one of preset food item types, and then the user computing device 106 sends a signal to the appliance control device 104 of the cooking appliance 102 to enable the appliance control device 104 to operate the cooking appliance 102 based upon a predetermined cooking configuration for the selected food item type. In the illustrated example, when a user selects one of food types 828 listed in the page 822, the automatic cooking mode is executed and the cooking appliance 102 is operated with a cooking configuration (e.g., a target cooking temperature and a cooking time) preset for the selected food type. In some embodiments, example food types 828 in the automatic cooking mode include red meat 828A, pork 828B, poultry 828C, fish 828D, and vegetarian food items 828E. Examples of preset cooking configurations for each food type are illustrated and described with reference to FIGS. 36-41.

In the manual cooking mode, the appliance control application 108 prompts a user to configure a cooking configuration as the user desires. In the illustrated example, when a user selects a custom cooking 830, the manual cooking mode is executed and the cooking appliance 102 is operated based upon a cooking configuration (e.g., a target cooking temperature, a target probe temperature, a target cooking plate temperature, and a cooking time) selected and adjusted by the user. An example of the manual cooking mode is illustrated and described in more detail with reference to FIG. 43.

In some embodiments, the appliance control application 108 provides a searing mode in which the cooking appliance 102 is operated to sear a food item in a predetermined manner depending on the type of food item.

FIG. 37 is an example interface 800 of the appliance control application 108 that displays a recipe information page 832. In some embodiments, the recipe information page 832 is brought up when the button 816 in the home screen page 812 is selected by a user.

In some embodiments, the recipe information page 832 is configured to show different recipes stored in the user computing device 106. In some embodiments, the recipe information can be preset and stored in the user computing device 106. In other embodiments, data including recipe information can be transmitted from a remote server computing device when a data communications network is established between the user computing device 106 and the server computing device. The recipe information can be modified by a user and saved in the user computing device 106 and/or any server computing device.

FIG. 38 is an example interface 800 of the appliance control application 108 that displays a menu page 842. In some embodiments, the menu page 842 is brought up when the menu option button 824 is selected by a user.

The menu page 842 provides various functional options that a user can select. In some embodiments, the menu page 842 includes a preheat and cooking operation button 844 and a recipe information button 846. The preheat and cooking operation button 844, when selected, causes the appliance control application 108 to execute the preheat operation and/or the cooking operation. The recipe information button 846, when selected, causes the appliance control application 108 to display various recipes on the interface 800. Other embodiments of the menu page 842 can include other options associated with use of the cooking appliance 102.

FIG. 39 is an example interface 800 of the appliance control application 108 that displays a red meat food type page 862. In some embodiments, the red meat food type page 862 is brought up when the red meat button 828A is selected by a user.

In the red meat food type page 862, a target cooking temperature can be adjusted by selecting a level of doneness, such as very rare, rare, medium rare, medium, well, and very well done. In some embodiments, each of different levels of doneness is associated with different cooking temperatures. In the illustrated example, the level of doneness can be selected by sweeping gesture 864.

Further, the red meat food type page 862 includes a cooking temperature selection button 866. A user can manually adjust a target cooking temperature by sliding gesture 868 along the cooking temperature selection button 866.

The red meat food type page 862 can include a preheat start button 870 that, when selected, causes the appliance control application 108 to start the preheat operation.

FIG. 40 is an example interface 800 of the appliance control application 108 that displays a pork food type page 872. In some embodiments, the pork food type page 872 is brought up when the pork button 828B is selected by a user.

In the pork food type page 872, a target cooking temperature is preset and recommended to a user. The pork food type page 872 includes a cooking temperature selection button 874. When a user wants to adjust a target cooking temperature differently from the recommended one, the user can manually adjust a target cooking temperature by sliding gesture 876 along the cooking temperature selection button 874.

The pork food type page 872 can include a preheat start button 878 that, when selected, causes the appliance control application 108 to start the preheat operation.

FIG. 41 is an example interface 800 of the appliance control application 108 that displays a poultry food type page 882. In some embodiments, the poultry food type page 882 is brought up when the poultry button 828C is selected by a user.

In the poultry food type page 882, a target cooking temperature is preset and recommended to a user. The poultry food type page 882 includes a cooking temperature selection button 884. When a user wants to adjust a target cooking temperature differently from the recommended one, the user can manually adjust a target cooking temperature by sliding gesture 886 along the cooking temperature selection button 884.

The poultry food type page 882 can include a preheat start button 888 that, when selected, causes the appliance control application 108 to start the preheat operation.

FIG. 42 is an example interface 800 of the appliance control application 108 that displays a fish food type page 892. In some embodiments, the fish food type page 892 is brought up when the fish button 828D is selected by a user.

In the fish food type page 892, a target cooking temperature is preset and recommended to a user. The fish food type page 892 includes a cooking temperature selection button 894. When a user wants to adjust a target cooking temperature differently from the recommended one, the user can manually adjust a target cooking temperature by sliding gesture 896 along the cooking temperature selection button 894.

The fish food type page 892 can include a preheat start button 898 that, when selected, causes the appliance control application 108 to start the preheat operation.

FIG. 43 is an example interface 800 of the appliance control application 108 that displays a miscellaneous food type page 902. In some embodiments, the miscellaneous food type page 902 is brought up when the vegetarian food items button 828E is selected by a user.

In some embodiments, a miscellaneous food type is designed to be used when a food item is difficult to be categorized in particular food types. For example, the miscellaneous food type can be used for a vegetarian food type, such as vegetables and vegetarian meals. In other embodiments, the miscellaneous food type can be used for food items that are too thin to insert the temperature probe assembly 218, such as sliced potatoes and onions.

In some embodiments, the miscellaneous food type page 902 includes a target cooking plate temperature selection button 904. A user can manually adjust a target cooking plate temperature by sliding gesture 906 along the cooking plate temperature selection button 904.

The miscellaneous food type page 902 can include a probe selection button 908. When a user selects the probe selection button 908, the temperature probe assembly 218 is used to monitor a temperature of a food item through which the temperature probe assembly 218 is inserted.

In some embodiments, the miscellaneous food type page 902 includes a target probe temperature selection button 910. A user can manually adjust a target probe temperature of the temperature probe assembly 218 by sliding gesture 912 along the target probe temperature selection button 910. The temperature of a food item monitored by the temperature probe assembly 218 is used to verify that the internal temperature of the food item has reached the target probe temperature.

The miscellaneous food type page 902 can include a preheat start button 914 that, when selected, causes the appliance control application 108 to start the preheat operation.

FIG. 44 is an example interface 800 of the appliance control application 108 that displays a manual cooking mode page 922. In some embodiments, the manual cooking mode page 922 is brought up when the custom cooking 830 is selected by a user.

In some embodiments, the manual cooking mode page 922 is configured similarly to the miscellaneous food type page 902. Therefore, the same reference numbers are used in FIGS. 43 and 44 to the extent available, and the description of the manual cooking mode page 922 is omitted for brevity purposes.

FIG. 45 is an example interface 800 of the appliance control application 108 that displays a preheat status page 932. The preheat status page 932 is displayed when the preheat operation is performed.

In some embodiments, the preheat status page 932 includes a progress bar 934 to visualize the progression of the preheat operation.

The preheat status page 932 can display a currently-selected preheat configuration 936, such as the type of food item and the selected target cooking temperature. In the illustrated example, steak has been selected as a type of food item, and a target cooking temperature has been selected at 130° F. (or a rare level of doneness).

In some embodiments, the preheat status page 932 includes one or more buttons 938 and 940 that permits a user to modify the currently-selected preheat configuration 936.

FIG. 46 is an example interface 800 of the appliance control application 108 that displays a preheat end notification page 942. The preheat end notification page 942 is displayed when the preheat operation is complete.

In some embodiments, the preheat end notification page 942 displays a visual notification 944 alerting a user that the preheat operation has ended and the cooking appliance is ready for cooking operation. In other embodiments, the preheat end notification page 942 can provide an audible notification to alert a user to the end of preheat operation.

The preheat end notification page 942 includes a close button 946 and a cooking operation button 948. A user can select the close button 946 to not proceed with a cooking operation or to stop using the cooking appliance 102. To continue on with a cooking operation, the user can select the cooking operation button 948.

FIG. 47 is an example interface 800 of the appliance control application 108 that displays a cooking status page 952. The cooking status page 952 is displayed when the cooking operation is performed.

In some embodiments, the cooking status page 952 includes a current temperature display 954 for display a current temperature (e.g., a current cooking plate temperature or a current probe temperature), and a progress bar 956 to visualize the progression of the cooking operation.

The cooking status page 952 can display a currently-selected cooking configuration 958, such as the type of food item and the selected target cooking temperature. In the illustrated example, steak has been selected as a type of food item, and a target cooking temperature has been selected at 130° F. (or a rare level of doneness).

In some embodiments, the cooking status page 952 includes one or more buttons 960 and 961 that permits a user to modify the currently-selected cooking configuration 958.

The cooking status page 952 can also include a cook timer 963 to indicate a time left until cooking ends. Other types of timer are possible in other embodiments.

FIG. 48 is an example interface 800 of the appliance control application 108 that displays a cooking end notification page 962. The cooking end notification page 962 is displayed when the cooking operation is complete.

In some embodiments, the cooking end notification page 962 displays a visual notification 964 alerting a user that the cooking operation has ended. In other embodiments, the cooking end notification page 962 can provide an audible notification to alert a user to the end of cooking operation.

The cooking end notification page 962 includes a close button 966 and an additional cooking operation button 968. A user can select the close button 966 to stop using the cooking appliance 102. To continue on with another preheat or cooking operation, the user can select the additional cooking operation button 968.

Figure 49:
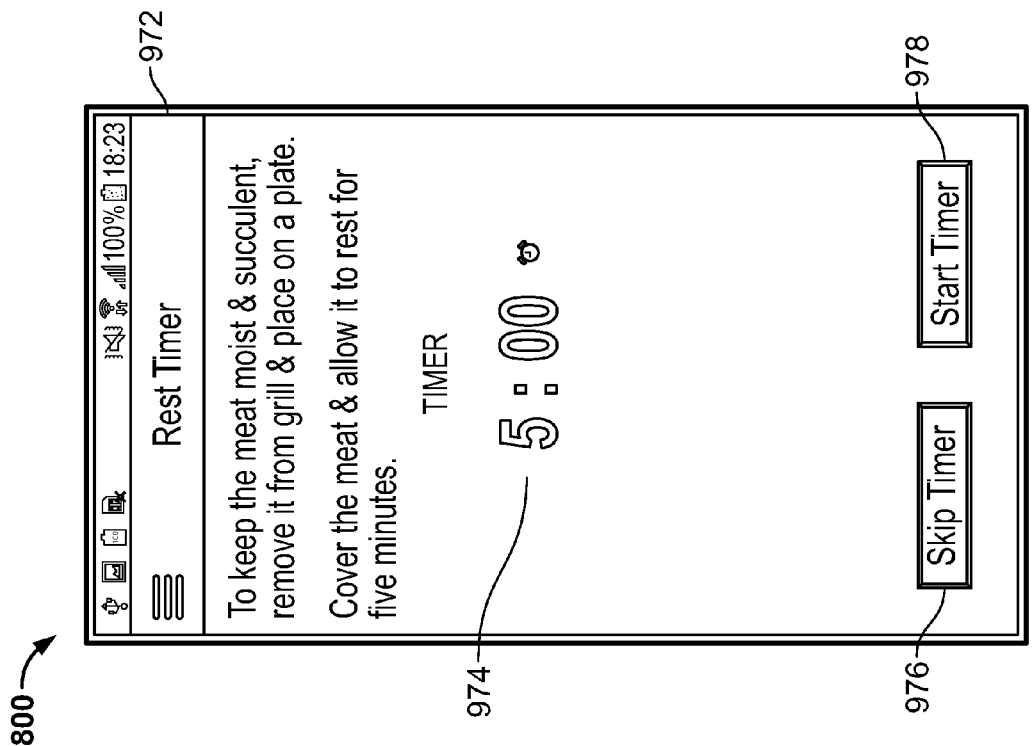
FIG. 49 is an example interface of the appliance control application that displays a rest timer page.

FIG. 49 is an example interface 800 of the appliance control application 108 that displays a rest timer page 972. The rest timer page 972 can be displayed when the cooking operation is complete. The rest timer operation can be used to provide optimal food conditions for serving.

In some embodiments, the rest timer page 972 includes a timer display 974, a skip timer button 976, and a start timer button 978. The timer display 974 is designed to set up a time and visualize a timer for measuring the set time. In some embodiments, the rest time is preset based upon types of food items. Once the time is over, the rest timer page 972 can alert the user that the rest time lapses. Selecting the skip timer button 976, the user can skip the rest timer operation. When the start timer button 978 is selected, the rest time can start.

Referring again to FIGS. 3-26, it is noted that the cooking appliance 102 can include other modules and components than those described above to perform various functions. In some embodiments, the cooking appliance 102 employs a sensing technology for detecting smoke in or around the cooking appliance 102 and alerting the user directly from the cooking appliance 102 or through the user computing device 106.

Referring to FIGS. 50-59, another example countertop cooking appliance is described and illustrated.

Typical countertop cooking appliances, such as contact grills, rice cookers, skillets, griddles, toaster ovens, waffle makers, and slow cookers often require a user of the appliance to remain close to the appliance. Some countertop cooking appliances need to be preheated to a particular temperature before a food item may be cooked with the countertop cooking appliance. The user of the countertop cooking appliance must remain near the countertop cooking appliance to determine when the countertop cooking appliance has reached the appropriate temperature before beginning to cook the food item with the countertop cooking appliance. Some countertop cooking appliances include a visual or audible notification, such as a light or buzzer, to indicate that the countertop cooking appliance has reached the desired temperature. Such notifications, however, are typically only effective when the user is relatively close to (e.g., in the same room as) the countertop cooking appliance.

Similarly, some cooking operations may be performed by a countertop cooking appliance for a period of time without requiring significant action by the user. For example, a food item may need to cook on a contact grill for five to seven minutes. At least for the first five minutes that the item is cooking, the user is not needed. However, if the user does not remain close to the countertop cooking appliance, the user may not know when the five minutes has elapsed and may not hear or see an indication from the countertop cooking appliance that the time has elapsed.

Moreover, a user of a countertop cooking appliance may need to physically check a food item being cooked to determine when the food item is cooked to a desired degree. For some food items, such as chicken or pork food items, the internal temperature of the food item needs to reach a certain minimum temperature for food safety. To check the food item, the user may visually inspect the food item or may cut open the food item to detect how cooked the item is at a certain point. Such checking of the doneness of a food item is often inaccurate, lengthens the cooking process (e.g., due to repeated opening of the countertop cooking appliance allowing heat to escape), may produce an aesthetically less pleasing food item (e.g., due to repeated cutting, etc.), and may produce an inferior food item (e.g., by allowing moisture contained within the food item to escape). Some users may use an external food thermometer to check the internal temperature of the food item being cooked (for food safety reasons and/or desired degree of doneness). Such thermometers typically require the user to remain close to the thermometer to read the temperature measured by the thermometer, may not be able to remain in the food item while it is being cooked, and/or may require the user to repeatedly open/access the food.

Furthermore, countertop cooking appliances sometimes include a display for providing limited information to a user of the appliance. For example, the display may indicate a time, temperature, and/or speed at which the device is operating. The display may be an electronic display, such as a liquid crystal display (LCD) or a series of one or more indicator lights, or a physical display, such as setting markings beside a control lever and/or selection buttons. Such displays may, however, provide limited information to a user of the appliance and require a user to be close to the appliance, i.e., close enough to read the display, to receive any information from the appliance.

It may be advantageous to provide a user with systems, methods, and computer-readable media to provide information to a user of a countertop cooking appliance locally and or remotely, and/or to provide the user with additional control over the countertop cooking appliance.

As described below, the countertop cooking appliances of the present disclosure are configured to communicate with a remote communication device. In some embodiments, the countertop cooking appliances are heated countertop cooking appliances for container and/or surface cooking. The countertop cooking appliances are configured to send data to the remote communication device.

The data that the countertop cooking appliances send to the remote communication device includes, for example, food item data, operational data for the countertop cooking appliance, and maintenance and/or error data concerning the countertop cooking appliance. Example food item data includes the weight of the food item(s) placed on the countertop cooking appliance, the temperature of food item(s) on the countertop cooking appliance, and/or the thickness of the items placed on the countertop cooking appliance. Operational data for the countertop cooking appliance can include a temperature of a cooking surface of the countertop cooking appliance, an air temperature within the countertop cooking appliance, a status of the countertop cooking appliance (e.g., on or off, preheating, cleaning cycle, etc.), the current settings of the countertop cooking appliance, and the like. Maintenance and error data includes data concerning suggested or required maintenance procedures (e.g., cleaning a filter, draining a drip pan), and identification of errors and possible solutions.

The remote communication device is configured, such as by suitable programming, to communicate with the countertop cooking appliance. Specifically, the remote communication device is configured to receive data from the countertop cooking appliance and display the data to the user. In some embodiments, the remote communication device is configured to allow the user to remotely control at least some aspects of the countertop cooking appliance. For example, the remote communication device may be configured to be able to turn the countertop cooking appliance on and off, set a timer on the countertop cooking appliance, change/set one or more settings of the countertop cooking appliance (e.g., set temperature), and/or instruct the countertop cooking appliance to perform a series of actions.

The remote communication device is configured to be able to inform and alert a user based on data received from the countertop cooking appliance and/or user settings. For example, the user can set a timer on the remote communication device to be alerted when a food item should be done (according to the recipe). The remote communication device can alert the user, based on data received from the countertop cooking appliance, when the countertop cooking appliance reaches a specified condition, such as a surface temperature, or when the food item on the countertop cooking appliance reaches a certain internal temperature.

Additional aspects of the present disclosure relate to interactive instructions and/or recipes. The remote communication device can store, import, and/or retrieve recipes that utilize the countertop cooking appliance and instructions for using the countertop cooking appliance. Recipes may simply be displayed to the user or may interact with the user and/or the countertop cooking appliance (via the remote communication device). For example, when a user selects an interactive recipe, the settings of the countertop cooking appliance to prepare the recipe (e.g., the temperature) may be transmitted and applied to the countertop cooking appliance. When a recipe includes multiple steps, the interactive recipe may step the user through the steps of the recipe as each step is completed. The remote communication device can determine when a step is completed based on data received from the countertop cooking appliance and/or based on the user indicating that a step is completed.

Figure 50:
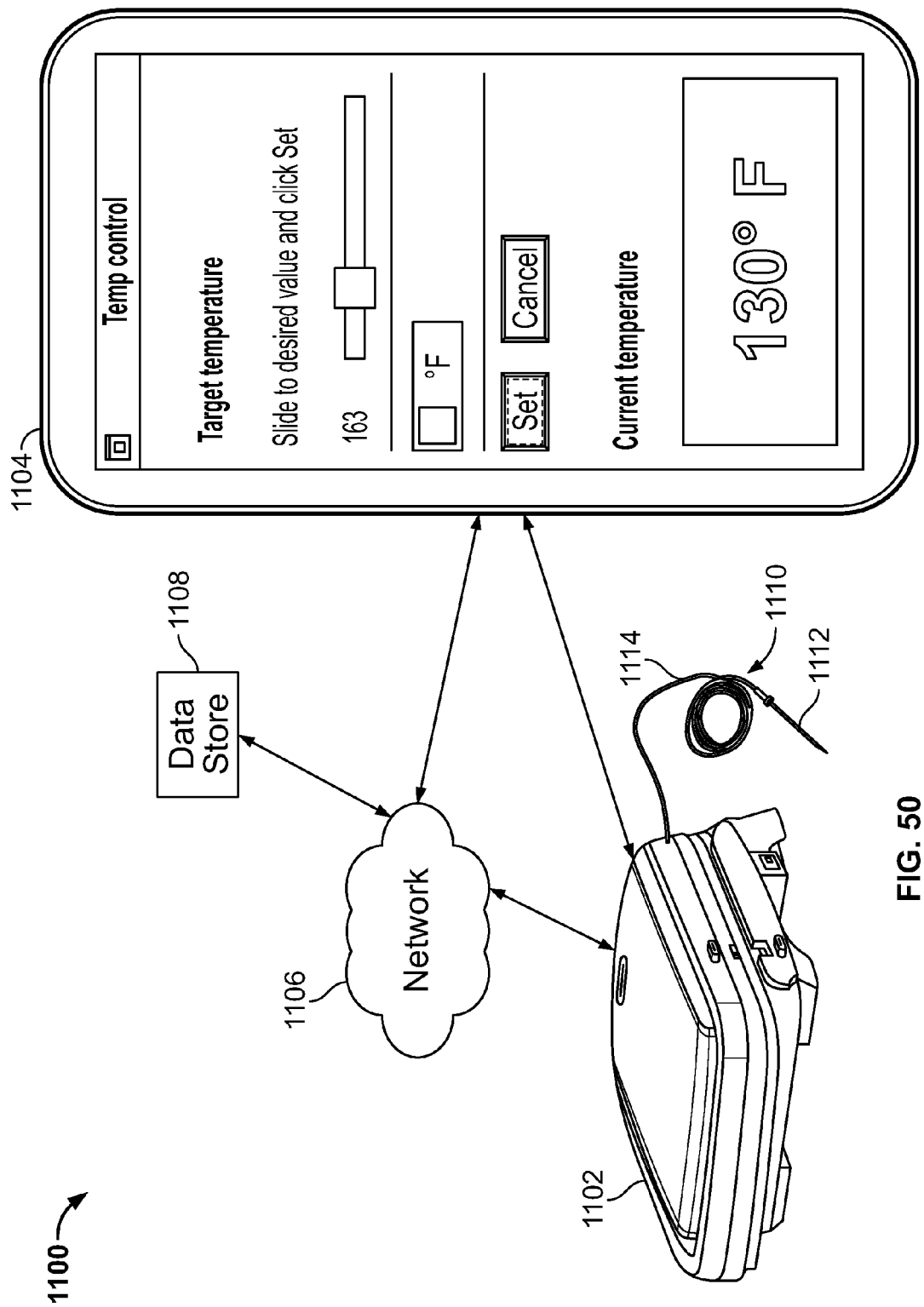
FIG. 50 is an exemplary system having a countertop cooking appliance and a remote communication device.

FIG. 50 is an illustration of an example system 1100 having a countertop cooking appliance 1102 and a remote communication device 1104. The remote communication device 1104 is communicatively coupled to the countertop cooking appliance 1102 directly and/or via a network 1106. A data store 1108 is communicatively coupled with the countertop cooking appliance 1102 and the remote communication device 1104 via the network 1106. The countertop cooking appliance 1102 includes an external temperature probe 1110.

In some embodiments, the system 1100 is configured similarly to the cooking appliance system 100 as described above. For example, the countertop cooking appliance 1102, the remote communication device 1104, and the network 1106 are configured similarly to the cooking appliance 102, the user computing device 106, and the wireless network 112, respectively.

The countertop cooking appliance 1102 is a countertop contact grill. In other embodiments, the countertop cooking appliance 1102 is a rice cooker, a skillet, a griddle, a toaster oven, a waffle maker, a slow cooker, or any other suitable heated appliance for container and/or surface cooking. The countertop cooking appliance 1102 is configured to communicate with the remote communication device 1104 by suitable programming loaded onto the countertop cooking appliance 1102.

A remote communication device, as used herein, is a device that is separate from the countertop cooking appliance 1102 and that is capable of receiving communication from the countertop cooking appliance 1102. In the exemplary embodiment, the remote communication device 1104 is a mobile phone. In other embodiments, the remote communication device 1104 is a desktop computer, a tablet computer, a laptop computer, a television, a radio, a personal digital assistance, a pager, any other suitable communication device, or any combination thereof. Additionally, in some embodiments, the remote communication device 1104 is a device specifically dedicated to the countertop cooking appliance 1102 such that the remote communication device 1104 is configured to communicate specifically with the countertop cooking appliance. Although only one remote communication device is shown in FIG. 50, it is contemplated that more than one remote communication device 1104, including different types of remote communication devices, may be used with system 1100. The remote communication device 1104 is configured to communicate with the countertop cooking appliance 1102 by suitable programming loaded onto the remote communication device 1104. In some embodiments, an application (sometimes referred to as an "app") is downloaded and/or installed on the remote communication device 1104. The installed application configures the remote communication device 1104 to communicate with the countertop cooking appliance 1102 and otherwise function as described herein.

The countertop cooking appliance 1102 communicates with the remote communication device 1104 directly and/or by utilizing network 1106. The appliance 1102 communicates with the remote communication device 1104 using any suitable wired or wireless communication protocol. For example, the countertop cooking appliance 1102 may communicate with the remote communication device using, along with appropriate communication protocols, a radio frequency (RF) transceiver, a Bluetooth® adapter, a Wi-Fi transceiver, a ZigBee® transceiver, a near field communication (NFC) transceiver, an infrared (IR) transceiver, and/or any other device capable of communicating directly with remote communication device 1104. (Bluetooth is a registered trademark of Bluetooth Special Interest Group of Kirkland, Wash.; ZigBee is a registered trademark of the ZigBee Alliance of San Ramon, Calif.) Wired communication between the countertop cooking appliance 1102 and the remote communication device 1104 may use any suitable wired communication protocol including, without limitation, USB, RS232, I2C, SPI, analog, and proprietary I/O protocols.

The network 1106 is a communication network. In an exemplary embodiment, the network 1106 is a wireless local area network (WLAN). The network 1106 may be any suitable type of network and/or a combination of networks. The network 1106 may be wired or wireless or a combination thereof and of any or multiple communication protocols. The network 1106 may include, without limitation, the Internet, a local area network (LAN), a wide area network (WAN), a wireless LAN (WLAN), a mesh network, a virtual private network (VPN), a cellular network, and/or any other network that allows system 1100 to operate as described herein.

The data store 1108 is configured to store data associated with the countertop cooking appliance 1102 and/or the remote communication device 1104. Such data may include food item data, operational data for the countertop cooking appliance, and maintenance and/or error data concerning the countertop cooking appliance. The data store 1108 may also store instructions and/or recipes for use with the countertop cooking appliance 1102. Although a single data store 1108 is shown in FIG. 50, system 1100 may include one or multiple data stores. The data store 1108 may be a stand-alone data store (e.g., a part of a server connected to network 1106), may be located within countertop cooking appliance 1102, and/or may be located within the remote communication device 1104. Moreover, the data store 1108 may be a distributed data store that exists across multiple computers, devices, and/or locations.

Temperature probe 1110 is communicatively coupled to countertop cooking appliance 1102 to provide temperature data to countertop cooking appliance 1102. The temperature probe 1110 detects a temperature around a probe element 1112 and provides a signal indicative of the detected temperature to the countertop cooking appliance 1102. In the illustrated embodiment, the temperature probe 1110 is removably connected to the countertop cooking appliance 1102 with a wire 1114. Alternatively, the temperature probe 1110 may be wirelessly coupled to the countertop cooking appliance 1102. The temperature probe 1110 is configured to be inserted into a food item being cooked with the countertop cooking appliance 1102 in order to detect the internal temperature of the food item and transmit a signal indicative of the temperature to the countertop cooking appliance 1102. In some embodiments, the temperature probe 1110 is configured similarly to the temperature probe assembly 218 as described above.

Figure 51:
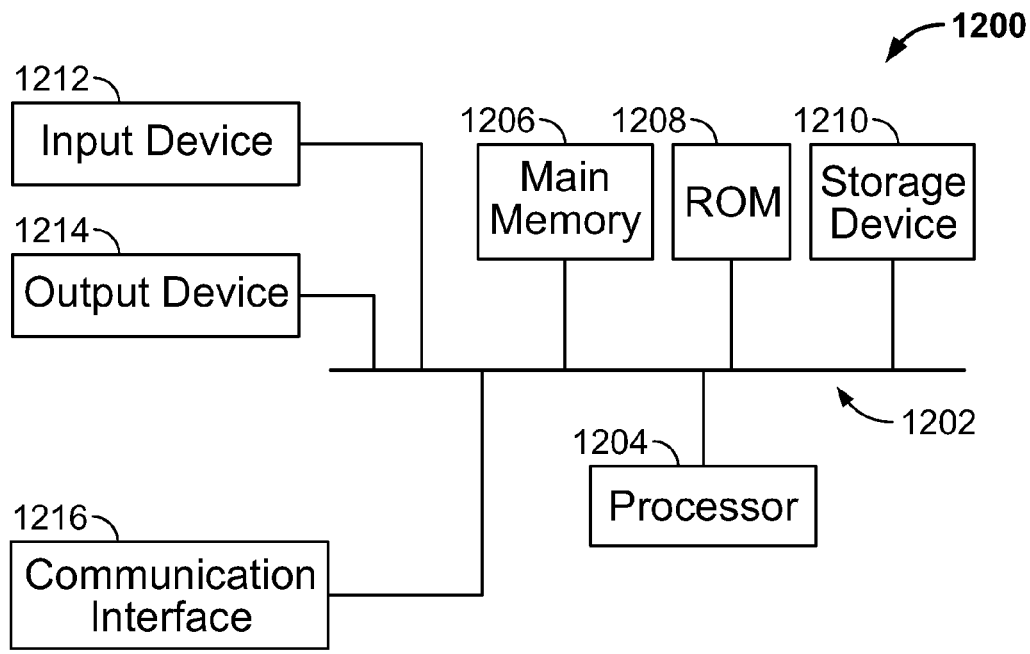
FIG. 51 is an exemplary computing device.

Various embodiments described in this disclosure include computing devices. FIG. 51 shows an example of a computing device 1200 intended to represent various forms of digital computers, such as laptops, desktops, workstations, personal digital assistants, servers, blade servers, mainframes, and other appropriate computers. Computing device 1200 is also intended to represent various forms of mobile devices, such as personal digital assistants, cellular telephones, smart phones, and other similar computing devices. The components shown here, their connections and relationships, and their functions, are meant to be examples only, and are not meant to limit implementations of the subject matter described and/or claimed in this document.

In the exemplary embodiment, countertop cooking appliance 1102 and remote communication device 1104 (shown in FIG. 50) each include some or all of a computing device 1200. For example, the countertop cooking appliance 1102 may include a communication interface and associated controls rather than a complete computing device 1200. Computing device 1200 includes a bus 1202, a processor 1204, a main memory 1206, a read only memory (ROM) 1208, a storage device 1210, an input device 1212, and output device 1214, and a communication interface 1216. Bus 1202 includes a path that permits communication among the components of computing device 1200.

Processor 1204 includes any type of conventional processor, microprocessor, or processing logic that interprets and executes instructions. Processor 1204 can process instructions for execution within the computing device 1200, including instructions stored in the main memory 1206 or on the storage device 1210 to display graphical information for a GUI on an external input/output device, such as display 1214 coupled to a high speed interface. In other implementations, multiple processors and/or multiple buses may be used, as appropriate, along with multiple memories and types of memory. Also, multiple computing devices 1200 may be connected, with each device providing portions of the necessary operations (e.g., as a server bank, a group of blade servers, or a multi-processor system).

Main memory 1206 may include a random access memory (RAM) or another type of dynamic storage device that stores information and instructions for execution by processor 1204. Main memory 1206 stores information within the computing device 1200. In one implementation, main memory 1206 is a volatile memory unit or units. In another implementation, main memory 1206 is a non-volatile memory unit or units. Main memory 1206 may also be another form of computer-readable medium, such as a magnetic or optical disk.

ROM 1208 may include a conventional ROM device or another type of static storage device that stores static information and instructions for use by processor 1204.

The storage device 1210 is capable of providing mass storage for the computing device 1200. Storage device 1210 may include a magnetic and/or optical recording medium and its corresponding drive. In one implementation, the storage device 1210 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as main memory 1206, ROM 1208, the storage device 1210, or memory on processor 1204.

Input device 1212 includes a conventional mechanism that permits computer device 1200 to receive commands, instructions, or other inputs from a user, including visual, audio, touch, button presses, stylus taps, etc. Additionally, input device 1212 may receive location information. Accordingly, input device 1212 may include, for example, a camera, a microphone, one or more buttons, a touch screen, and/or a GPS receiver. Output device 1214 may include a conventional mechanism that outputs information to the user, including a display (including a touch screen) and/or a speaker. Communication interface 1216 may include any transceiver-like mechanism that enables computing device 1200 to communicate with other devices and/or systems. For example, communication interface 1216 may include mechanisms for communicating with another device or system directly or via a network, such as network 1106 (shown in FIG. 50).

As described herein, computing device 1200 facilitates the presentation of content, such as an instruction, along with food item data, operational data for the countertop cooking appliance, and maintenance and/or error data. Computing device 1200 may perform these and other operations in response to processor 1204 executing software instructions contained in a computer-readable medium, such as main memory 1206. A computer-readable medium may be defined as a physical or logical computer-readable memory device and/or carrier wave. The software instructions may be read into main memory 1206 from another computer-readable medium, such as data storage device 1210, or from another device via communication interface 1216. The software instructions contained in main memory 1206 may cause processor 1204 to perform processes described herein. Alternatively, hardwired circuitry may be used in place of or in combination with software instructions to implement processes and systems consistent with the principles of the subject matter disclosed herein. Embodiments are not limited to any specific combination of hardware circuitry and software.

The processor 1204 can execute instructions within the computing device 1200, including instructions stored in the main memory 1206. The processor may be implemented as chips that include separate and multiple analog and digital processors. The processor may provide, for example, for coordination of the other components of the computing device 1200, such as control of user interfaces, applications run by computing device 1200, and wireless communication by computing device 1200.

Computing device 1200 may communicate wirelessly through communication interface 1216, which may include digital signal processing circuitry where necessary. Communication interface 1216 may provide for communications under various modes or protocols, such as GSM voice calls, SMS, EMS, or MMS messaging, CDMA, TDMA, PDS, WCDMA, CDMA2000, or GPRS, among others. Such communication may occur, for example, through radiofrequency transceiver. In addition, short-range communication may occur, such as using a Bluetooth®, WiFi, or other such transceiver(s) (not shown). In addition, a GPS (Global Position system) receiving module may provide additional navigation- and location-related data to computing device 1200, which may be used as appropriate by applications running on computing device 1200.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

Figure 52:
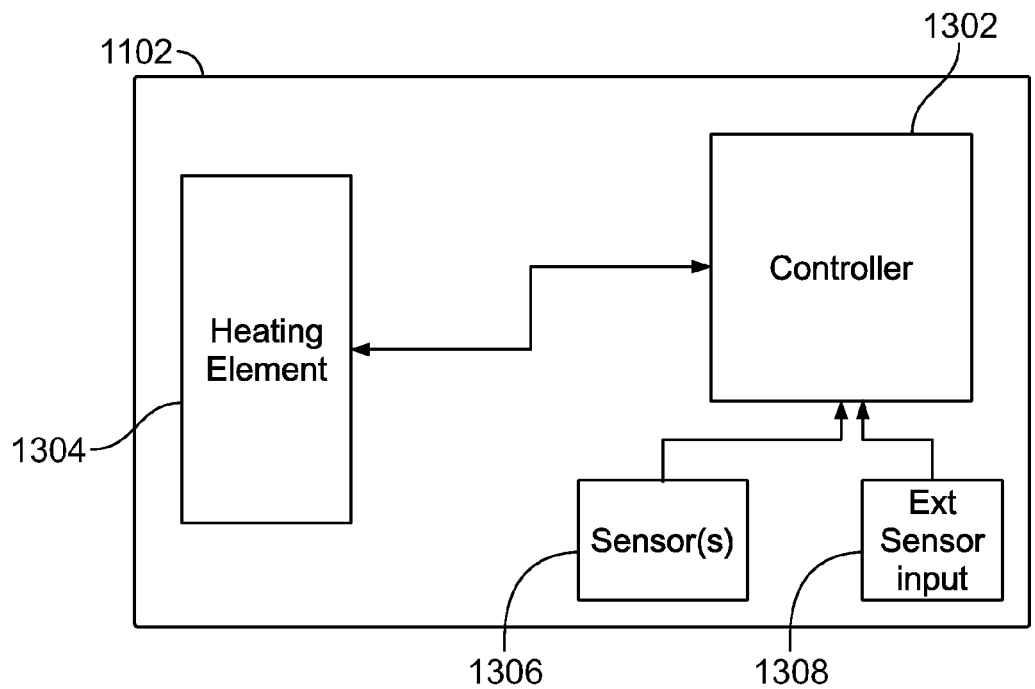
FIG. 52 is a block diagram of the countertop cooking appliance shown in FIG. 50.

FIG. 52 is a simplified block diagram of the countertop cooking appliance 1102. The countertop cooking appliance 1102 includes a controller 1302, a heating element 1304, a sensor 1306, and an external sensor input 1308.

Except as otherwise described herein, the controller 1302 is substantially identical to the computing device 1200. In other embodiments, the controller 1302 is any other analog circuitry, digital circuitry, or analog and digital circuitry configured to operate as described herein. As FIG. 52 is a simplified block diagram, not all components that are present in a countertop cooking appliance 1102, e.g., wires, switches, relays, power supplies, etc., are illustrated in FIG. 52.

Heating element 1304 provides, under the control of the controller 1302, the heat for cooking a food item with the countertop cooking appliance 1102. Although a single heating element 1304 is shown, countertop cooking appliance 1102 may include any number of heating elements 1304 suitable to permit countertop cooking appliance 1102 to cook food items.

Sensor 1306 is a temperature sensor configured to detect a temperature of a portion of the countertop cooking appliance 1102. In the example embodiment, the sensor 1306 detects the temperature of the contact grill surfaces (not shown) of the countertop cooking appliance 1102 on which the food item is cooked. The sensor 1306 provides a signal indicative of the detected temperature to the controller 1302. The controller 1302 uses the detected signal as feedback for controlling the countertop cooking appliance 1102. The controller 1302 may also determine the temperature based on the signal and present the temperature to a user through output device 1214 (shown in FIG. 51) and/or by transmission to remote communication device 1104. In other embodiments, sensor 1306 is any other sensor that detects an operational characteristic of countertop cooking appliance 1102 to produce operational data about countertop cooking appliance 1102 or that detects a characteristic of a food item associated with the countertop cooking appliance 1102. Example sensor types include weight sensors configured to detect the weight of an item placed on/in the countertop cooking appliance 1102, position sensors configured to detect the relative position orientation of the countertop cooking appliance 1102 or a portion of the countertop cooking appliance 1102 (e.g., opened/closed, upside down), moisture sensors to detect the presence and/or amount of moisture, and ambient temperature sensors. Moreover, although one sensor 1306 is illustrated, countertop cooking appliance 1102 may include any suitable number of similar or different sensors 1306.

External sensor input 1308 couples the external temperature probe 1110 (shown in FIG. 50) to the countertop cooking appliance 1102. As described above, the external temperature probe 1110 detects a temperature at probe element 1112 and generates a signal indicative of the detected temperature. The signal is transmitted to the countertop cooking appliance 1102, and more specifically to the controller 1302, through the external sensor input 1308. The controller 1302 may determine the detected temperature based on the signal and present the temperature to a user through the output device 1214 (shown in FIG. 51) and/or by transmission to the remote communication device 1104. In other embodiments, controller 1302 sends the signal indicative of the detected temperature to the remote communication device 1104 without determining the detected temperature. The remote communication device 1104 may then determine the detected temperature based on the signal and display the detected temperature to the user.

Figure 53:
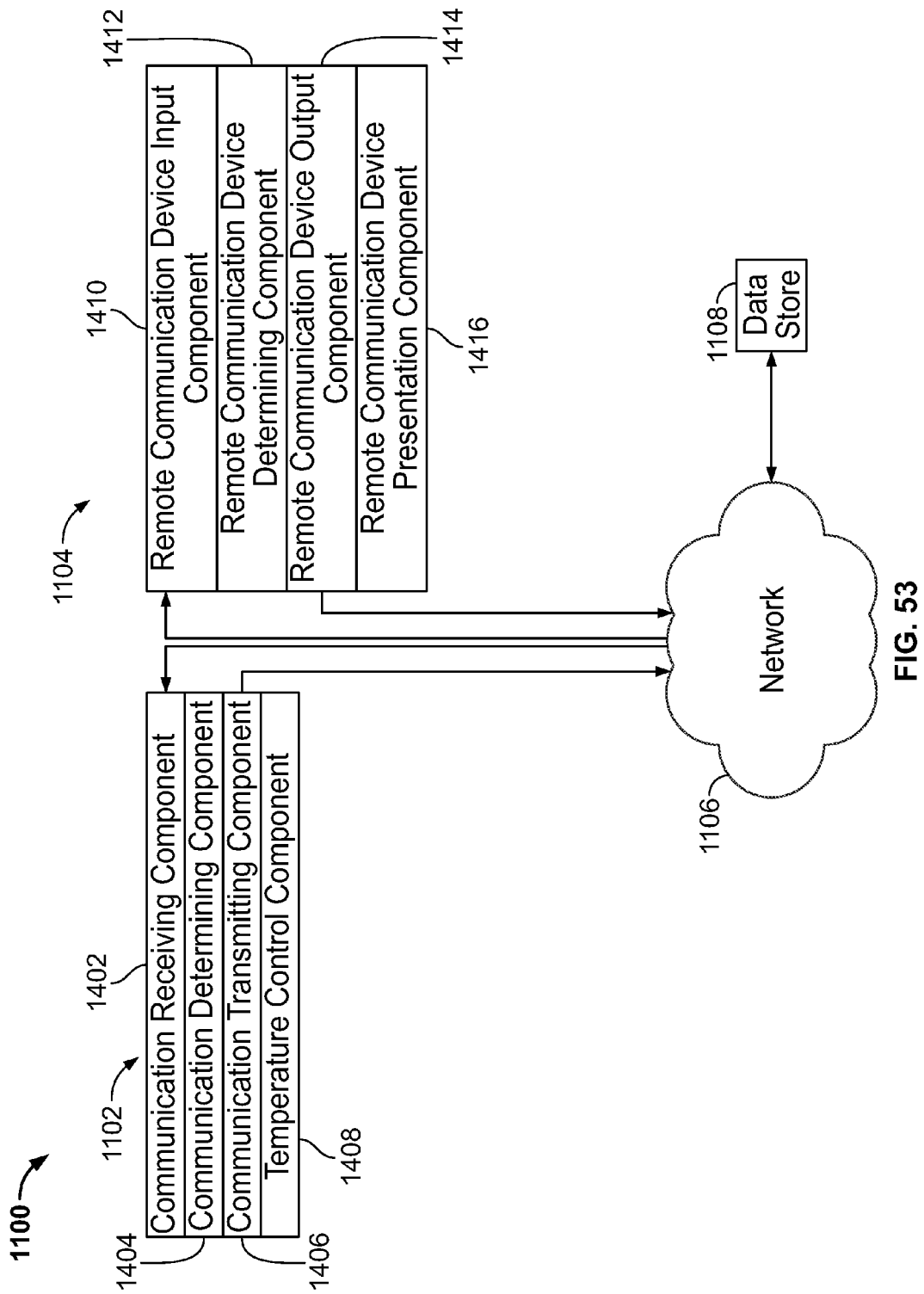
FIG. 53 is a functional block diagram of the exemplary system shown in FIG. 50.

Turning to FIG. 53, a functional block diagram of system 1100 includes the countertop cooking appliance 1102, the remote communication device 1104 the network 1106, and the data store 1108. The other structural components of the system 1100 shown in FIGS. 1-3, while still included as part of system 1100, are not shown in the functional diagram of FIG. 53.

The countertop cooking appliance 1102 includes multiple components that may be, for example, part of controller 1302 and may be embodied in one or more software modules executed by controller 1302. The countertop cooking appliance 1102 includes a communication receiving component 1402, a communication determining component 1404, and a communication transmitting component 1406, and a temperature control component 1408. Communication receiving component 1402 receives data, such as food item data, operational data, and maintenance and/or error data. Moreover, communication receiving component 1402 receives data and instructions from a remote communication component 1104 and input device 1212. The communication determining component 1404 is configured to calculate, compare, and determine results based on inputs, such as from the communication receiving component 1402. For example, the communication determining component determines a temperature based on a signal representative of the temperature received from sensor 1306 (shown in FIG. 52). Communication transmitting component 1406 is configured to output received data and/or determined values to output device 1214, to the data store 1108, and/or to remote communication component 1104. The temperature control component 1408 controls the heating element 1304 (shown in FIG. 52) based on data from 30814-1316 (SP-1959) sensor 1306 and user inputs. Thus, the user may set a desired temperature for the countertop cooking appliance 1102 via the input device 1212 or the remote communication device 1104 and the temperature control component 1408 operates the heating element 1304 to achieve the desired temperature.

As described above, the remote communication device 1104 may be a mobile phone, a tablet computer, a desktop computer, a television, a radio, a personal digital assistance, a pager, and/or any other suitable communication device. The remote communication device 1104 includes multiple components that may be, for example, part of a computing device 1200 and may be embodied in one or more software modules executed by the computing device 1200.

The remote communication device 1104 is configured to receive data, such as food item data, operational data, and maintenance and/or error data from the countertop cooking appliance 1102. The remote communication device 1104 includes an input component 1410, a determining component 1412, an output component 1414, and a presentation component 1416. The input component 1410 is configured to receive data from countertop cooking appliance 1102 and to retrieve data from other components within system 1100, such as data store 1108. In some embodiments, the input component 1410 retrieves recipe data and/or instructions from data store 1108. Recipe data may include, but is not limited to, recipes stored on the data store 1108 and instructions associated with the recipes. An instruction associated with a recipe may include a specific amount of various food items to be combined, a temperature at which to cook a food item, a length of time to cook a food item, and the like. Remote communication device input component 1410 is also configured to receive a selection of an item, such as a selection of a recipe, by a user.

The remote communication device determining component 1412 is configured to calculate, compare, and/or determine results based on inputs, such as from the remote communication device input component 1410. For example, the remote communication device determining component 1412 determines a temperature of the countertop cooking appliance 1102 based on a signal from the countertop cooking appliance 1102 received through the input component 1410. The determining component 1412 also compares detected temperatures to setpoint temperatures to determine, for example, whether or not the countertop cooking appliance 1102 is at the desired temperature, whether or not the food item on the countertop cooking appliance 1102 is at the desired internal temperature, whether or not a predetermined length of cooking time has elapsed, etc.

The remote communication device output component 1414 is configured to output data to the presentation component 1416, to the data store 1108, and/or to the countertop cooking appliance 1102. The remote communication device display component 1416 is configured to display data, such as recipes, instructions, food item data, operational data, and error/maintenance data to the user on the output device 1214 of the remote communication device 1104.

Figure 54:
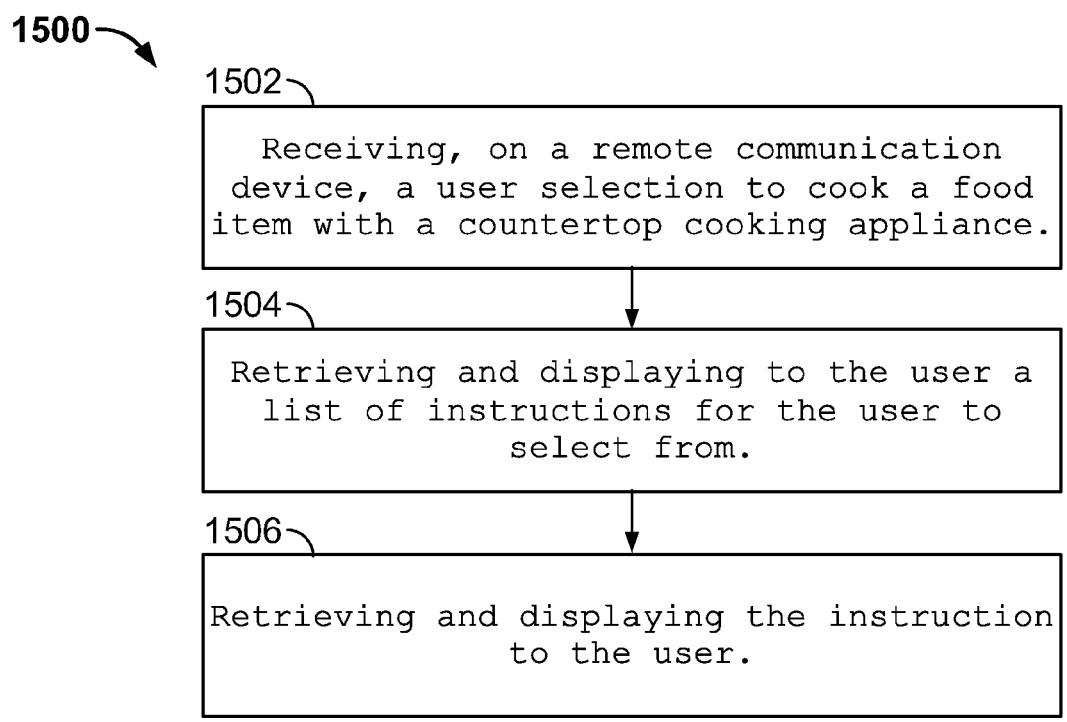
FIG. 54 is a flow diagram of a method for cooking with a countertop cooking appliance and a remote communication device.
Figure 55:
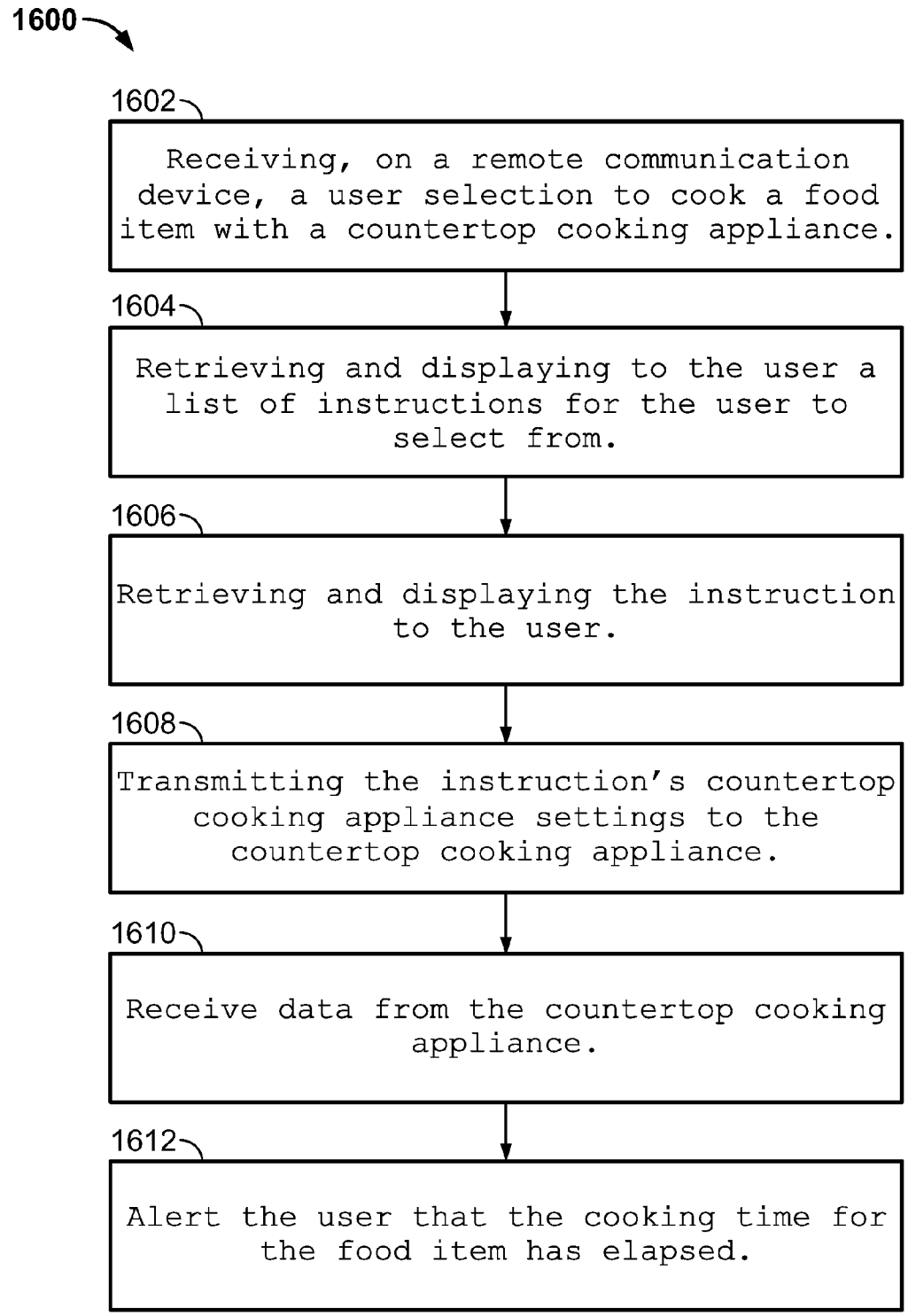
FIG. 55 is a flow diagram of another method for cooking with a countertop cooking appliance and a remote communication device.
Figure 56:
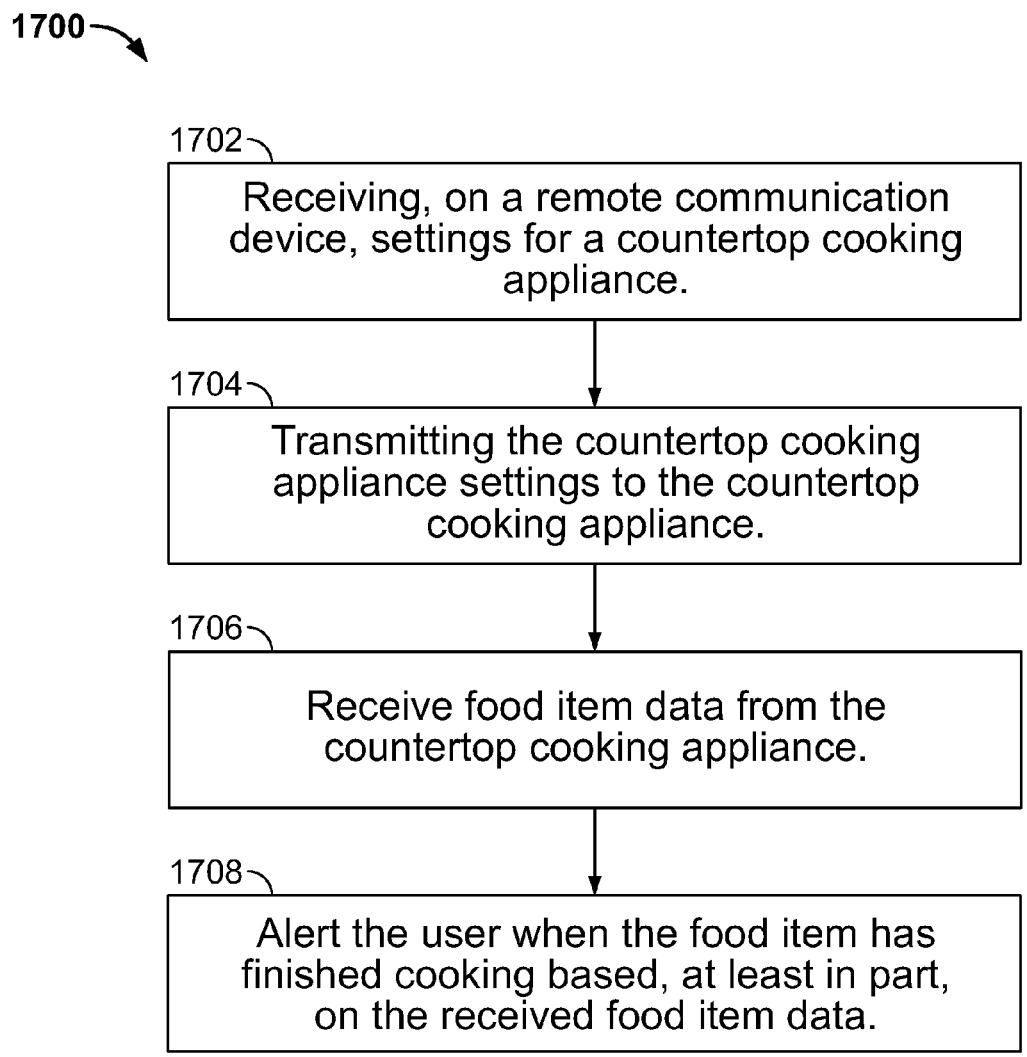
FIG. 56 is a flow diagram of yet another method for cooking with a countertop cooking appliance and a remote communication device.

FIGS. 54-56 are flow diagrams of several methods for cooking with a countertop appliance. Although, the methods will be described with reference to the components of the system 1100, the methods may be performed using any suitable system including a countertop cooking appliance and a remote communication device. The methods described herein may be performed by the remote communication device 1104 and/or food preparation appliance 1102 using hardware, software, or a combination of hardware and software. Moreover, the methods may be performed by the components described with reference to FIG. 53. Further, the methods, or portions of the methods, described herein may be performed using a software application loaded onto the remote communication device 1104 that specifically configures the remote communication device 1104 to perform at least some steps of the methods.

FIG. 54 is a flow diagram of a method 1500 for cooking with a countertop cooking appliance. The method 1500 includes receiving 1502, on remote communication device 1104, a user selection to cook a food item with the countertop cooking appliance 1102. The remote communication device 1104 retrieves and displays to the user, at 1504, a list of instructions for the user to select from. The instructions are a list of food items to be cooked without a recipe (e.g., chicken breast-fresh, chicken breast-frozen, steak, fish-frozen, etc.) and/or a list of recipes for preparing a food item (e.g., savory hamburgers, steak with mushroom sauce, grilled Cajun chicken sandwich, etc.). The instructions may be sorted and displayed to the user according to any suitable organization, including alphabetical ordering, grouping by food type, ordered by length of time required to prepare/cook, etc. Moreover, in some embodiments, the remote communication device also displays to the user a search box, through which the user may search for a particular food item, recipe, and/or instruction.

At 1506, when the user selects an instruction, the remote communication device 1104 retrieves and displays the instruction to the user. Regardless of whether the instruction is a recipe or an instruction without a recipe, the instruction will identify the settings for the countertop cooking appliance 1102 to cook the selected food item/recipe, the time required, and/or the sequence of steps to cook the item. The sequence of steps may be simple (e.g., cook at *375 degrees Fahrenheit for 7-9 minutes) or more complex (e.g., cook at 450 degrees Fahrenheit for 3 minutes, reduce heat to 350 degrees Fahrenheit for 5 minutes, remove from heat and let rest for 2 minutes). After the instructions are provided, the user may apply the appropriate settings to the countertop cooking appliance 1102 and cook the food item/recipe according to the instructions.

In some embodiments, the method 1500 includes receiving a user instruction to take a photograph with the remote communication device and upload the photograph to a remote location. Thus the user may take photographs of the food item before, during, and/or after preparation and upload the photograph(s) to remote devices, such as a social media website, a file sharing website, the data store 1108, etc. The photograph(s) may also be associated with the instructions for the food item photographed, so that users may view photographs of the food item prepared according to the instructions when reviewing and selecting instructions. Moreover, in some embodiments, the user may add comment(s) to the photograph and the comment(s) will be displayed with, or otherwise associated with, the photograph.

FIG. 55 is a flow diagram of a method 1600 for cooking with a countertop cooking appliance. The method 1600 includes receiving 1602, on remote communication device 1104, a user selection to cook a food item with the countertop cooking appliance 1102. The communication device 1104 retrieves and displays to the user, at 1604, a list of instructions for the user to select from. At 1606, when the user selects an instruction, the remote communication device 1104 retrieves and displays the instruction to the user. At 1608, the remote communication device 1104 transmits to the countertop cooking appliance 1102 the settings for the countertop cooking appliance 1102 to cook the selected food item/recipe. The countertop cooking appliance 1102 settings are set by the countertop cooking appliance 1102 as instructed by the remote communication device 1104. The settings include the temperature to which the countertop cooking appliance 1102 is to be set. Depending on the recipe and/or food item, the instructions may include a sequence of temperatures and a time for each temperature. For example, when cooking a steak on a contact grill, it may be desirable to sear the steak at a high temperature for a short time before reducing the temperature to a lower temperature for the remaining time required to cook the steak. The instructions transmitted to the countertop cooking appliance 1102 can instruct the countertop cooking appliance 1102 to follow the sequence of settings automatically. Moreover, the user may adjust the settings to be different than included in the retrieved instructions and/or may select from options provided in the instructions.

At 1610, the remote communication device 1104 receives data from the countertop cooking appliance 1102. In this embodiment, the remote communication device receives operational data, such as the status of the countertop cooking appliance 1102 (e.g., off/on, power setting, temperature setting, etc.) and the temperature data about the countertop cooking appliance 1102. The remote communication device 1104 may also receive food item data from the countertop cooking appliance 1102. Thus, the remote communication device 1104 is informed of the temperature of the countertop cooking appliance 1102 and can determine when the countertop cooking appliance 1102 is preheated to the correct temperature for cooking the selected food item/recipe. In some embodiments, the countertop cooking appliance 1102 determines when it has reached the desired temperature and alerts the user through its output device 1214 and/or by sending an alert to the remote communication device 1104. Alternatively, or additionally, the remote communication device 1104 may determine, based on the received temperature data, when the countertop cooking appliance 1102 is heated to the desired temperature. Upon determining, either directly or from an alert received from the countertop cooking appliance 1102, that the desired temperature has been reached, the remote communication device 1104 alerts the user that the countertop cooking appliance 1102 is ready for use with a visual and/or audible alert on the remote communication device 1104. In some other embodiments, the countertop cooking appliance 1102 does not need to be preheated and the countertop cooking appliance 1102 is ready to use immediately.

The remote communication device 1104 alerts 1612 the user when the cooking time for the food item has elapsed. Once the countertop cooking appliance 1102 is ready for use to cook the selected food item/recipe, the user places the item on/in the countertop cooking appliance 1102 and informs the remote communication device 1104 that the cooking has started. In other embodiments, the countertop cooking appliance 1102 determines that cooking has begun based on the output of one or more sensor (such as a weight sensor detecting the food item placed on/in the countertop cooking appliance 1102, a sensor detecting that a previously open lid is closed and latched, etc.). The remote communication device 1104 monitors the elapsed time after cooking has begun and alerts the user when the predetermined cooking time for the food item/recipe has elapsed. The predetermined cooking time is set automatically based on the cooking time contained in the selected instruction. The user may adjust the predetermined time to be different than the time included in the retrieved instructions and/or may select from options provided in the instructions (e.g., to select between a rare, medium, or well done, steak).

Additionally, in some embodiments, the remote communication device 1104 may adjust the predetermined time based on data received from the countertop cooking appliance 1102. For example, the countertop cooking appliance 1102 may receive a thickness of the food item from the countertop cooking appliance 1102 (such as by a contact grill countertop cooking appliance 1102 detecting how far apart a bottom and top grill element are on the contact grill). The remote communication device 1104 is able to determine, such as by look-up table or through use of an adjustment formula, cooking time adjustments that may be needed based on the thickness of the food item. Similarly, the remote communication device 1104 may determine adjustments to the cooking time based on variations in the temperature data regarding the countertop cooking appliance 1102. Thus, when for example a user repeatedly opens the countertop cooking appliance 1102 causing the temperature to drop below the desired cooking temperature for brief periods of time, the remote communication device 1104 can determine and incorporate cooking time adjustments needed to compensate for the periods during which the temperature was different than the selected temperature.

FIG. 56 is a flow diagram of a method 1700 for cooking with a countertop cooking appliance. The method 1700 includes receiving 1702, on the remote communication device 1104, settings for the countertop cooking appliance 1102. The settings may be manually selected by the user and/or may be derived from an instruction/recipe as described above with respect to the methods 1500 and 1600. The settings include a temperature at which the countertop cooking appliance 1102 should operate and a food item data value that will indicate that the food item to be cooked with the countertop cooking appliance 1102 has completed cooking. In the example embodiment, the food item data value that indicates the food item has completed cooking is the internal temperature of the food item measured, for example, by the temperature probe 1110 inserted into the food item. In other embodiments, different food item data values may be used to determine completion of cooking. When countertop cooking appliance 1102 is a rice cooker, for example, the remote communication device 1104 may determine completeness of cooked rice based on a detected amount of moisture remaining, a weight of the rice and water within the rice cooker, a detected volume of rice within the rice cooker, a temperature of the air within the rice cooker, or a temperature of the cooking/cooked rice.

At 1704 the settings for the countertop cooking appliance 1102 are transmitted by the remote communication device 1104 to the countertop cooking appliance 1102. Thus, in the example embodiment, the temperature for the countertop cooking appliance 1102 is transmitted to the countertop cooking appliance 1102 and the remote communication device 1104 operates according to the received temperature setting. In some embodiments, the settings also tell the countertop cooking appliance 1102 what data to send to the remote communication device 1104. Thus, the countertop cooking appliance 1102 does not send and the remote communication device 1104 does not receive unnecessary and/or unwanted data.

The remote communication device 1104 receives, at 1706, the food item data from the countertop cooking appliance 1102 and alerts the user, at 1708, when the food item has finished cooking based, at least in part, on the received food item data. Thus, the remote communication device 1104 receives the temperature of the food item and compares the received data to the desired temperature that indicates the food item is cooked as desired. The desired temperature may be automatically set by the remote communication device 1104 based on the type of food item, may be manually set by the user, and/or may be selected by the user from options (such as between rare, medium, and well done steak). In some instances, the user may be permitted to change the desired temperature only after acknowledging a warning about deviating from recommended temperatures.

The methods 1500, 1600, and 1700 described above are neither the only methods that may be performed using the system 1100, nor are they exclusive from each other. The features of the methods 1500, 1600, and 1700 may be combined in various permutations and combinations for use with the system 1100. For example, the ability to photograph a food item and upload the photograph to a social media site as described with respect to method 1500 may be a part of the method 1600 and/or 1700.

Figure 58:
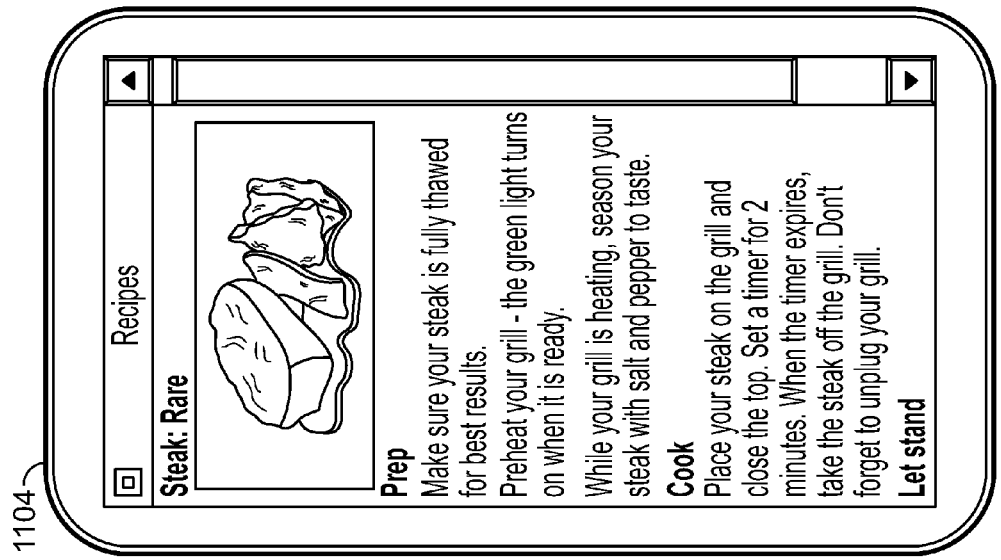
FIG. 58 is another example display of the remote communication device shown in FIG. 50.
Figure 57:
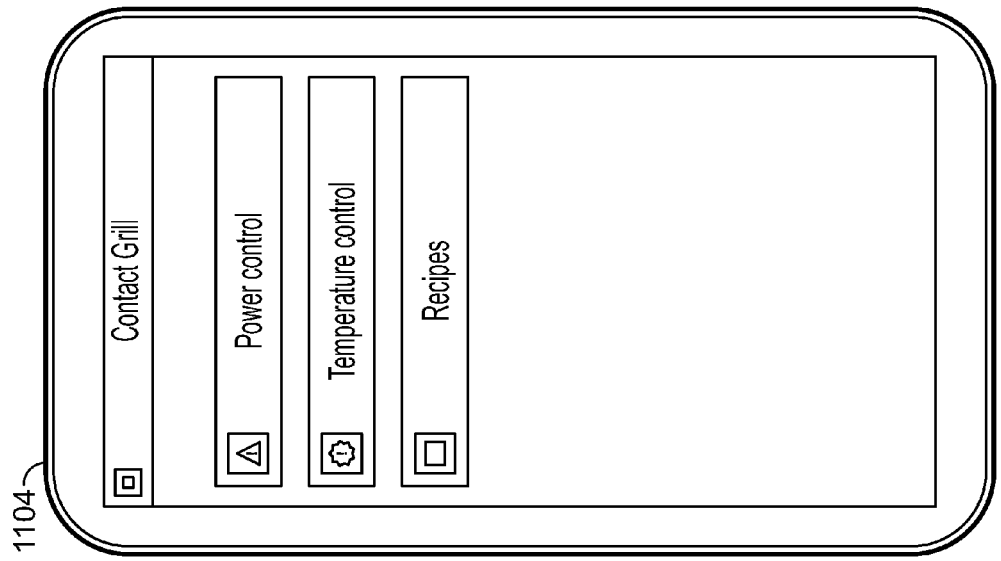
FIG. 57 is an example display of the remote communication device shown in FIG. 50.
Figure 59:
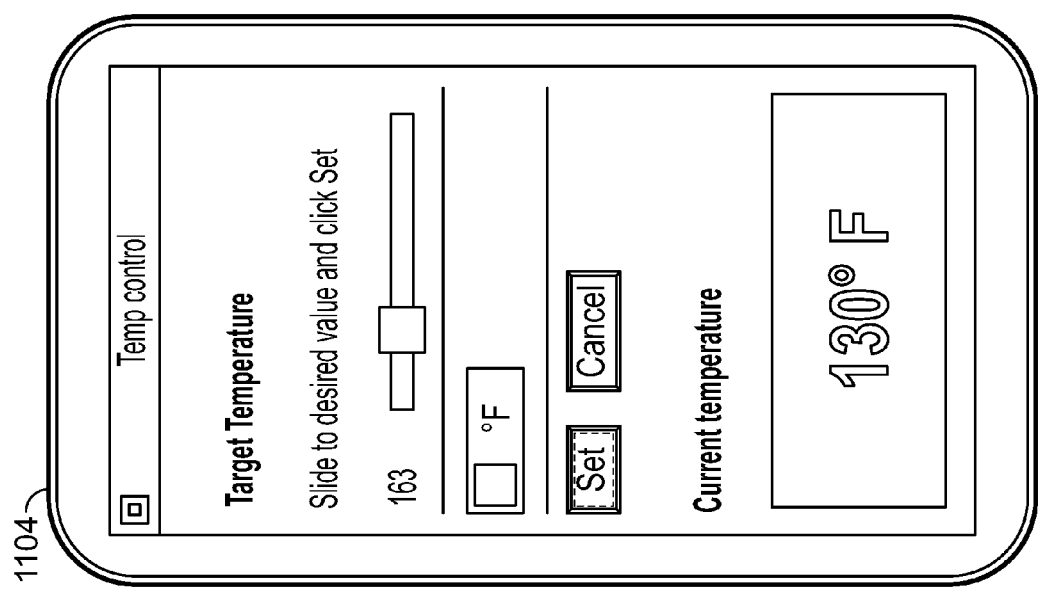
FIG. 59 is an example display of the remote communication device shown in FIG. 50.

FIGS. 57-59 illustrate displays on the remote communication device 1104 when used in conjunction with the countertop cooking appliance 1102.

FIG. 57 shows a menu display on the remote communication device 1104 after a communication connection has been established between the remote communication device 1104 and the countertop cooking appliance 1102. The menu includes selectable options to turn the countertop cooking appliance 1102 on/off, set the temperature of the countertop cooking appliance 1102, and view recipes for use with the countertop cooking appliance 1102. In other embodiments, the menu may include more or fewer options. For example, in some embodiments, the menu includes a statistical data option to view statistical data about the countertop cooking appliance 1102 (hours of use, serial number, etc.), a help option to access help files and instructions for operating the countertop cooking appliance 1102, a monitor option to monitor the settings, food item data, and/or operational data without controlling the countertop cooking appliance 1102, and/or a maintenance option to view recommended/required maintenance procedures.

In FIG. 58, the remote communication device 1104 is displaying an example recipe selected by a user.

In FIG. 59, the remote communication device 1104 includes a display for setting and monitoring the current temperature of the remote communication device 1104.

Technical effects of the methods, systems, and computer-readable media described herein include at least one of: (a) receiving a user selection to cook a food item with a countertop cooking appliance; (b) retrieving and displaying to a user a list of instructions for the user to select from; (c) retrieving and displaying instruction to a user; (d) transmitting countertop cooking appliance settings to a countertop cooking appliance; (e) receiving data from a countertop cooking appliance; (f) alerting a user that a cooking time for a food item has elapsed; and (g) alerting a user when a food item has finished cooking.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Although certain embodiments of this disclosure have been described above with a certain degree of particularity, those skilled in the art could make numerous alterations to the disclosed embodiments without departing from the spirit of scope of this disclosure. All directional references (e.g., upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations particularly as to the position, orientation or use of the disclosure. Joinder references (e.g., attached, coupled, connected, and the like) are to be construed broadly and may include intermediate members between a connection of elements relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the disclosure as defined in the appended claims.

When introducing elements of the present disclosure or the various versions, embodiment(s) or aspects thereof, the articles "a", "an", "the" and "said" are intended to mean that there are one or more elements. The terms "comprising", "including" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

The various examples and teachings described above are provided by way of illustration only and should not be construed to limit the scope of the present disclosure. Those skilled in the art will readily recognize various modifications and changes that may be made without following the example examples and applications illustrated and described herein, and without departing from the true spirit and scope of the present disclosure.

What is claimed is:

1. A cooking appliance comprising:
   a housing;
   an electric heating element disposed within the housing;
   a cooking plate mounted on the housing for cooking a food item thereon and configured to be heated by the electric heating element;
   a temperature sensor coupled to the cooking plate and configured to monitor a temperature of the cooking plate;
   a temperature probe assembly including a temperature probe element, the temperature probe element configured to be inserted into the food item to measure an internal temperature of the food item; and
   a control device configured to communicate with a user computing device via a wireless network, receive a cooking configuration from the user computing device via the wireless network, the cooking configuration including at least a target cooking plate temperature setting and a target probe temperature setting, and control the heating element based upon the cooking configuration to heat the cooking plate to the target cooking plate temperature setting such that the internal temperature of the food item reaches the target probe temperature setting.

2. The cooking appliance of claim 1, wherein:
   the housing has a forward end and a rearward end; and
   the cooking plate has a food contact surface configured to receive a food item, the food contact surface configured to slope down from the rearward end to the forward end when the cooking plate is mounted on the housing.

3. The cooking appliance of claim 1, wherein:
   the housing has a forward end and a rearward end; and
   the cooking plate has a food contact surface configured to receive a food item, the food contact surface configured to be substantially flat from the rearward end to the forward end when the cooking plate is mounted on the housing.

4. The cooking appliance of claim 1, wherein the cooking configuration includes a target cooking temperature.

5. A method of controlling a cooking appliance, the cooking appliance including an electric heating element and a cooking plate, the cooking plate being arranged and configured to be heated by the electric heating element and being configured for cooking a food item thereon, the method comprising:
   receiving cooking configuration data from a user computing device via a wireless network, the cooking configuration data including at least a target cooking plate temperature setting and a target probe temperature setting;
   monitoring a temperature of the cooking plate using a temperature sensor coupled to the cooking plate;
   monitoring an internal temperature of the food item while the food item is on the cooking plate using a temperature probe assembly, the temperature probe assembly having a temperature probe element inserted into the food item; and
   controlling the heating element based on the cooking configuration data to heat the cooking plate to the target cooking plate temperature setting such that the internal temperature of the food item reaches the target probe temperature setting.

6. The method of claim 5, wherein the user computing device is configured to prompt a user to provide a cooking configuration input therethrough and generate the cooking configuration data based upon the cooking configuration input.

7. The method of claim 5, further comprising:
   prior to controlling a heating element, controlling the heating element to heat the cooking plate until a temperature of the cooking plate reaches the target cooking temperature; and
   prompting a user to place the food item in the cooking appliance.

8. The method of claim 5, further comprising:
   prior to receiving cooking configuration data, establishing a wireless connection to the user computing device via a router.

9. The method of claim 8, wherein the user computing device is configured to prompt a user to input a wireless connection password for establishing the wireless connection via the router.

10. A cooking appliance comprising:
    a first assembly comprising:
       a first housing;
       a first electric heating element disposed with the first housing;
       a first cooking plate detachably mounted on the first housing, the first cooking plate for cooking a food item thereon and configured to be heated by the electric heating element; and
       a first temperature sensor coupled to the first cooking plate and configured to monitor a temperature of the first cooking plate;

a second assembly comprising:
: a second housing pivotally coupled to the first housing; and
: a second heating element disposed with the second housing;
a temperature probe assembly including a temperature probe element, the temperature probe element configured to be inserted into the food item to measure an internal temperature of the food item;
a control circuit configured to communicate with a user computing device via a wireless network and operable to:
: receive cooking configuration data from the user computing device, the cooking configuration data including at least a target cooking plate temperature setting and a target probe temperature setting; and
: control at least one of the first and second heating elements based on the cooking configuration data to heat the first cooking plate to reach the target cooking plate temperature until the internal temperature of the food item reaches the target probe temperature setting.

11. The cooking appliance of claim 10, wherein the control circuit is further operable to:
: prior to controlling a heating element, control at least one of the first and second heating element to heat the first cooking plate until a temperature of the first cooking plate reaches the target cooking temperature; and
: prompt a user to place the food item in the cooking appliance.

12. The cooking appliance of claim 10, wherein the second assembly further comprises a second cooking plate detachably mounted on the second housing.

13. The cooking appliance of claim 10, wherein:
: the first housing has a forward end and a rearward end; and
: the first cooking plate has a food contact surface configured to receive the food item, the food contact surface configured to slope down from the rearward end to the forward end when the first cooking plate is mounted on the first housing.

14. The cooking appliance of claim 10, wherein the temperature probe assembly further comprises:
: a probe body configured to mount the temperature probe element, the probe body including a cord management portion around which a cord is at least partially wrapped.

15. The cooking appliance of claim 10, further comprising:
: a probe storage configured to receive and store the temperature probe assembly.

16. The cooking appliance of claim 1, wherein the cooking plate is selected from a group consisting of a grill plate, a waffle plate, a bake plate, a muffin plate, a griddle plate, an omelet plate, a meatball plate, a steam plate, a wok plate, and a multi-cooker plate.

* * * * *